United States Patent [19]

Nishina

[11] Patent Number: 4,997,265
[45] Date of Patent: Mar. 5, 1991

[54] ZOOM LENS FOR VARIABLE POWER COPYING APPARATUS

[75] Inventor: Kiichiro Nishina, Tokyo, Japan
[73] Assignee: Ricoh Company, Ltd., Tokyo, Japan
[21] Appl. No.: 418,390
[22] Filed: Oct. 6, 1989
[30] Foreign Application Priority Data Oct. 14, 1988 [JP] Japan .................................. 63-257114
Apr. 15, 1989 [JP] Japan ..................................... 1-96177
May 25, 1989 [JP] Japan .................................. 1-130024

[51] Int. Cl.$^5$ ............................................. G02B 15/14
[52] U.S. Cl. ...................................................... 350/425
[58] Field of Search ................................ 350/425, 423

[56] References Cited

U.S. PATENT DOCUMENTS 4,813,773 3/1989 Minefuji ................................ 350/425

Primary Examiner—Scott J. Sugarman
Attorney, Agent, or Firm—Oblon, Spivak, McClelland, Maier & Neustadt

[57] ABSTRACT

A zoom lens for a variable power copying apparatus comprises six lenses disposed in order from an object surface to an image surface. A first lens is composed of a negative lens having an object side oriented concave surface. A second lens is composed of a positive lens. A third lens is composed of a negative lens having an object side oriented concave surface. An aperture stop is disposed between the third lens and a fourth lens. The fourth lens is composed of the same lens as the third lens and having an image side oriented concave surface. A fifth lens is composed of the same lens as the second lens. And a sixth lens is composed of the same lens as the first lens and having an image side oriented concave surface. For a natural size image of an object, the first to sixth lenses are arranged symmetrically with respect to the aperture stop. For a reduced or magnified size image of an object, the lens groups and the aperture stop are arranged in such a way that the first and sixth lenses are fixed, that the second and fifth lenses are moved nonsymmetrically and that the whole lens system is moved along the optical axis so that the image size is continuously varied keeping the conjugate length between the object and the image constant regardless of the scale.

6 Claims, 64 Drawing Sheets

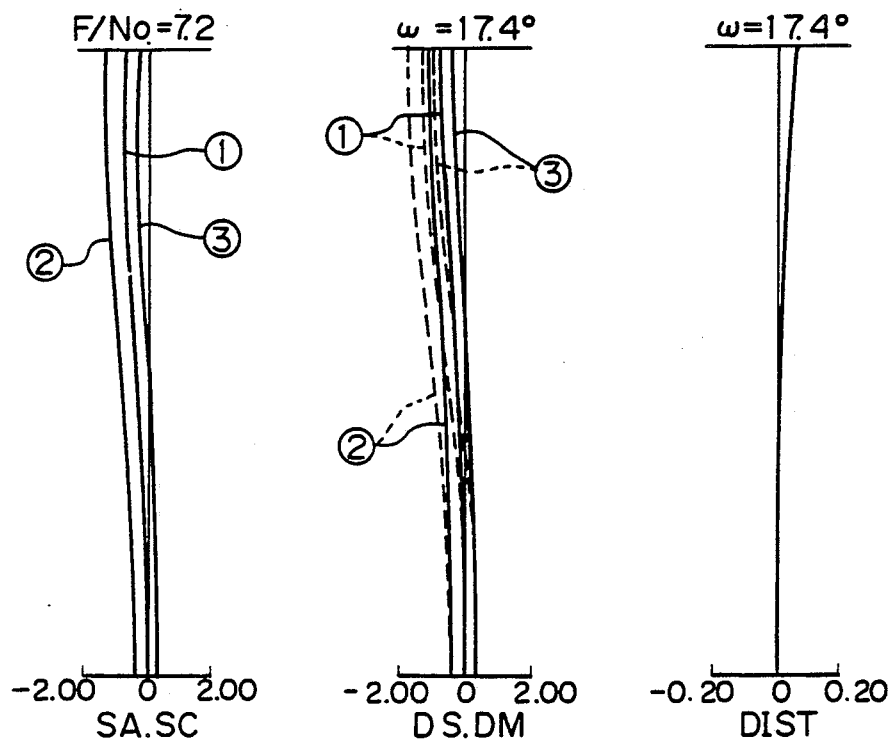
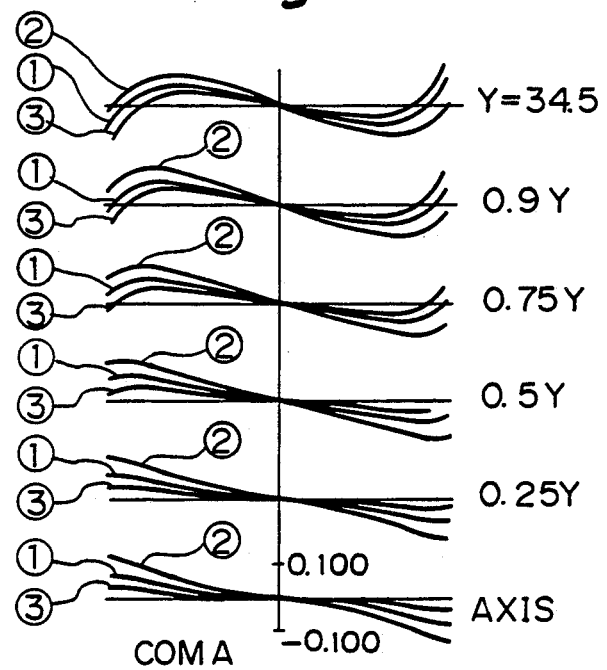

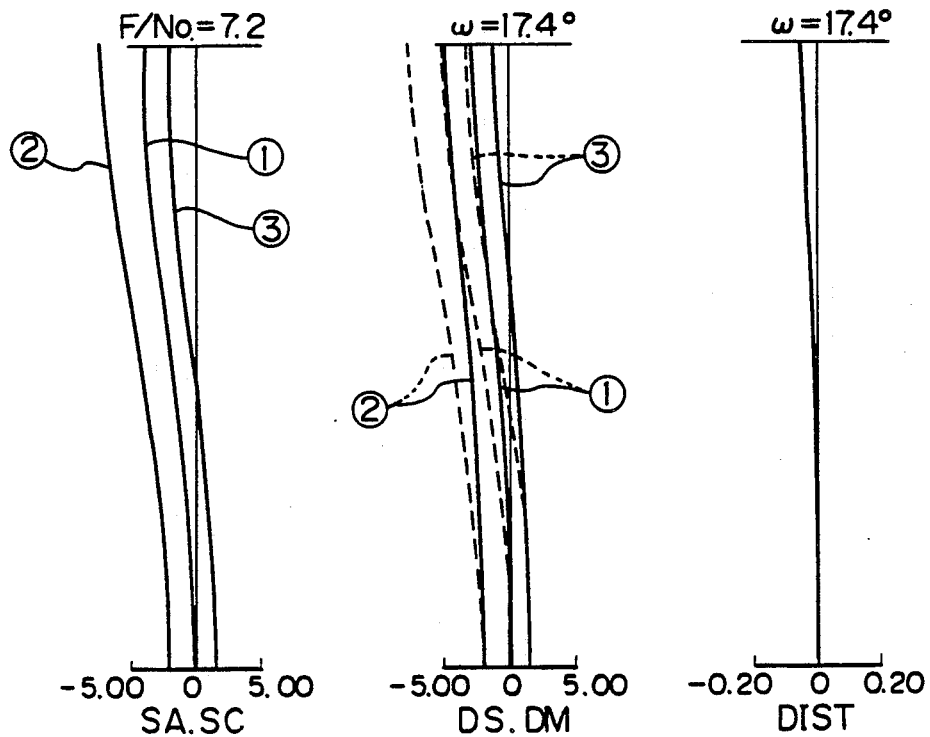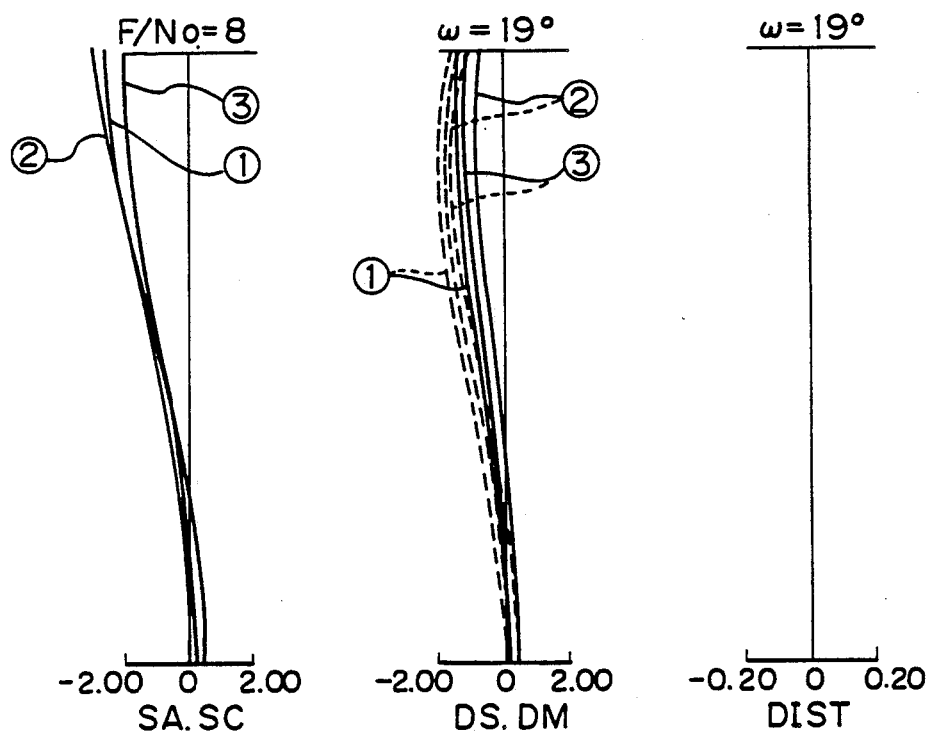

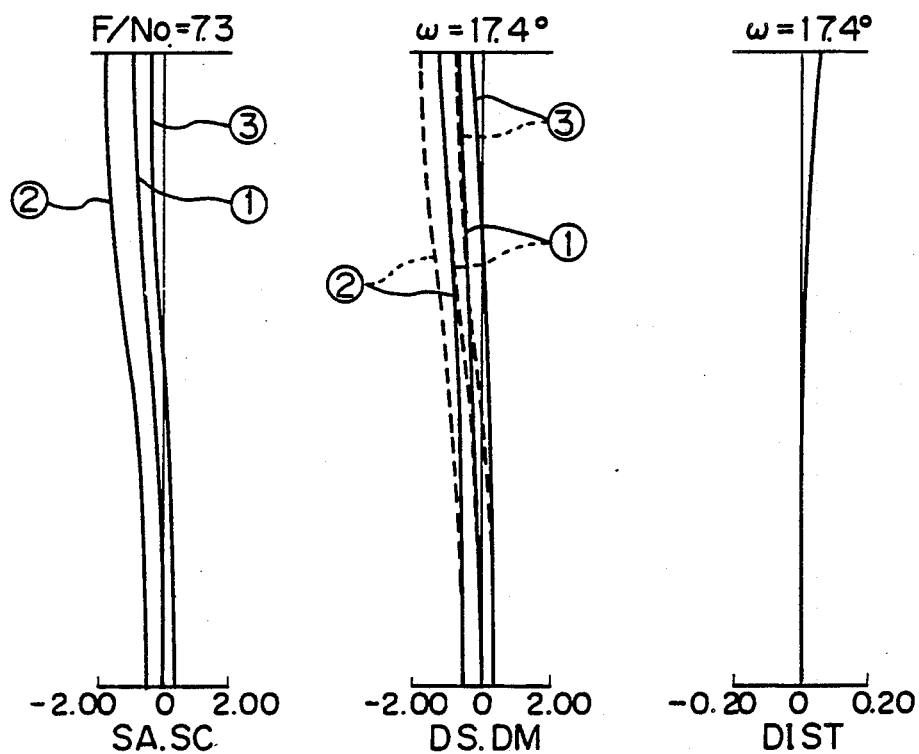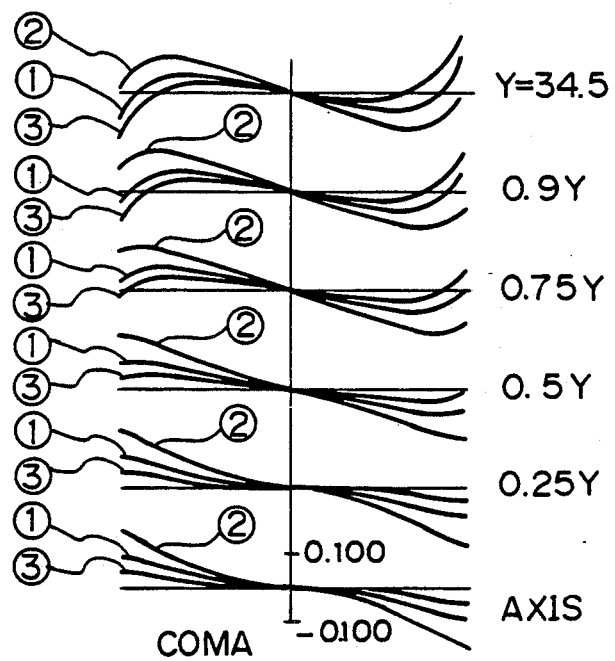

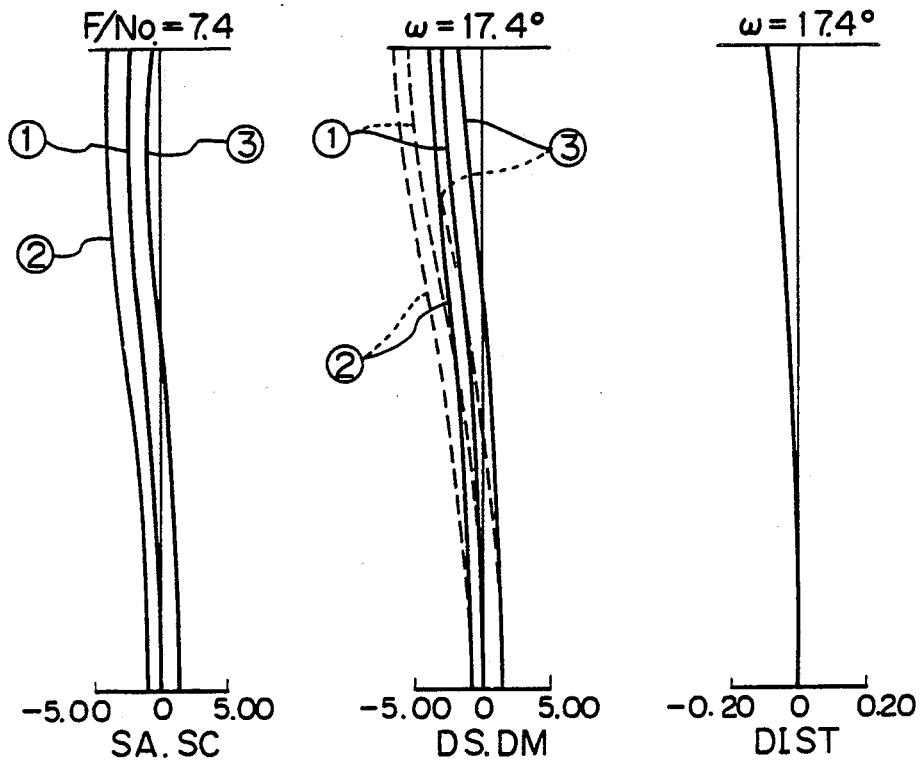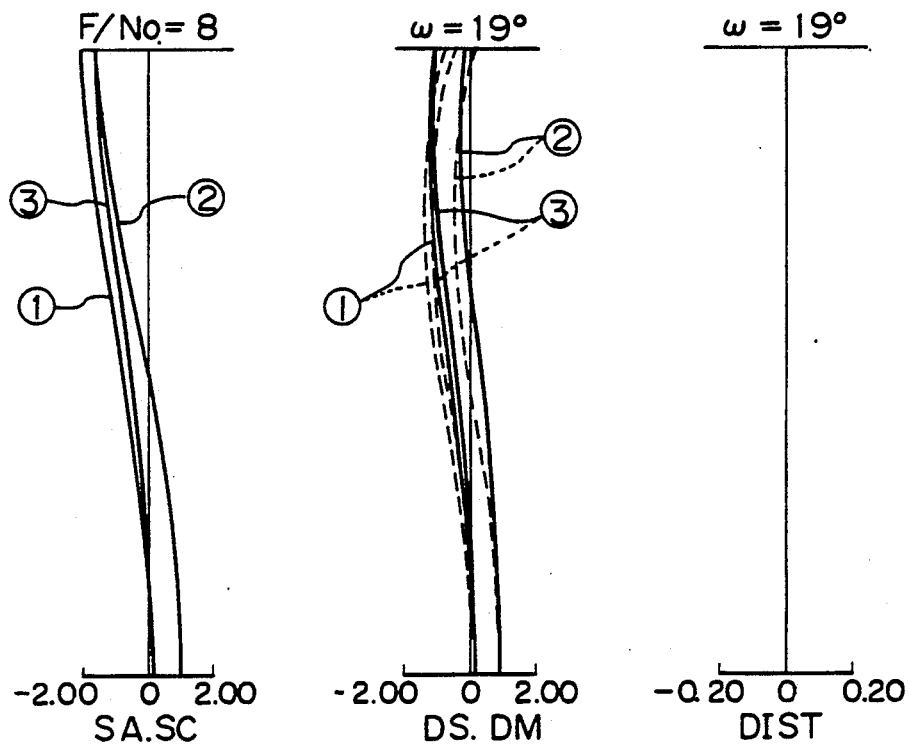

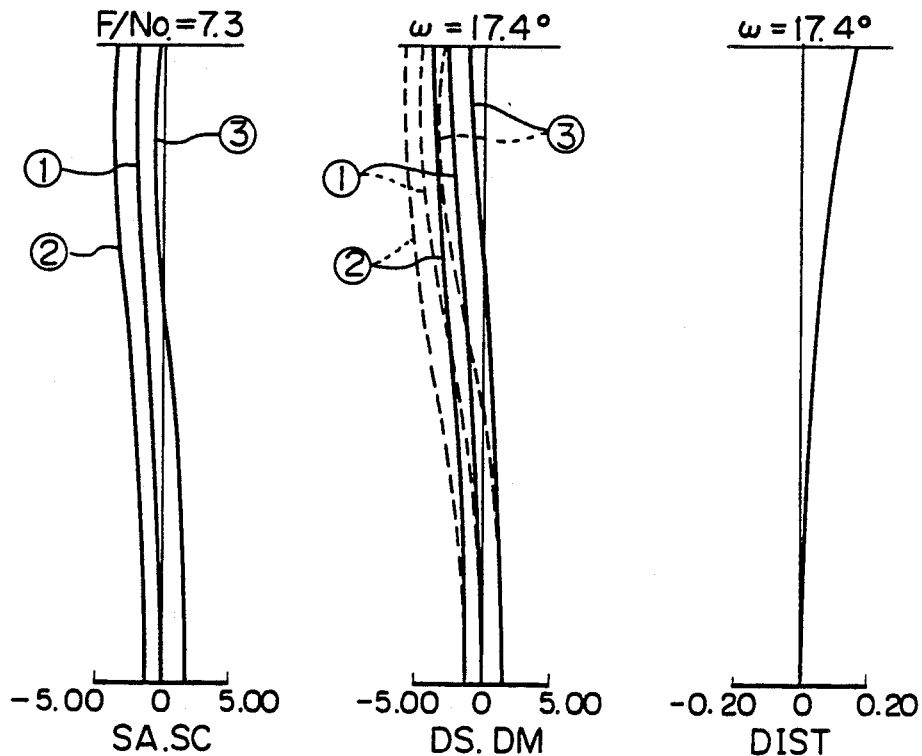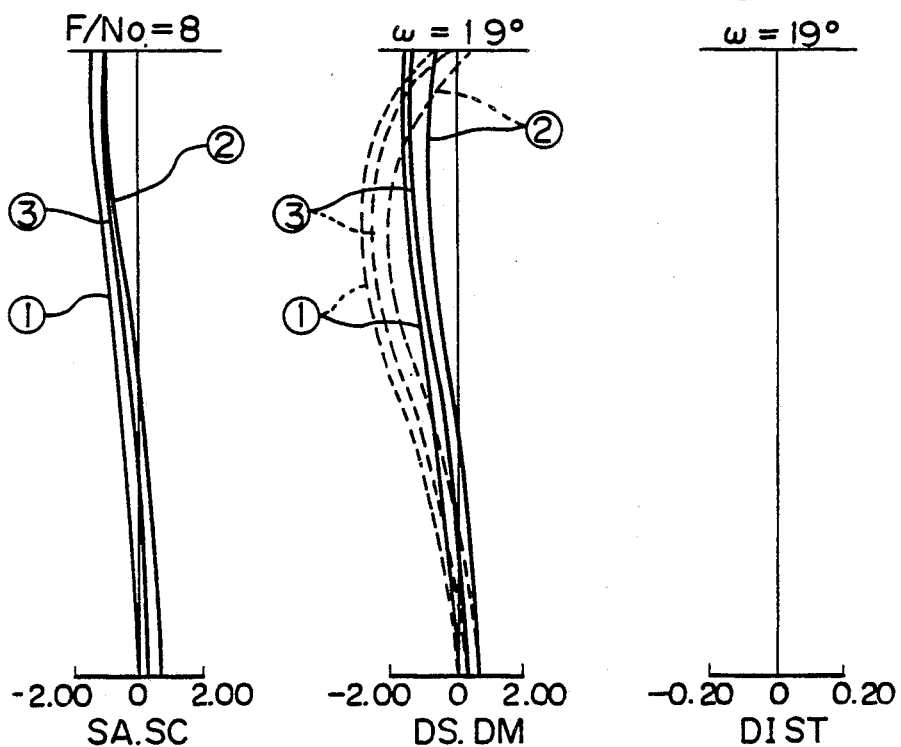

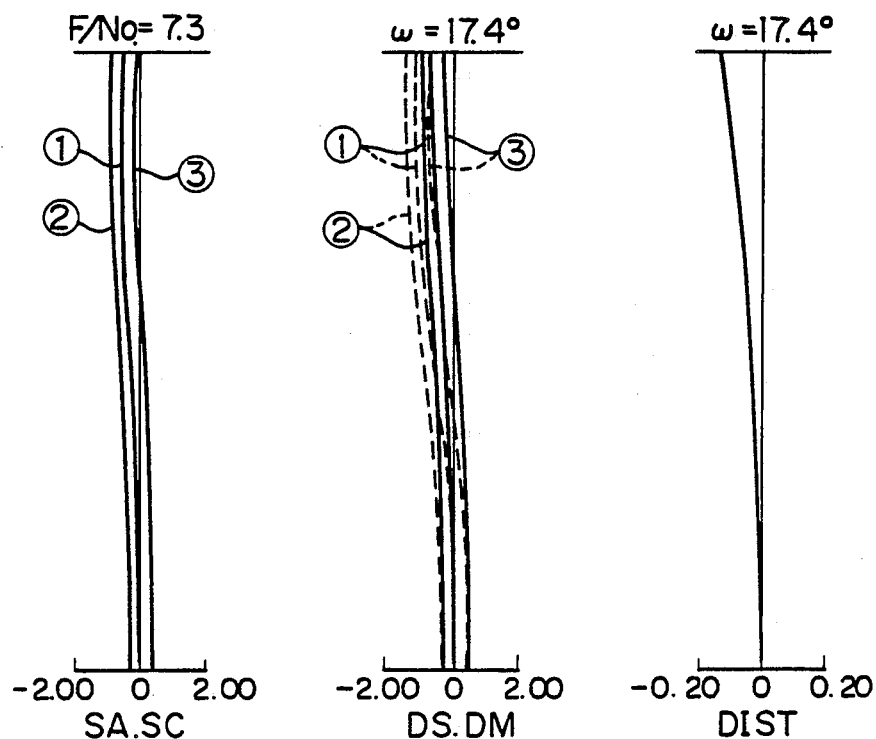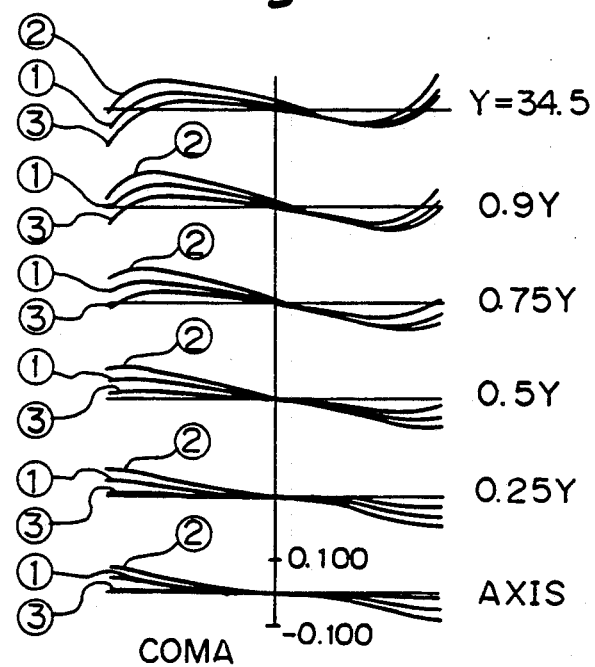

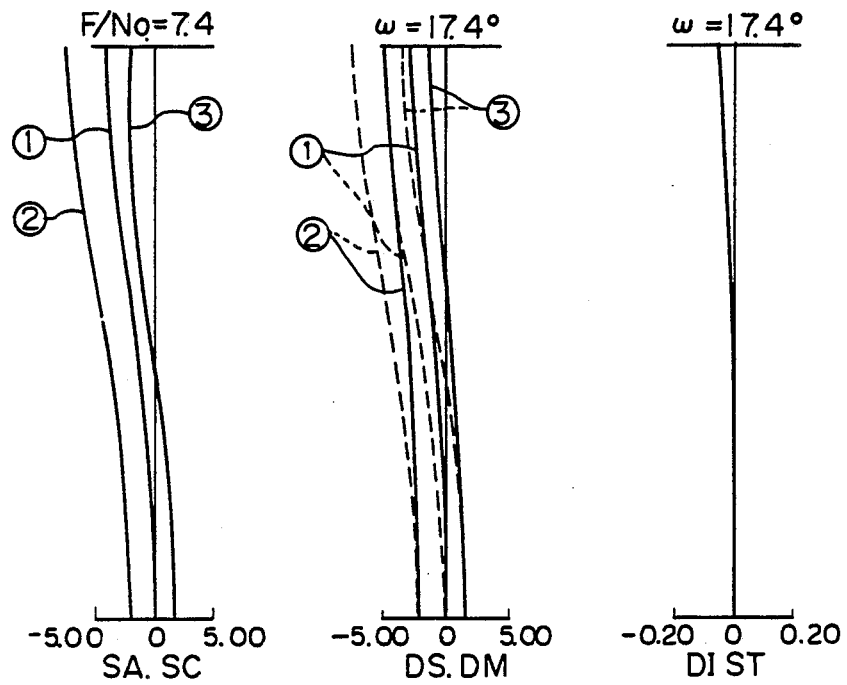
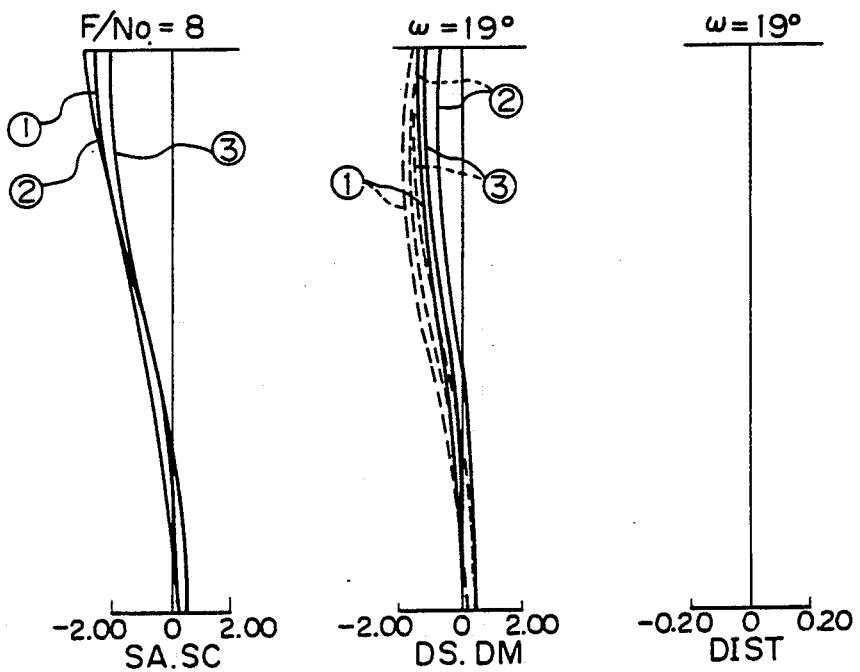

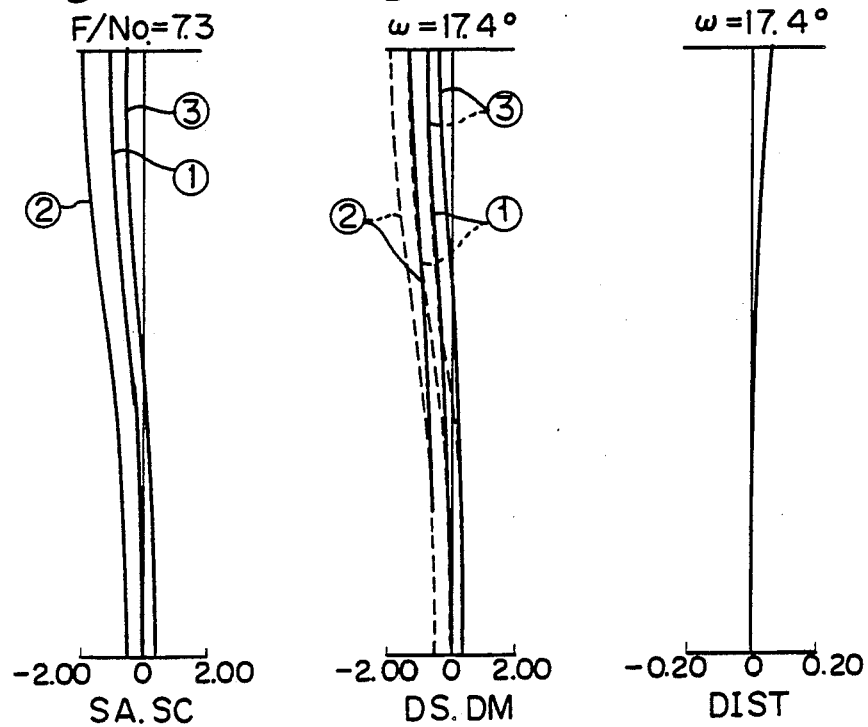
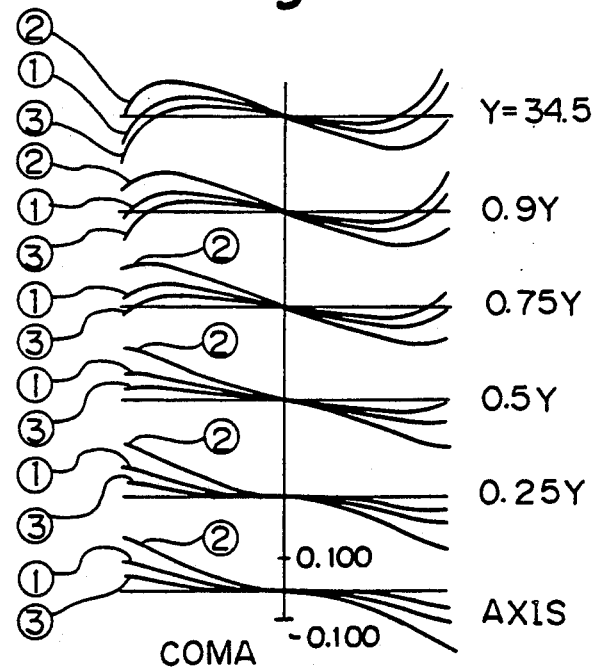

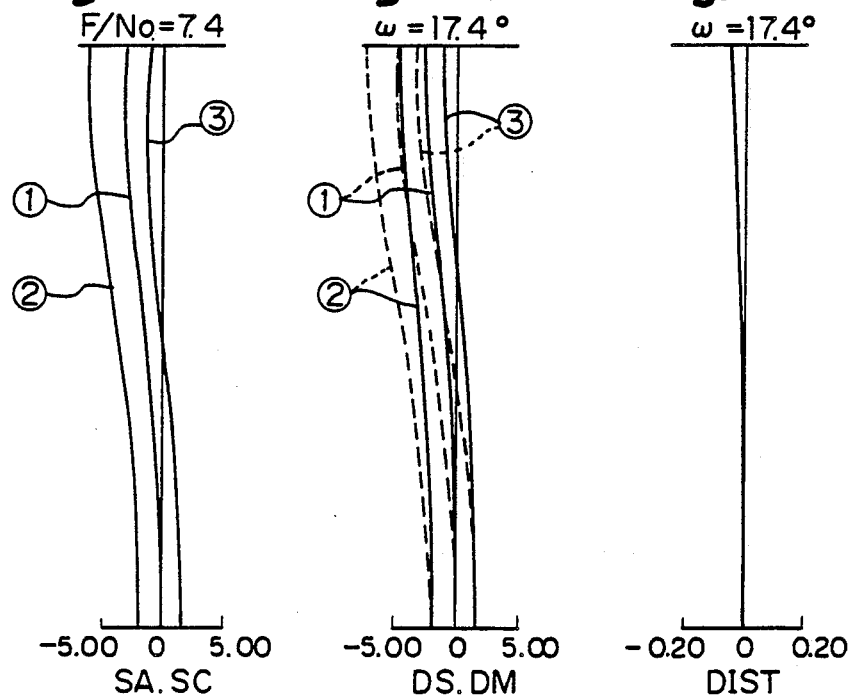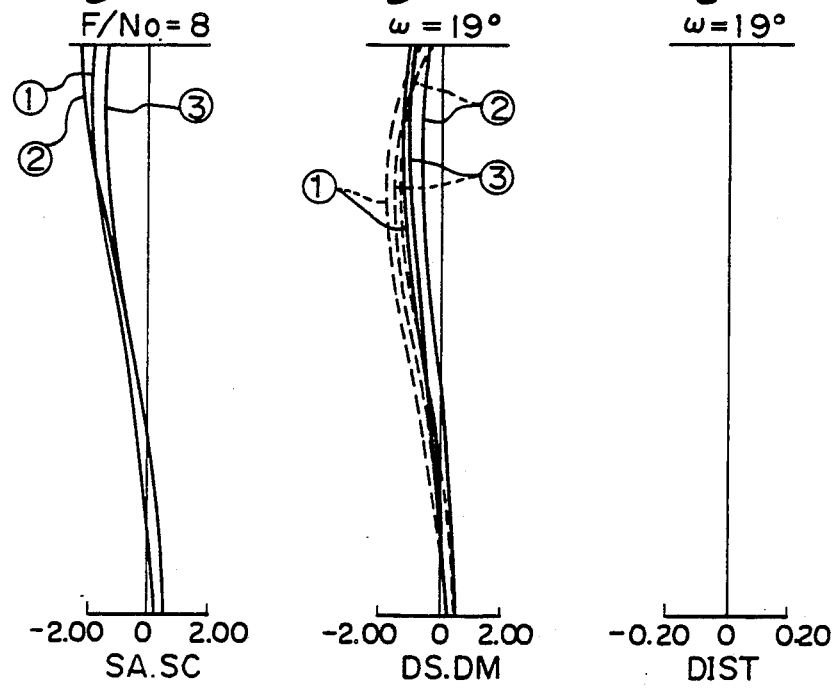

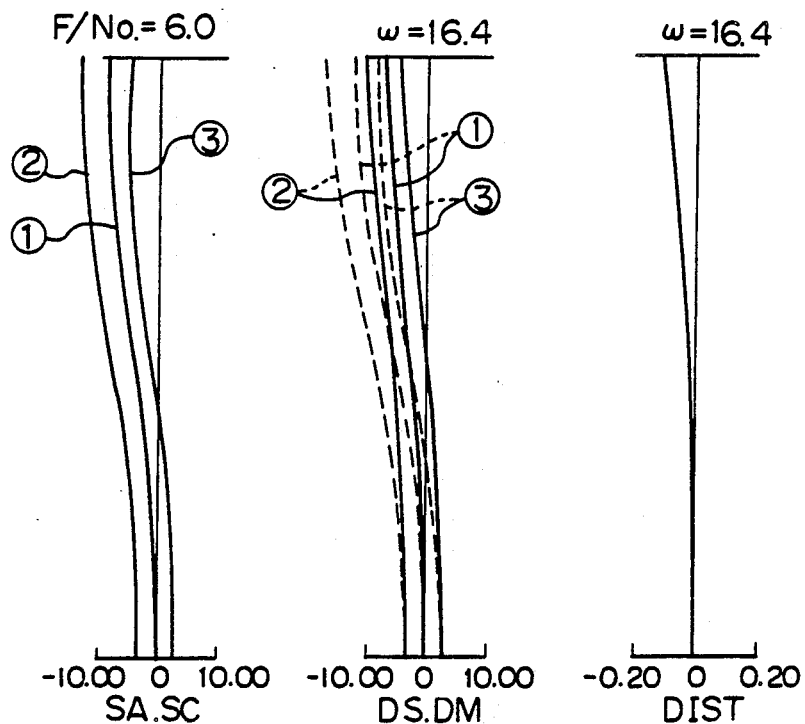
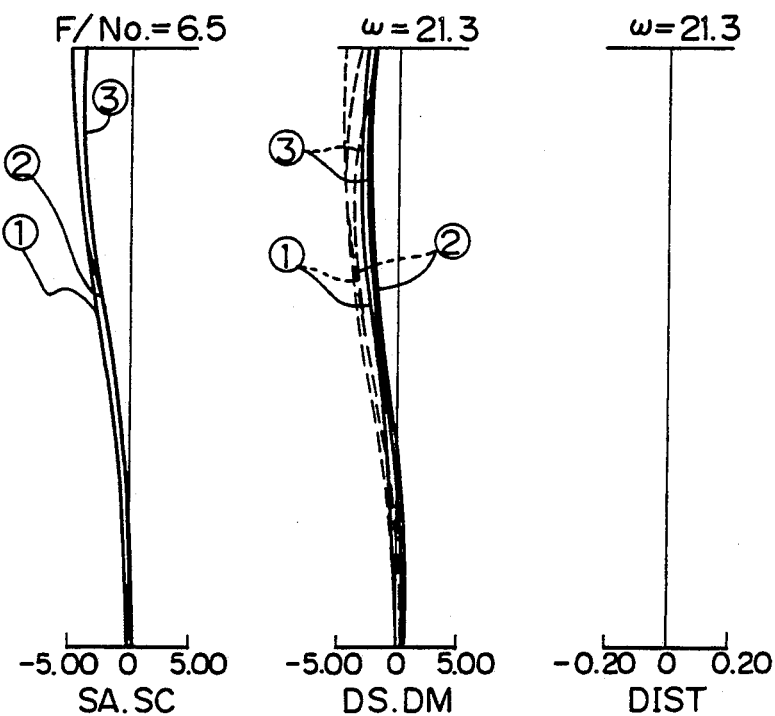

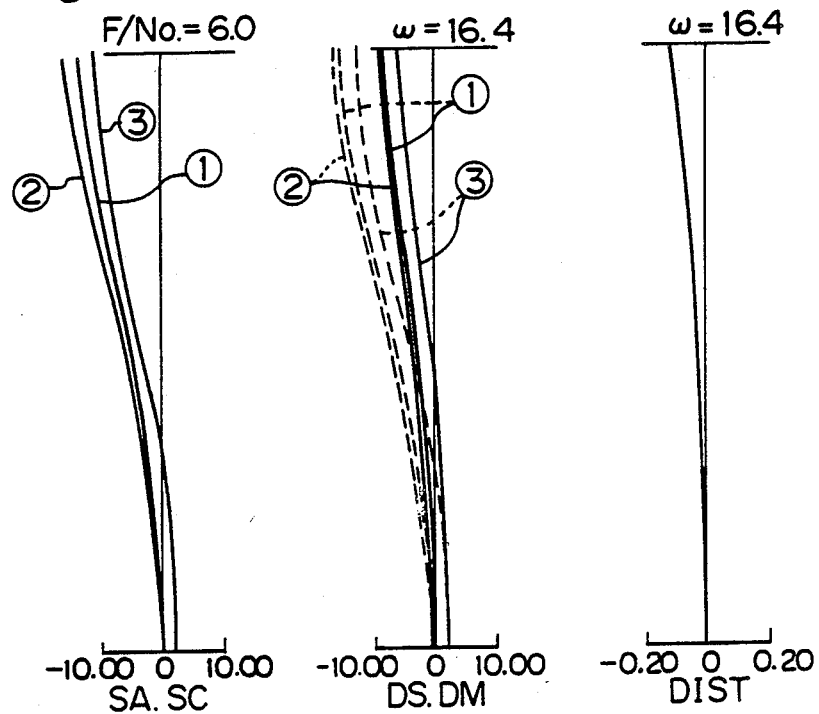
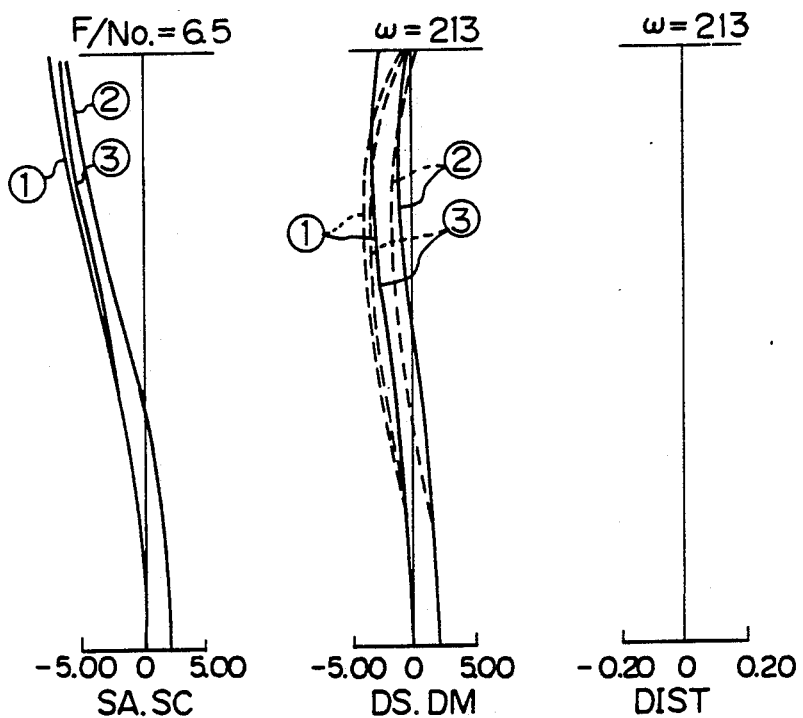

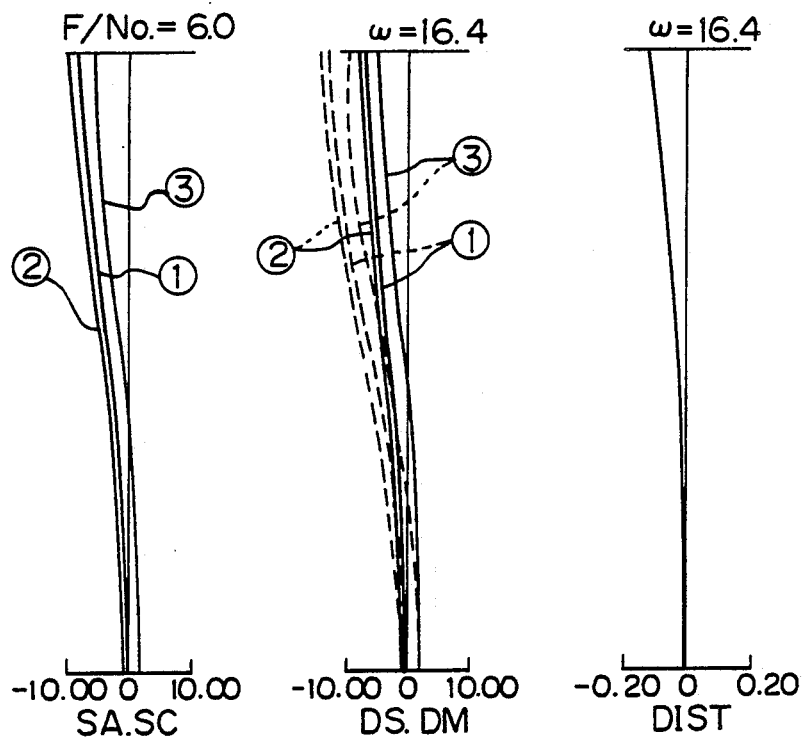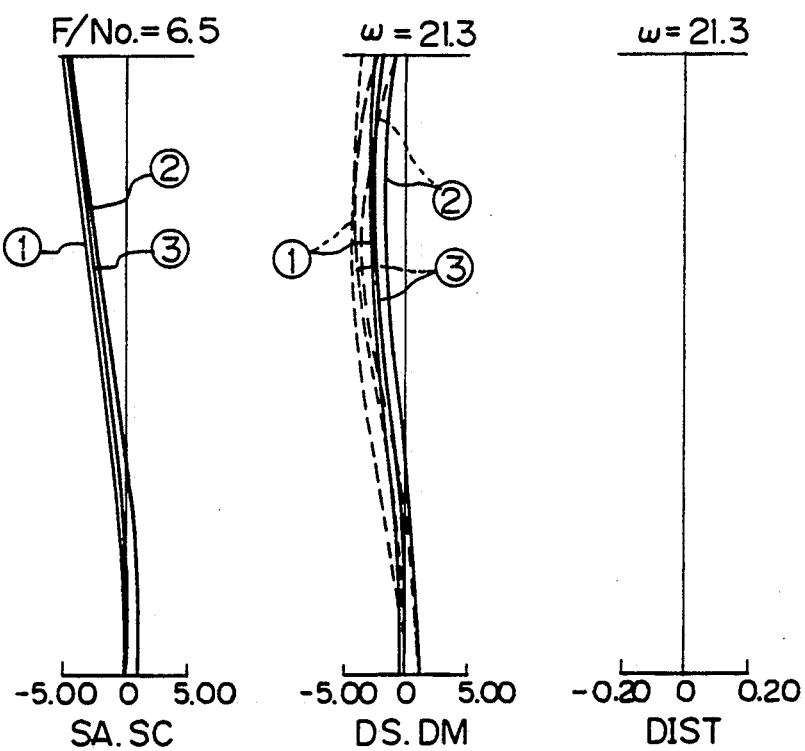

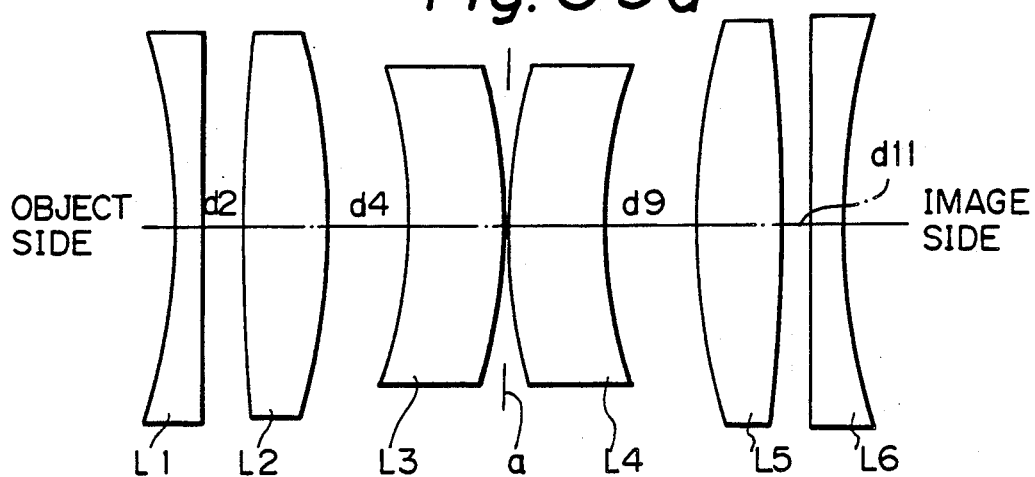
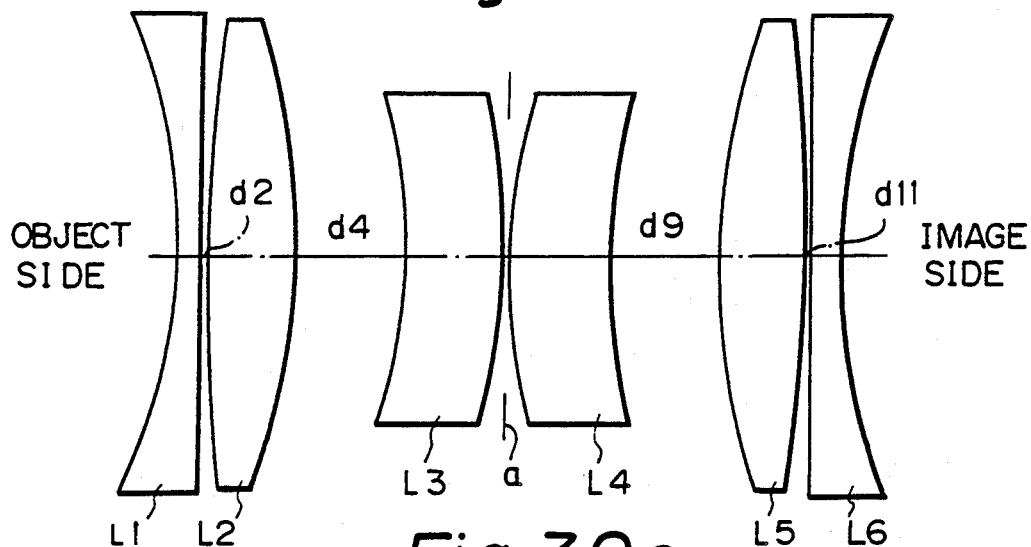
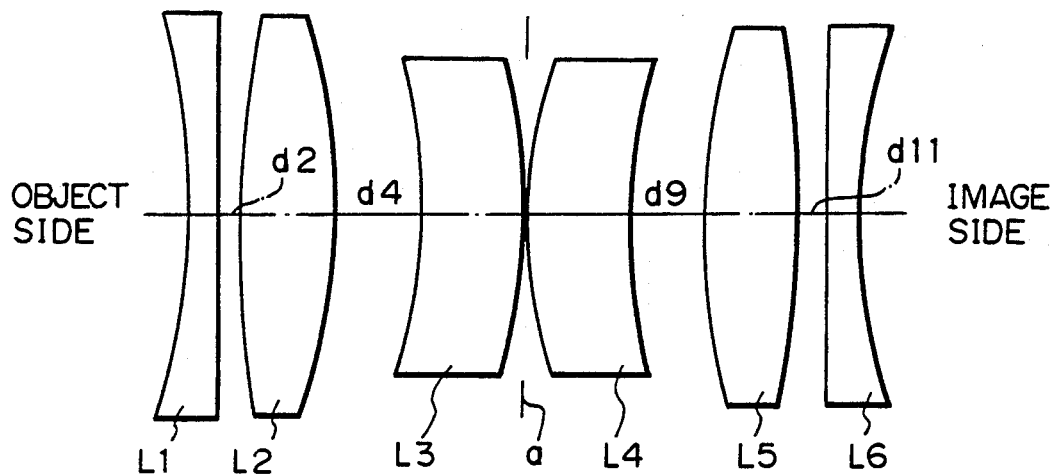

*Fig.40c-1*  *Fig.40c-2*  *Fig.40c-3*
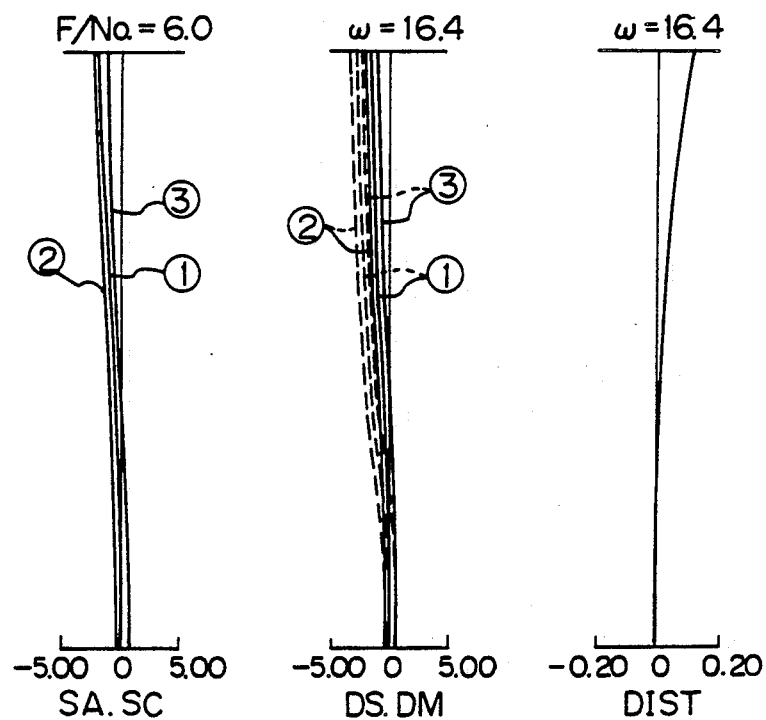
*Fig.41a*
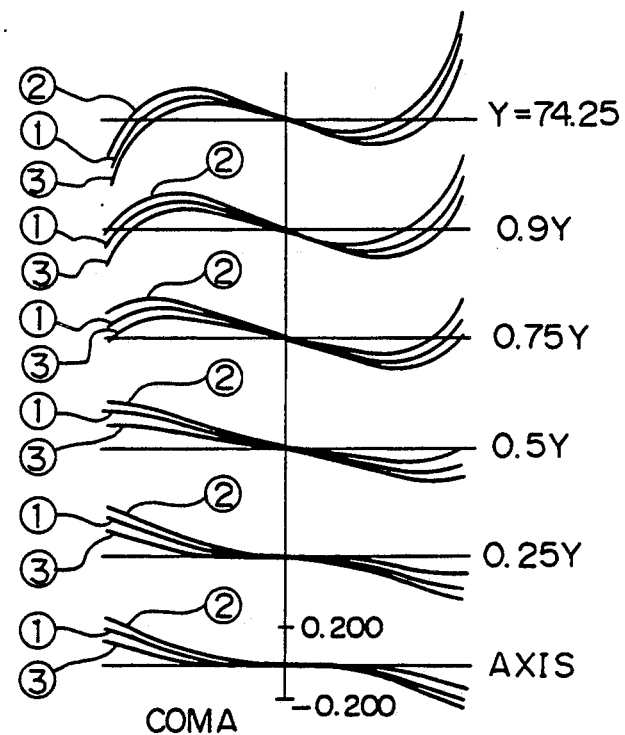

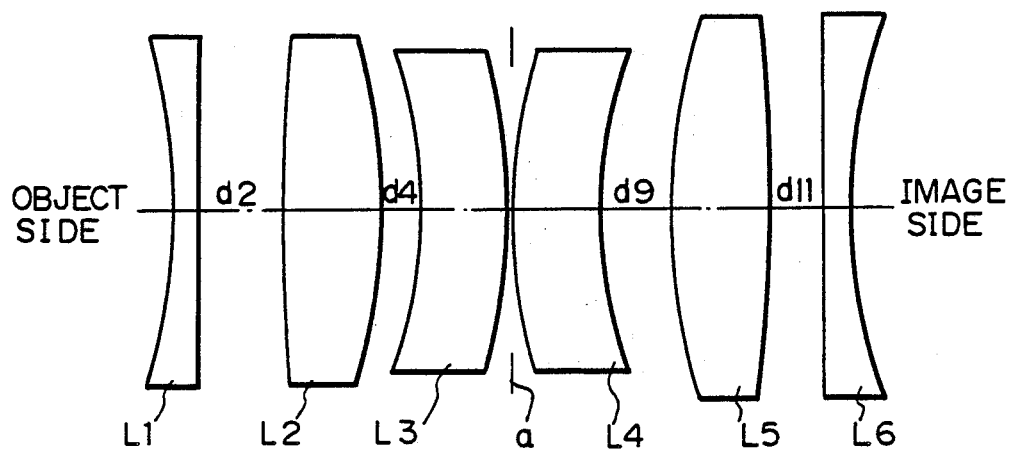
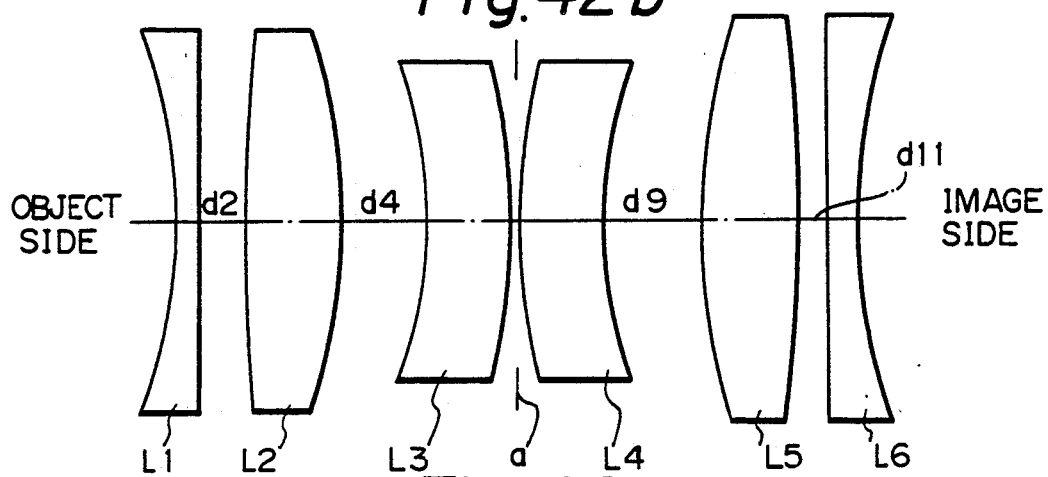
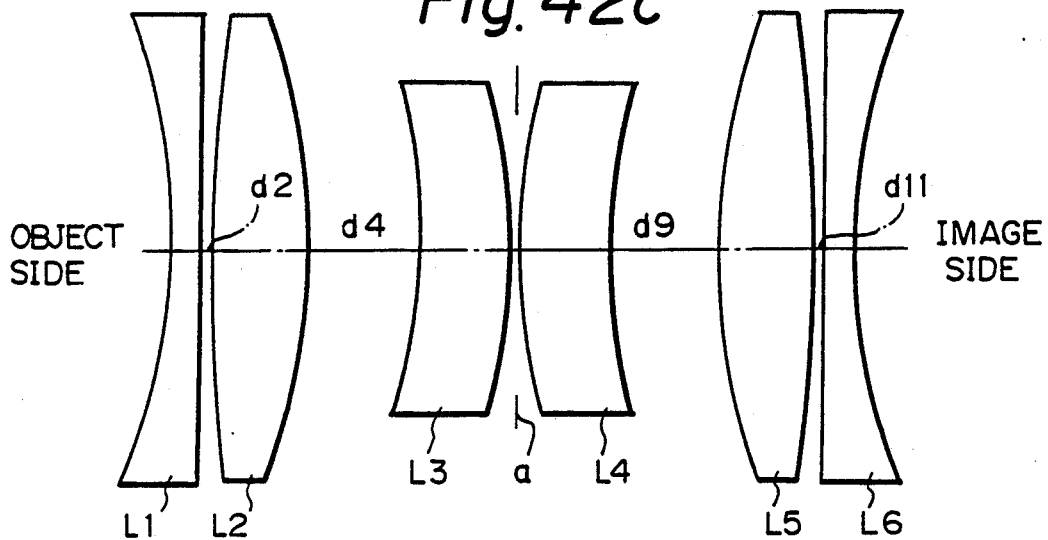

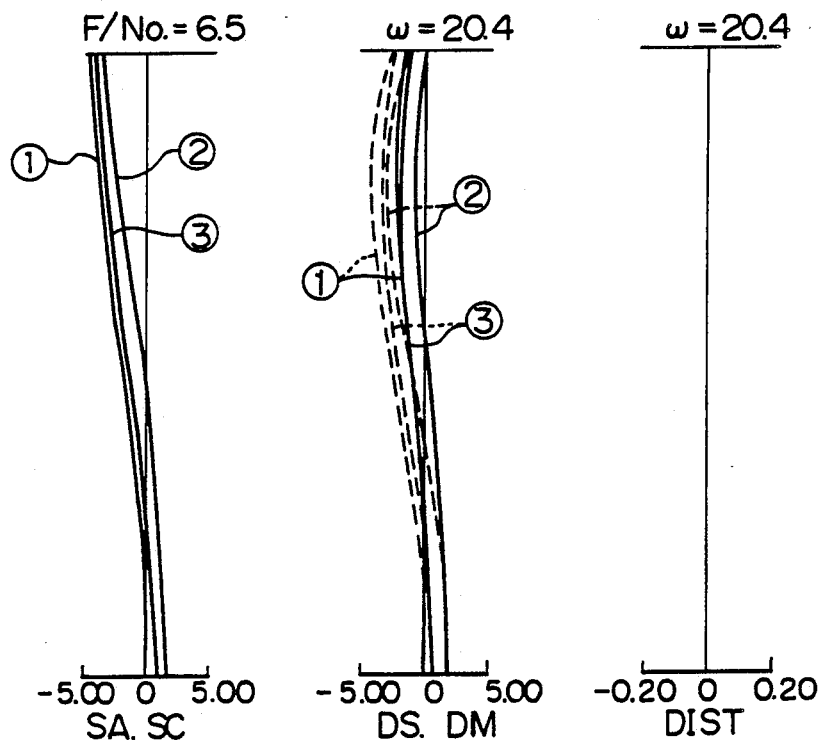
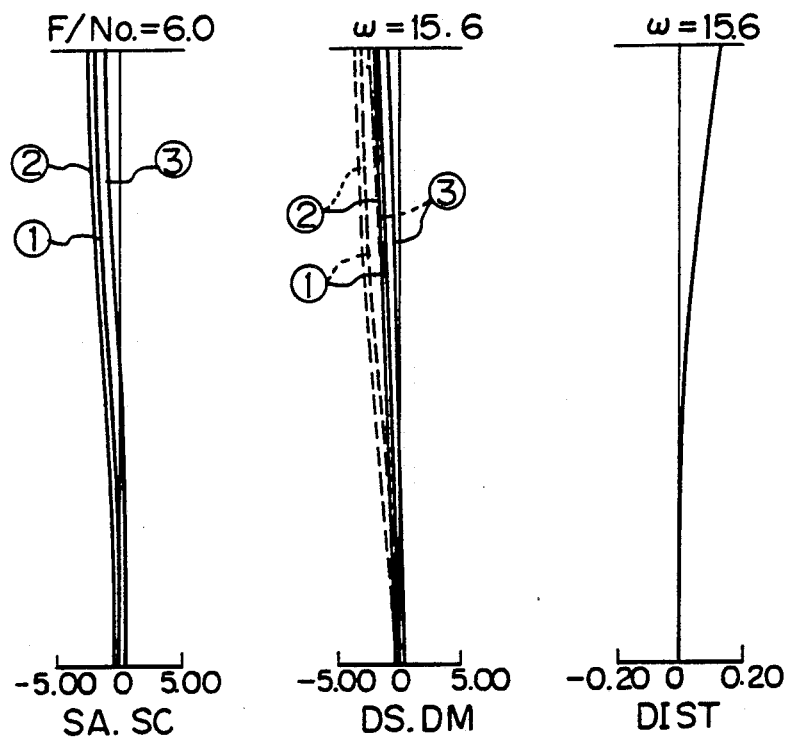

4,997,265

ZOOM LENS FOR VARIABLE POWER COPYING APPARATUS

BACKGROUND OF THE INVENTION

The present invention relates to a zoom lens for variable power copying apparatus. More particularly, the invention relates to a zoom lens which is especially suitable for varying power of the copying system without changing the conjugate length between an object surface and an image surface thereof.

Copying apparatuses, especially electrophotographic copying apparatuses are widely and effectively used in various fields. Conventionally, the copying apparatus was mostly used to obtain a hard copy which is of the same size as the original. However, these days, it has been required that the copying apparatus equip a variable power system to obtain reduced hard copies or magnified hard copies in addition to exact size copies.

The variable power function can be achieved by various ways. For example, a lens system for natural size copies can be rearranged to change the scale of the copy. More precisely, the variable power function using the naturl size lens system can be achieved in such a way that the conjugate length between the object and a fixed focal length lens of the lens system and the conjugate length between the lens and the image are changed so as to change the length between the object and the image thereof, or that a converter lens is disposed on an optical path of the fixed focal length lens at the time of reducing or magnifying the copy.

With regard to the way to change the scale of the copy by changing the conjugate length mentioned above, a movable reflection mirror is required to change the conjugate length in such a way that the conjugate length becomes minimum for the natural size copy and elongates according as the scale of the copy differs from the exact size. Therefore, if the scale range of the copy is wide, for example from 0.5 to 2.0, the mirror has to move a long distance, which causes a large structure of the apparatus in addition to increase of parts that require accuracy.

Also, with regard to the other way to change the scale of the copy by disposing the converter lens as mentioned above, a plurality of converter lenses have to be provided to cope with a requirement of obtaining copies in various scales, since one converter lens corresponds only to one scale specific to the lens. Also, the converter lens comprises at least two lens elements, which makes the structure complicated and expensive. Besides, a converter lens changing mechanism has to be provided, which makes the structure further complicated and expensive.

In order to cope with the problems mentioned above, a variable power zoom lens has been developed which lens varies the scale ratio without changing the conjugate length from the object to the image. An example of such a variable power zoom lens is described in Japanese patent application Layin-Open No. 61-151604.

The optical system of the variable power zoom lens of the publication comprises lens groups of one kind consisting of a concave lens, a convex lens and a concave lens and another kind of lens groups consisting of a plurality of same lenses, the lens groups being disposed symmetrically with respect to an aperture stop wherein from a first to sixth lens groups are disposed in order from an object in such a way that the lens system comprises two fixed lens groups consisting of the first and sixth lenses, a first movable lens group consisting of the second and third lenses, and a second movable lens group consisting of the fourth and fifth lenses.

The variable power zoom lens having the structure mentioned above functions as follows. For natural scale use, the first to sixth lenses are disposed in a symmetrical arrangement with respect to the aperture stop. On the other hand, for reduced or magnified scale use, the first and second lens groups are moved by a same distance from the aperture stop.

However, the variable power optical system described in the publication mentioned above has disadvantages that F-number is small (about 11) so that the lens system is dark and that the variable range is narrow (about 0.647 to 1.414) since the scale ratio is changed by moving the lens groups symmetrically with respect to the aperture stop.

Besides, the movement length of the lens groups is elongated according as the scale ratio differs from the natural scale toward the reducing side or the magnifying side and abruptly increases from the magnifying ratio of about 1.414 or the reducing ratio of about 0.707. Therefore, in order to obtain the scale range of about 0.5 to 2.0 by moving the lens groups, a large space is required to move the lenses which makes the entire length of the lens system very long and causes degradation of the image of a magnified or reduced scale size.

SUMMARY OF THE INVENTION

The present invention was made considering the points mentioned above. It is therefore an object of the present invention to provide a zoom lens for variable power copying apparatus which makes it possible to obtain a wide scale range of about from 0.5 to 2.0 maintaining the conjugate length between the object and the image constant with the use of a small number of lenses and without complicating and enlarging the structure thereof or impairing the function of image formation.

The object of the present invention can be achieved by a zoom lens of a first structure comprising six lenses constituting six groups of lens disposed in the following order from an object surface to an image surface i.e.: a first lens composed of a negative lens having an object side oriented concave surface; a second lens composed of a positive lens; a third lens composed of a negative lens having an object side oriented concave surface; an aperture stop; a fourth lens composed of the same lens as the third lens and having an image side oriented concave surface; a fifth lens composed of the same lens as the second lens; and, a sixth lens composed of the same lens as the first lens and having an image side oriented concave surface, wherein at the time of forming a natural size scale image of an object, the first to sixth lenses are arranged symmetrically with respect to the aperture stop, whereas at the time of forming a reduced or magnified size scale image of an object, the lens groups and the aperture stop are arranged in such a way that at least the first and sixth lenses are fixed, that at least the second and fifth lenses are moved nonsymmetrically and that the whole lens system is moved along the optical axis so that the image size is continuously varied maintaining the conjugate length between the object surface and the image surface constant irrespective of the state of the scale.

In accordance with the first zoom lens structure mentioned above, it is desirable that the following conditions, i.e., $$0.4 < |f1/f0| < 0.65$$

and $$0.7 < |f3/f0| < 1.4$$

are satisfied, wherein f1 designates a focal length of the first lens, f3 designates a focal length of the third lens and f0 designates a combined focal length of the whole lens assembly system for the natural size scale.

The above-mentioned object of the present invention can also be achieved by a zoom lens of a second structure comprising six lenses constituting six groups of lens disposed in the following order from an object surface to an image surface, i.e.: a first lens composed of a negative lens having an object side oriented concave surface; a second lens composed of a positive lens; a third lens composed of a negative lens having an object side oriented concave surface; an aperture stop; a fourth lens composed of the same lens as the third lens and having an image side oriented concave surface; a fifth lens composed of the same lens as the second lens; and, a sixth lens composed of the same lens as the first lens and having an image side oriented concave surface, wherein at the time of forming a natural size scale image of an object, the first to sixth lenses are arranged symmetrically with respect to the aperture stop, whereas at the time of forming a reduced or magnified size scale image of an object, the lens groups and the aperture stop are arranged in such a way that the first, third, fourth and sixth lenses are fixed, that the second and fifth lenses are moved nonsymmetrically and that the whole lens system is moved along the optical axis so that the scale is continuously varied maintaining the conjugate length between the object surface and the image surface constant irrespective of the state of the scale.

In accordance with the second zoom lens structure mentioned above, it is desirable that the following conditions, i.e., $$0.4 < |f1/f0| < 0.7$$

and $$0.3 < f2/f0 < 0.45$$

are satisfied, wherein f1 designates a focal length of the first lens, f2 designates a focal length of the second lens and f0 designates a combined focal length of the whole lens assembly system for the natural size scale.

In accordance with the first zoom lens structure of the present invention, the zoom lens comprises six lenses constituting six groups, wherein at the time of forming an image of an object on the natural size scale, the groups of lenses are disposed symmetrically with respect to the aperture stop in such a way that the lens arrangement satisfies the following conditions, i.e., $$0.4 < |f1/f0| < 0.65$$

and $$0.7 < |f3/f0| < 1.4$$

wherein f1 designates a focal length of the first lens, f3 designates a focal length of the third lens and f0 designates a combined focal length of the whole lens system for the natural size scale. In the conditions described above, f1 and f3 may be substituted by f6 and f4, respectively, which designate focal length of the sixth and fourth lenses, respectively.

On the other hand, at the time of varying the power of the zoom lens system, at least the first lens and the sixth lens are fixed and at least the second lens and the fifth lens are moved nonsymmetrically, whereby the scale is continuously changed within a range of scale ratio of about 0.5 to 2.0 maintaining the same conjugate length between the object and the image as in the case of the natural size scale.

Also, the maximum value of $|f1/f0|$ is limited to 0.65 so as to prevent excessively large amount of movement length of the movable lenses whereby realizing a compact structure of the zoom lens system.

Besides, the minimum value of $|f1/f0|$ is limited to 0.4 so as to prevent a large aberration which is apt to occur with regard to the first lens and the sixth lens.

Further, the maximum value and the minimum value of $|f3/f0|$ are limited to 1.4 and 0.7, respectively, so as to obtain an appropriate Petzval's sum and prevent generation of astigmatism and curvature of field as well as to prevent degradation of MTF (modulation trandfer function).

Also, in accordance with the second zoom lens structure of the present invention, the zoom lens comprises six lenses constituting six groups, wherein at the time of forming an image of an object on the natural size scale, the groups of lenses are disposed symmetrically with respect to the aperture stop in such a way that the lens arrangement satisfies the following conditions, i.e., $$0.4 < |f1/f0| < 0.7$$

and $$0.3 < f2/f0 < 0.45$$

wherein f1 designates a focal length of the first lens, f2 designates a focal length of the second lens and f0 designates a combined focal length of the whole lens system for the natural size scale. In the conditions described above, f1 and f2 may be substituted by f6 and f5, respectively, which designate focal length of the sixth and fifth lenses, respectively.

On the other hand, at the time of forming an image of an object on a magnified or reduced scale varied from the exact size with regard to the second zoom lens structure of the present invention, the first, third, fourth and sixth lenses are fixed while the second and fifth lenses are moved nonsymmetrically, whereby the scale is continuously changed within a range of scale ratio of about 0.5 to 2.0 maintaining the same conjugate length between the object and the image as in the case of the natural size scale.

Also, the maximum value of $|f1/f0|$ is limited to 0.7 so as to prevent excessively large amount of movement length of the movable lenses whereby realizing a compact structure of the zoom lens system.

Besides, the minimum value of $|f1/f0|$ is limited to 0.4 so as to prevent a large aberration which is apt to occur with regard to the first lens and the sixth lens.

Further, the maximum value and the minimum value of f2/f0 are limited to 0.3 and 0.45, respectively, so as to obtain an appropriate Petzval's sum and prevent generation of astigmatism and curvature of field as well as to prevent degradation of MTF.

An advantage of the zoom lens for a variable power copying apparatus in accordance with the present invention described above is that a wide range of scale ratio from about 0.5 to 2.0 (or even from 0.36 to 2.8) can be obtained with the conjugate length from the object to the image being maintained constant, which makes it unnecessary to equip the drive means linked with the zoom lens system for driving to move the reflection mirror along with the zoom lens of the prior art, thus simplifying the whole structure of the variable power copying apparatus.

Also, another advantage of the present invention is that an image of high quality can be obtained with a simple structure composed of six lens groups comprising six lenses when copying on a reduced or magnified scale as well as the natural size scale. More precisely, as described later with reference to the embodiments of the invention, optical characteristics on the optical axis and outer the axis are appropriately balanced not only for the natural size scale but also for reduced or magnified scale. With regard to coma aberration, undesirable flare components are minimized even when the vignetting factor is 100 percent. Also, MTF characteristic of the structure of the present invention represents a very high contrast for the reduced or magnified scale as well as the natural size scale, which upgrades the picture quality of the finally obtained hard copy.

Still another advantage of the present invention is that the productivity of the zoom lens is high and production control is easy since the zoom lens system comprises three pairs of the same lenses, which makes it possible to reduce the manufacturing cost thereof.

Further objects and advantages of the present invention will be apparent from the following description of the preferred embodiments of the invention as illustrated in the accompanying drawings.

BRIEF DESCRIPTION OF THE DRAWINGS

FIG. 3a-1 is a graphical view for explaining spherical aberration of the zoom lens of the first embodiment at the time of forming a magnified size image;

FIG. 3a-2 is a graphical view for explaining astigmatism aberration of the zoom lens of the first embodiment at the time of forming a magnified size image;

FIG. 3a-3 is a graphical view for explaining distortion aberration of the zoom lens of the first embodiment at the time of forming a magnified size image;

FIG. 3b-1 is a graphical view for explaining spherical aberration of the zoom lens of the first embodiment at the time of forming a natural size image;

FIG. 3b-2 is a graphical view for explaining astigmatism aberration of the zoom lens of the first embodiment at the time of forming a natural size image;

FIG. 3b-3 is a graphical view for explaining distortion aberration of the zoom lens of the first embodiment at the time of forming a natural size image;

FIG. 3c-1 is a graphical view for explaining spherical aberration of the zoom lens of the first embodiment at the time of forming a reduced size image;

FIG. 3c-2 is a graphical view for explaining astigmatism aberration of the zoom lens of the first embodiment at the time of forming a reduced size image;

FIG. 3c-3 is a graphical view for explaining distortion aberration of the zoom lens of the first embodiment at the time of forming a reduced size image;

FIG. 4a is a graphical view for explaining coma aberration of the zoom lens of the first embodiment at the time of forming a magnified size image;

FIG. 7a-1 is a graphical view for explaining spherical aberration of the zoom lens of the second embodiment at the time of forming a magnified size image;

FIG. 7a-2 is a graphical view for explaining astigmatism aberration of the zoom lens of the second embodiment at the time of forming a magnified size image;

FIG. 7a-3 is a graphical view for explaining distortion aberration of the zoom lens of the second embodiment at the time of forming a magnified size image;

FIG. 7b-1 is a graphical view for explaining spherical aberration of the zoom lens of the second embodiment at the time of forming a natural size image;

FIG. 7b-2 is a graphical view for explaining astigmatism aberration of the zoom lens of the second embodiment at the time of forming a natural size image;

FIG. 7b-3 is a graphical view for explaining distortion aberration of the zoom lens of the second embodiment at the time of forming a natural size image;

FIG. 7c-1 is a graphical view for explaining spherical aberration of the zoom lens of the second embodiment at the time of forming a reduced size image;

FIG. 7c-2 is a graphical view for explaining astigmatism aberration of the zoom lens of the second embodiment at the time of forming a reduced size image;

FIG. 7c-3 is a graphical view for explaining distortion aberration of the zoom lens of the second embodiment at the time of forming a reduced size image;

FIG. 8a is a graphical view for explaining coma aberration of the zoom lens of the second embodiment at the time of forming a magnified size image;

FIG. 11a-1 is a graphical view for explaining spherical aberration of the zoom lens of the third embodiment at the time of forming a magnified size image;

FIG. 11a-2 is a graphical view for explaining astigmatism aberration of the zoom lens of the third embodiment at the time of forming a magnified size image;

FIG. 11a-3 is a graphical view for explaining distortion aberration of the zoom lens of the third embodiment at the time of forming a magnified size image;

FIG. 11b-1 is a graphical view for explaining spherical aberration of the zoom lens of the third embodiment at the time of forming a natural size image;

FIG. 11b-2 is a graphical view for explaining astigmatism aberration of the zoom lens of the third embodiment at the time of forming a natural size image;

FIG. 11b-3 is a graphical view for explaining distortion aberration of the zoom lens of the third embodiment at the time of forming a natural size image;

FIG. 11c-1 is a graphical view for explaining spherical aberration of the zoom lens of the third embodiment at the time of forming a reduced size image;

FIG. 11c-2 is a graphical view for explaining astigmatism aberration of the zoom lens of the third embodiment at the time of forming a reduced size image;

FIG. 11c-3 is a graphical view for explaining distortion aberration of the zoom lens of the third embodiment at the time of forming a reduced size image;

FIG. 15a-1 is a graphical view for explaining spherical aberration of the zoom lens of the fourth embodiment at the time of forming a magnified size image;

FIG. 15a-2 is a graphical view for explaining astigmatism aberration of the zoom lens of the fourth embodiment at the time of forming a magnified size image;

FIG. 15a-3 is a graphical view for explaining distortion aberration of the zoom lens of the fourth embodiment at the time of forming a magnified size image;

FIG. 15b-1 is a graphical view for explaining spherical aberration of the zoom lens of the fourth embodiment at the time of forming a natural size image;

FIG. 15b-2 is a graphical view for explaining astigmatism aberration of the zoom lens of the fourth embodiment at the time of forming a natural size image;

FIG. 15b-3 is a graphical view for explaining distortion aberration of the zoom lens of the fourth embodiment at the time of forming a natural size image;

FIG. 15c-1 is a graphical view for explaining spherical aberration of the zoom lens of the fourth embodiment at the time of forming a reduced size image;

FIG. 15c-2 is a graphical view for explaining astigmatism aberration of the zoom lens of the fourth embodiment at the time of forming a reduced size image;

FIG. 15c-3 is a graphical view for explaining distortion aberration of the zoom lens of the fourth embodiment at the time of forming a reduced size image;

FIG. 16a is a graphical view for explaining coma aberration of the zoom lens of the fourth embodiment at the time of forming a magnified size image;

FIG. 19a-1 is a graphical view for explaining spherical aberration of the zoom lens of the fifth embodiment at the time of forming a magnified size image;

FIG. 19a-2 is a graphical view for explaining astigmatism aberration of the zoom lens of the fifth embodiment at the time of forming a magnified size image;

FIG. 19a-3 is a graphical view for explaining distortion aberration of the zoom lens of the fifth embodiment at the time of forming a magnified size image;

FIG. 19b-1 is a graphical view for explaining spherical aberration of the zoom lens of the fifth embodiment at the time of forming a natural size image;

FIG. 19b-2 is a graphical view for explaining astigmatism aberration of the zoom lens of the fifth embodiment at the time of forming a natural size image;

FIG. 19b-3 is a graphical view for explaining distortion aberration of the zoom lens of the fifth embodiment at the time of forming a natural size image;

FIG. 19c-1 is a graphical view for explaining spherical aberration of the zoom lens of the fifth embodiment at the time of forming a reduced size image;

FIG. 19c-2 is a graphical view for explaining astigmatism aberration of the zoom lens of the fifth embodiment at the time of forming a reduced size image;

FIG. 19c-3 is a graphical view for explaining distortion aberration of the zoom lens of the fifth embodiment at the time of forming a reduced size image;

FIG. 20a is a graphical view for explaining coma aberration of the zoom lens of the fifth embodiment at the time of forming a magnified size image;

FIG. 23a-1 is a graphical view for explaining spherical aberration of the zoom lens of the sixth embodiment at the time of forming a magnified size image;

FIG. 23a-2 is a graphical view for explaining astigmatism aberration of the zoom lens of the sixth embodiment at the time of forming a magnified size image;

FIG. 23a-3 is a graphical view for explaining distortion aberration of the zoom lens of the sixth embodiment at the time of forming a magnified size image;

FIG. 23b-1 is a graphical view for explaining spherical aberration of the zoom lens of the sixth embodiment at the time of forming a natural size image;

FIG. 23b-2 is a graphical view for explaining astigmatism aberration of the zoom lens of the sixth embodiment at the time of forming a natural size image;

FIG. 23b-3 is a graphical view for explaining distortion aberration of the zoom lens of the sixth embodiment at the time of forming a natural size image;

FIG. 23c-1 is a graphical view for explaining spherical aberration of the zoom lens of the sixth embodiment at the time of forming a reduced size image;

FIG. 23c-2 is a graphical view for explaining astigmatism aberration of the zoom lens of the sixth embodiment at the time of forming a reduced size image;

FIG. 23c-3 is a graphical view for explaining distortion aberration of the zoom lens of the sixth embodiment at the time of forming a reduced size image;

FIG. 28a-1 is a graphical view for explaining spherical aberration of the zoom lens of the seventh embodiment at the time of forming a magnified size image;

FIG. 28a-2 is a graphical view for explaining astigmatism aberration of the zoom lens of the seventh embodiment at the time of forming a magnified size image;

FIG. 28a-3 is a graphical view for explaining distortion aberration of the zoom lens of the seventh embodiment at the time of forming a magnified size image;

FIG. 28b-1 is a graphical view for explaining spherical aberration of the zoom lens of the seventh embodiment at the time of forming a natural size image;

FIG. 28b-2 is a graphical view for explaining astigmatism aberration of the zoom lens of the seventh embodiment at the time of forming a natural size image;

FIG. 28b-3 is a graphical view for explaining distortion aberration of the zoom lens of the seventh embodiment at the time of forming a natural size image;

FIG. 28c-1 is a graphical view for explaining spherical aberration of the zoom lens of the seventh embodiment at the time of forming a reduced size image;

FIG. 28c-2 is a graphical view for explaining astigmatism aberration of the zoom lens of the seventh embodiment at the time of forming a reduced size image;

FIG. 28c-3 is a graphical view for explaining distortion aberration of the zoom lens of the seventh embodiment at the time of forming a reduced size image;

FIG. 29a is a graphical view for explaining coma aberration of the zoom lens of the seventh embodiment at the time of forming a magnified size image;

FIG. 29b is a graphical view for explaining coma aberration of the zoom lens of the seventh embodiment at the time of forming a natural size image;

FIG. 29c is a graphical view for explaining coma aberration of the zoom lens of the seventh embodiment at the time of forming a reduced size image;

FIG. 30a is a constructional view for explaining the structure of a eighth embodiment of the zoom lens for a variable copying apparatus in accordance with the present invention at the time of forming a magnified size image;

FIG. 30b is a constructional view for explaining the structure of the zoom lens of the eighth embodiment of the present invention at the time of forming a natural size image;

FIG. 30c is a constructional view for explaining the structure of the zoom lens of the eighth embodiment of the present invention at the time of forming a reduced size image;

FIG. 31a-1 is a graphical view for explaining spherical aberration of the zoom lens of the eighth embodiment at the time of forming a magnified size image;

FIG. 31a-2 is a graphical view for explaining astigmatism aberration of the zoom lens of the eighth embodiment at the time of forming a magnified size image;

FIG. 31a-3 is a graphical view for explaining distortion aberration of the zoom lens of the eighth embodiment at the time of forming a magnified size image;

Figure 1:
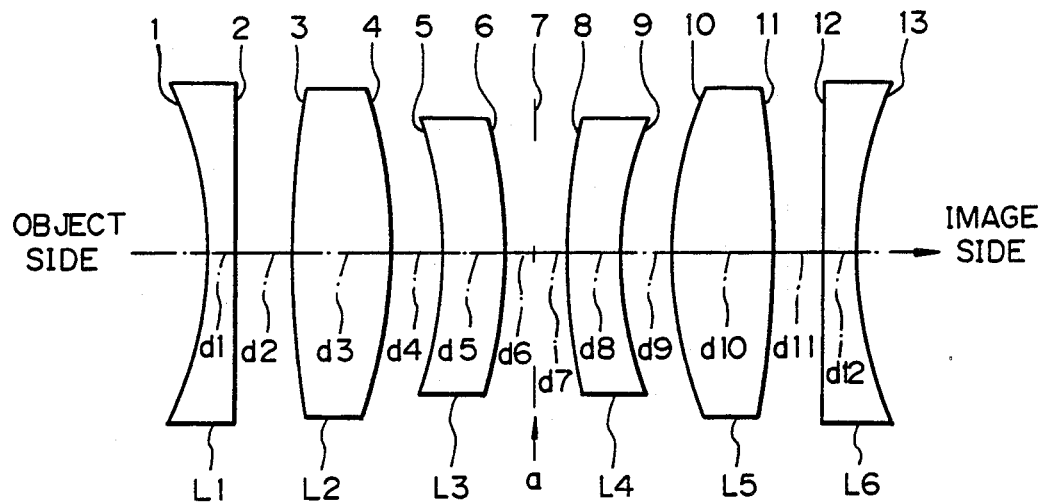
FIG. 1 is a constructional view of a first essential structure of a zoom lens for a variable power copying apparatus in accordance with the present invention.
Figures 1, 2, 3, 3A:
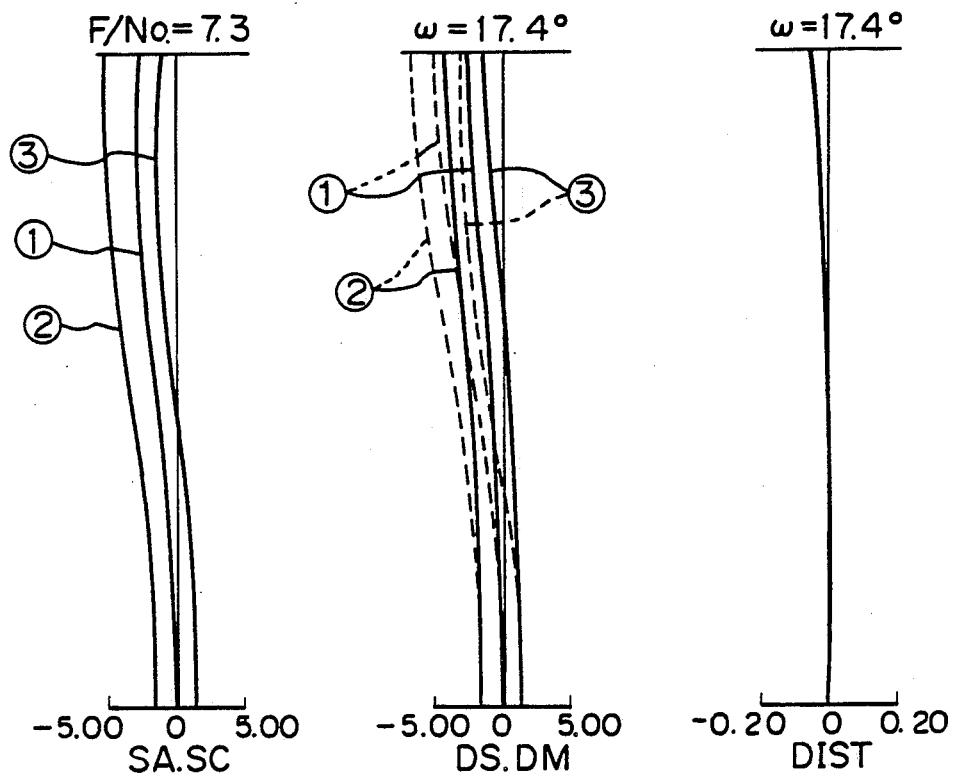
Figure 32A:
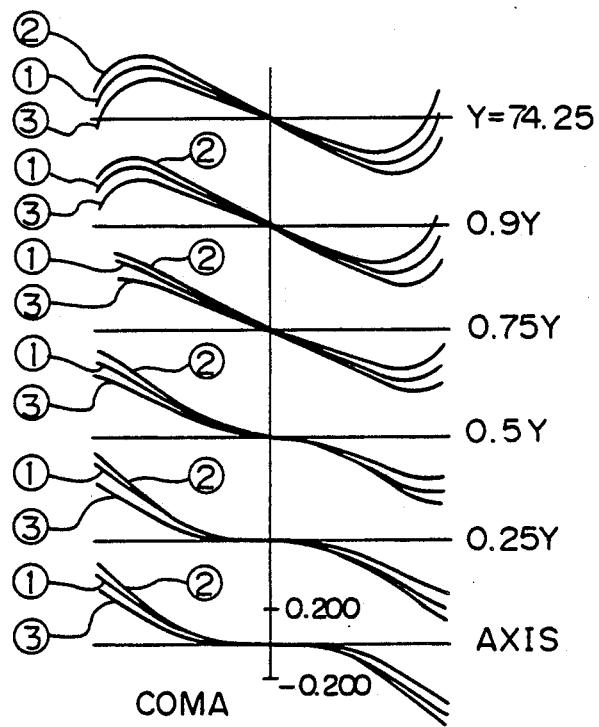
Figure 32B:
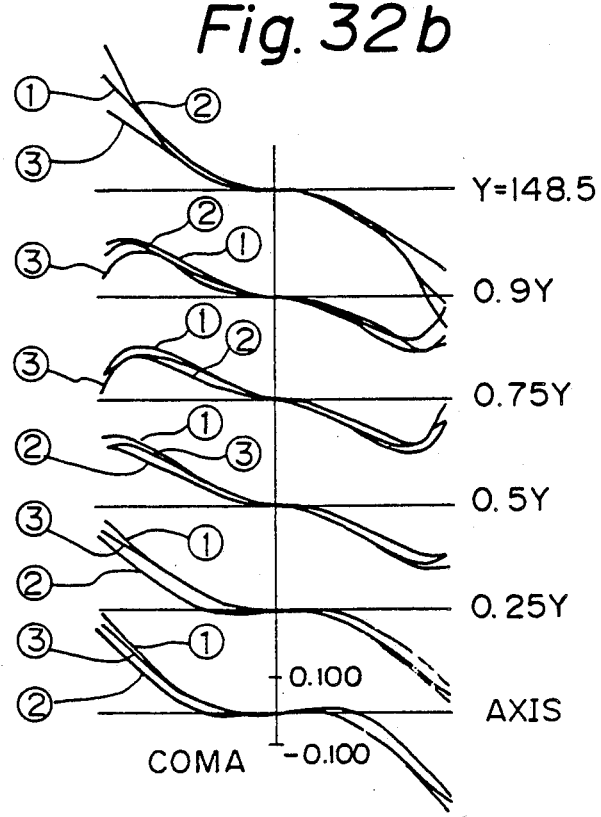
Figure 32C:
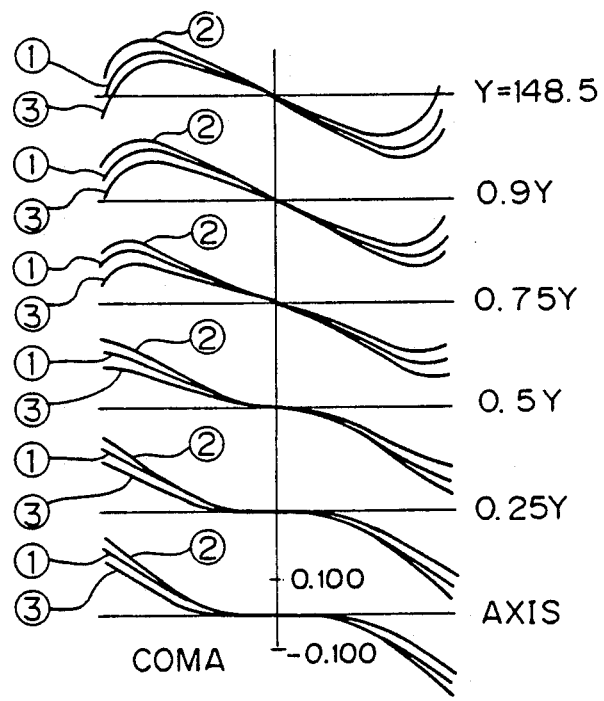
Figure 33A:
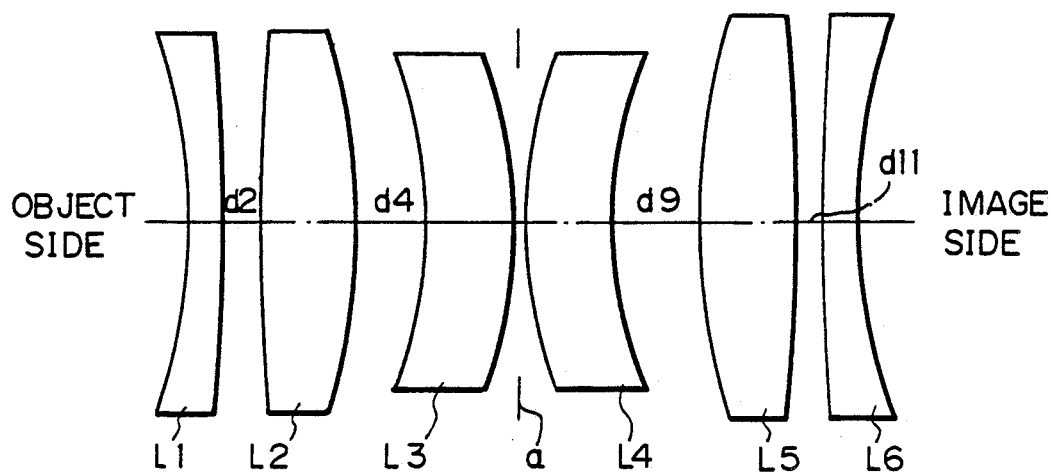
Figure 33B:
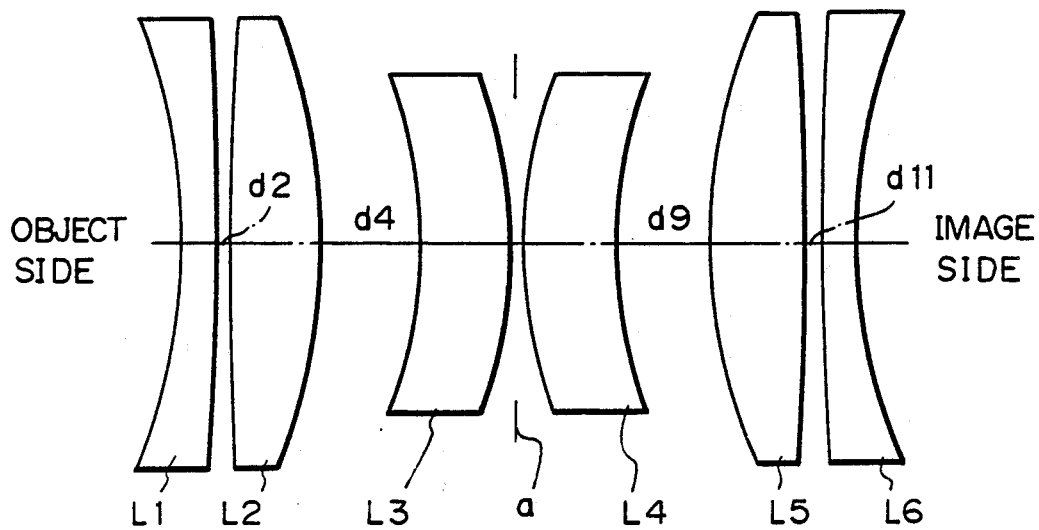
Figure 33C:
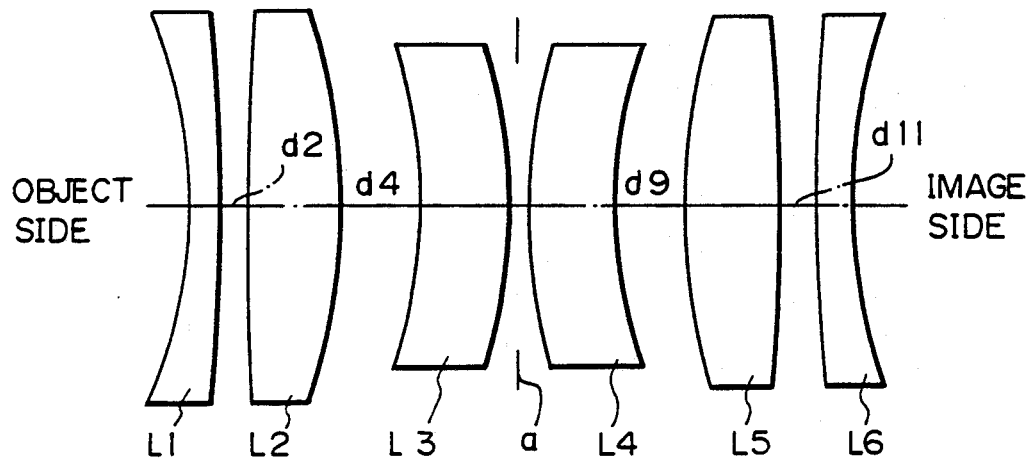
Figures 1, 2, 3, 34A:
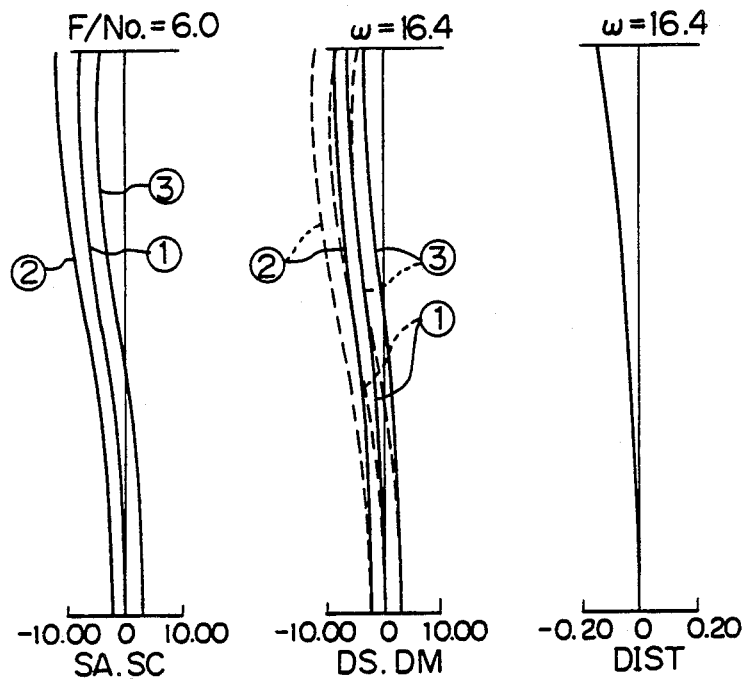
Figures 1, 2, 3, 34B:
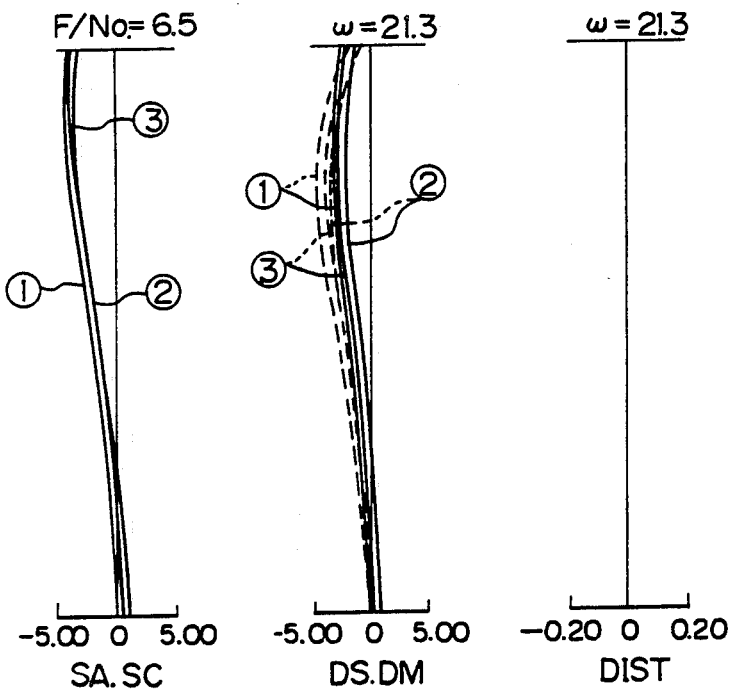
Figures 1, 2, 3, 34C:
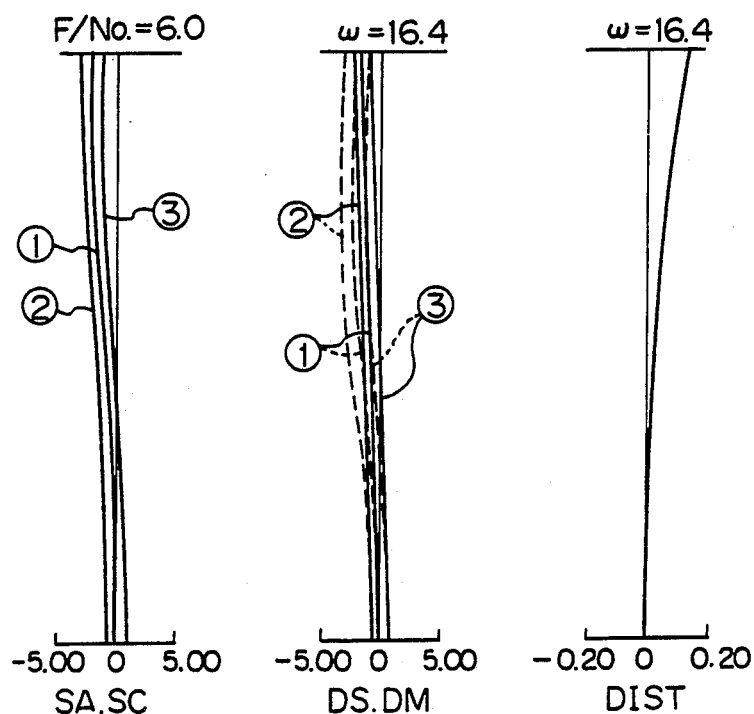
Figure 35A:
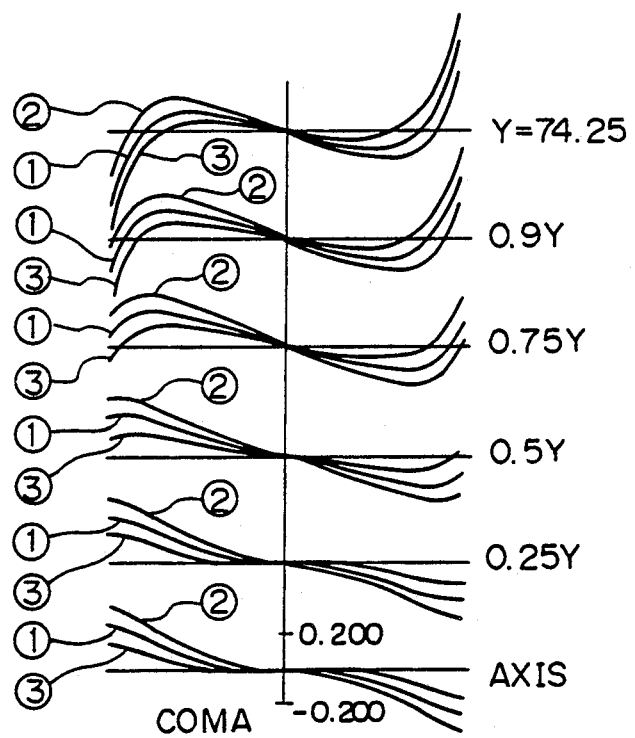
Figure 35B:
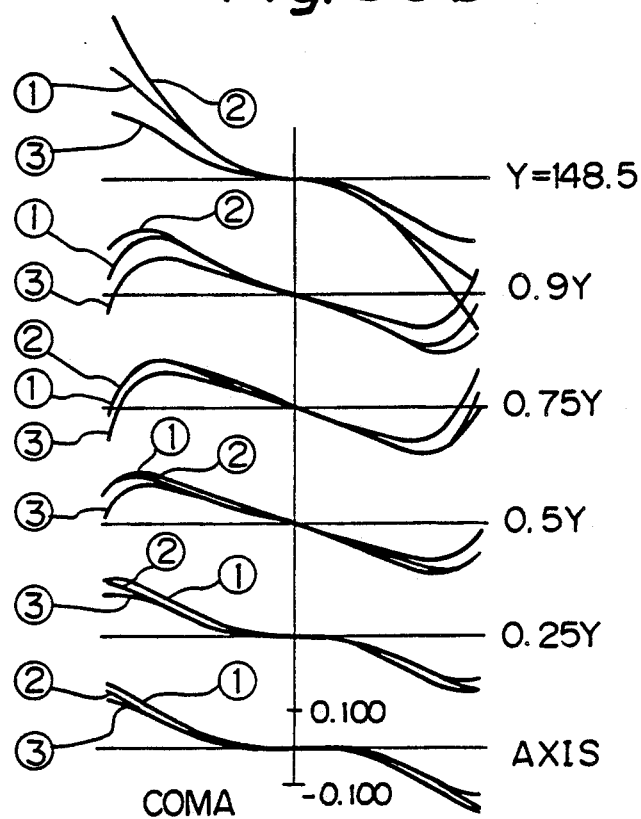
Figure 35C:
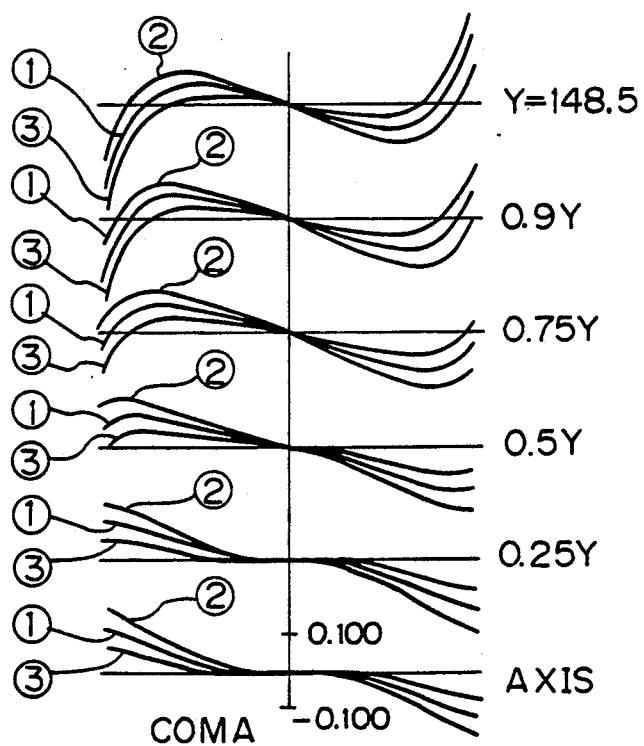
Figure 36A:
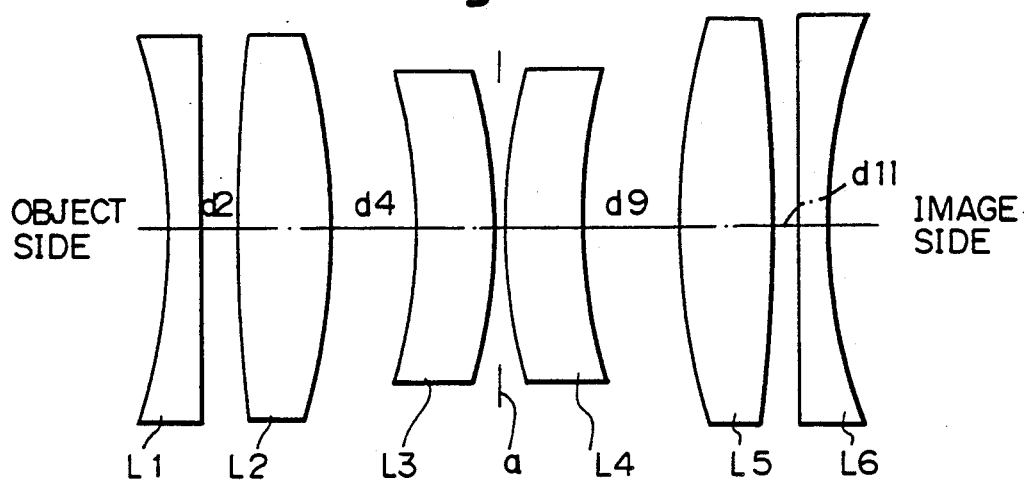
Figure 36B:
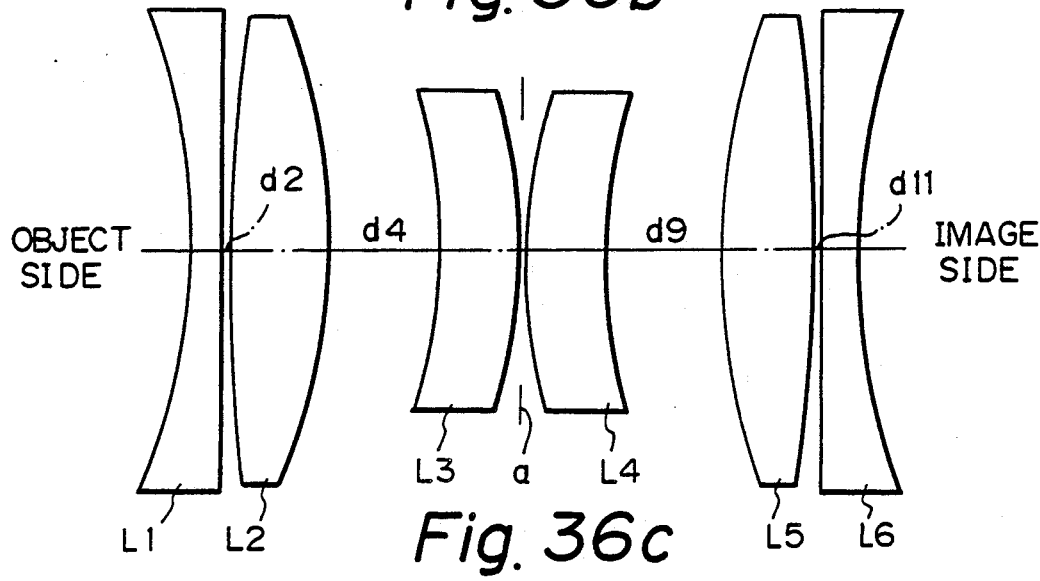
Figure 36C:
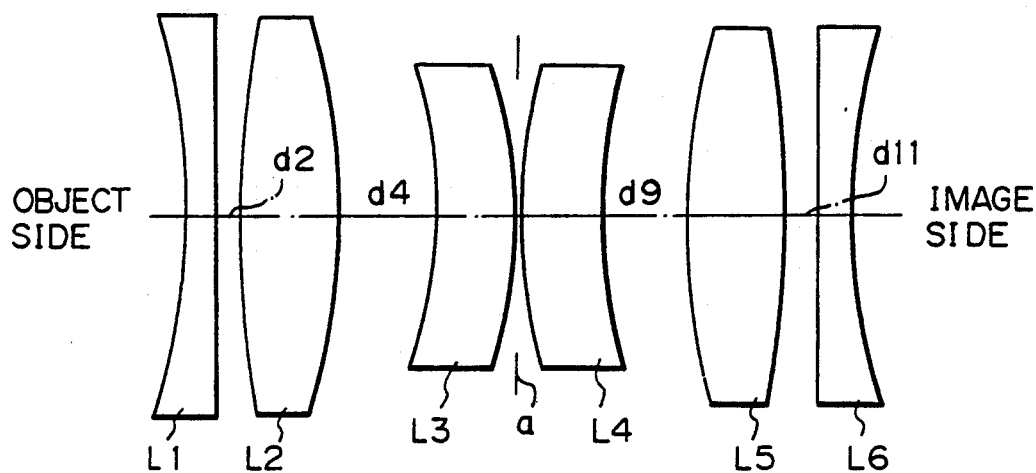
Figures 1, 2, 3, 37C:
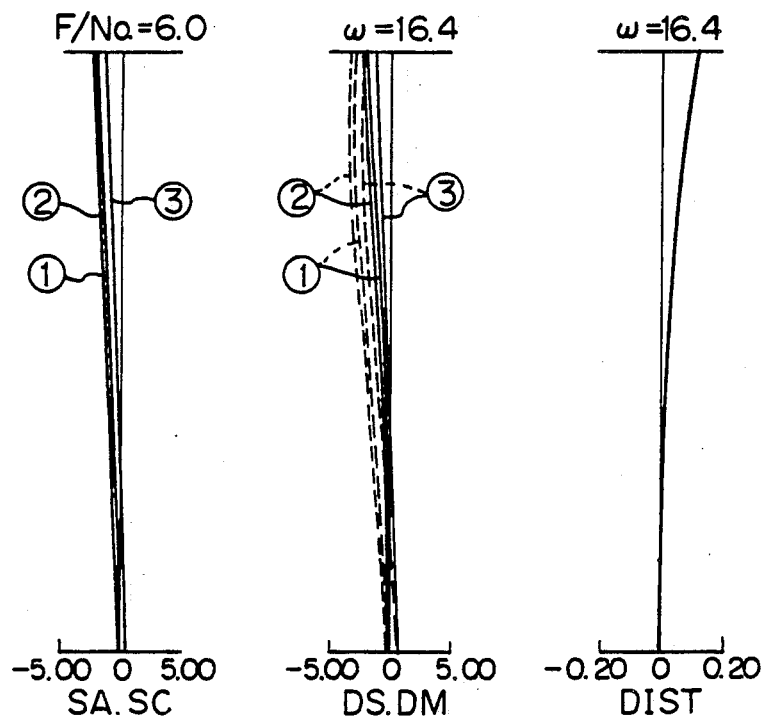
Figure 38A:
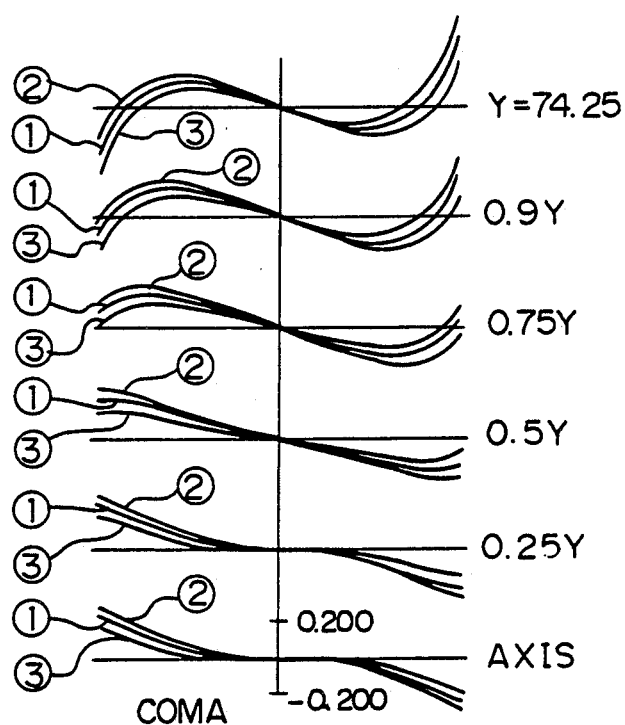
Figure 38B:
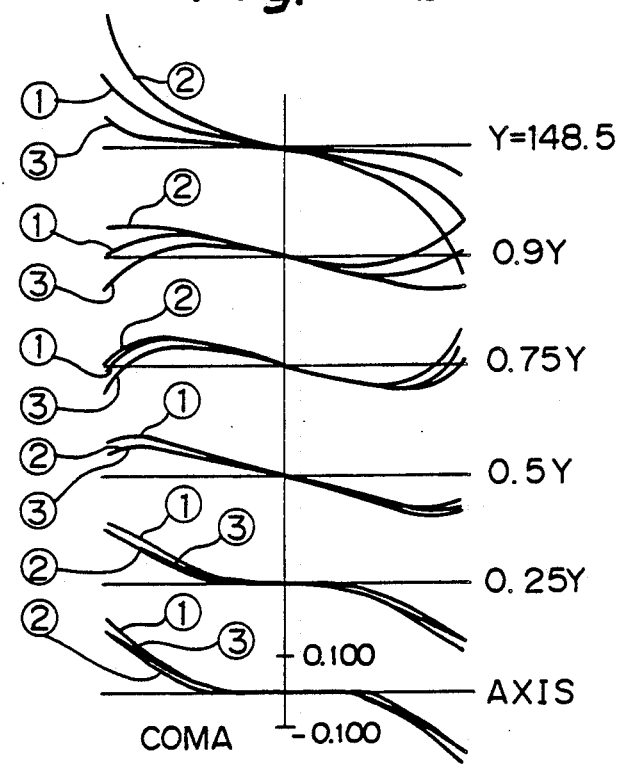
Figure 38C:
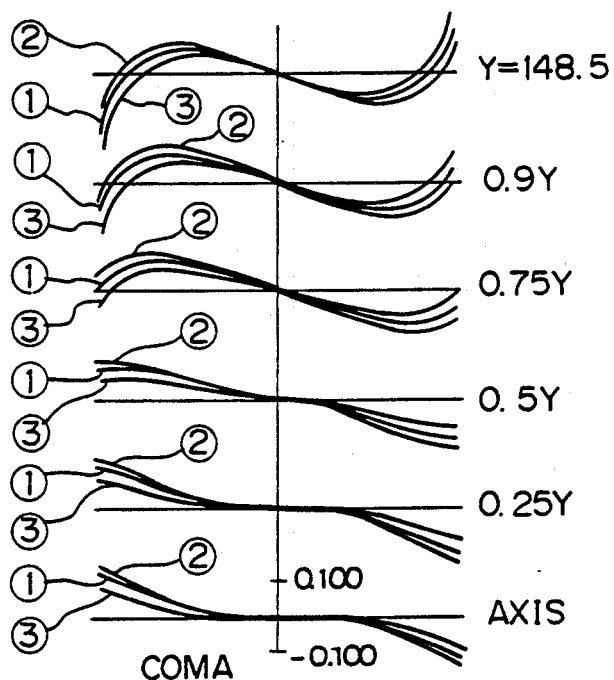
Figures 1, 2, 3, 40A:
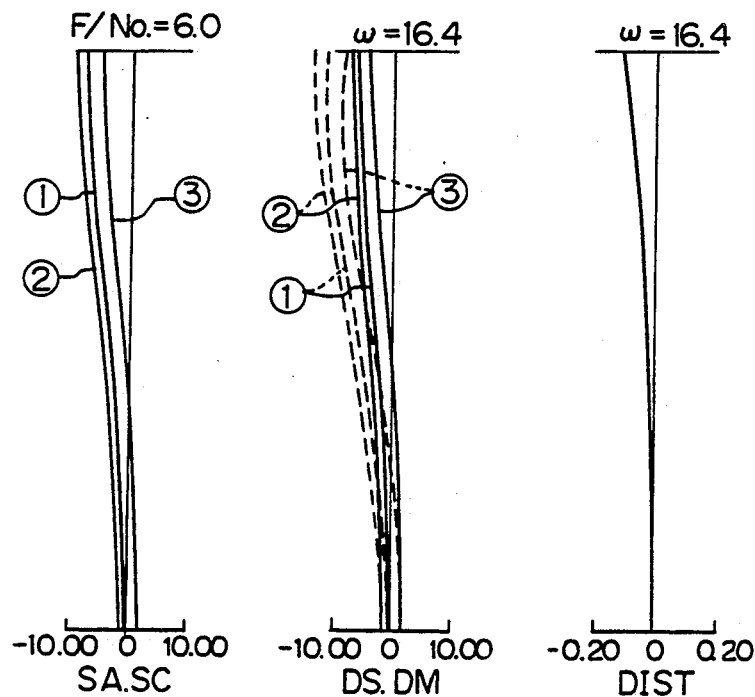
Figures 1, 2, 3, 40B:
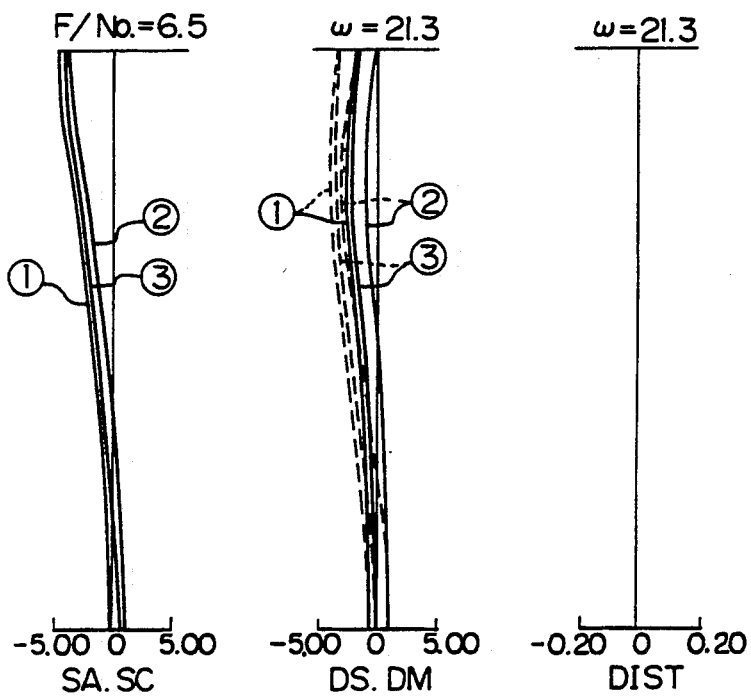
Figure 41B:
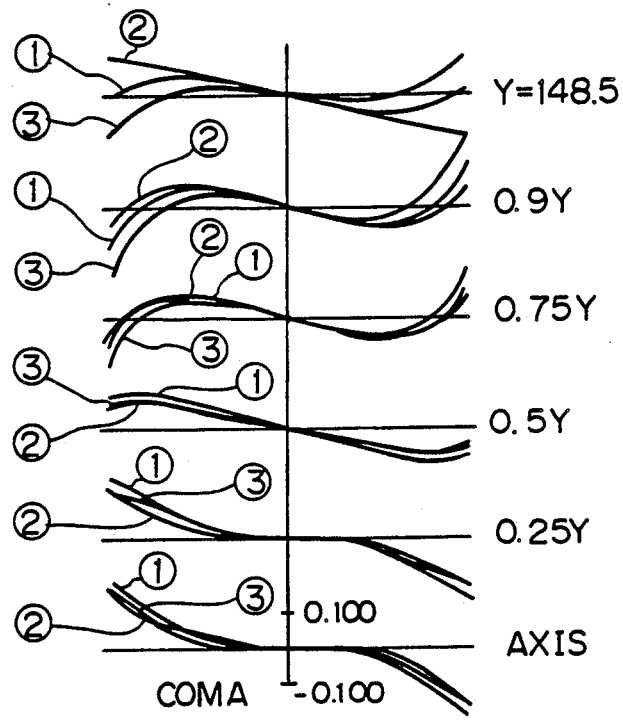
Figure 41C:
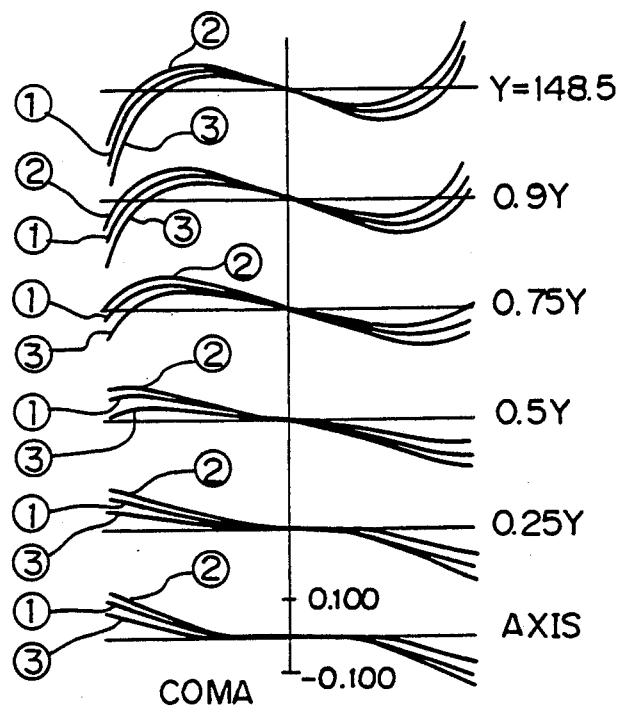
Figure 42D:
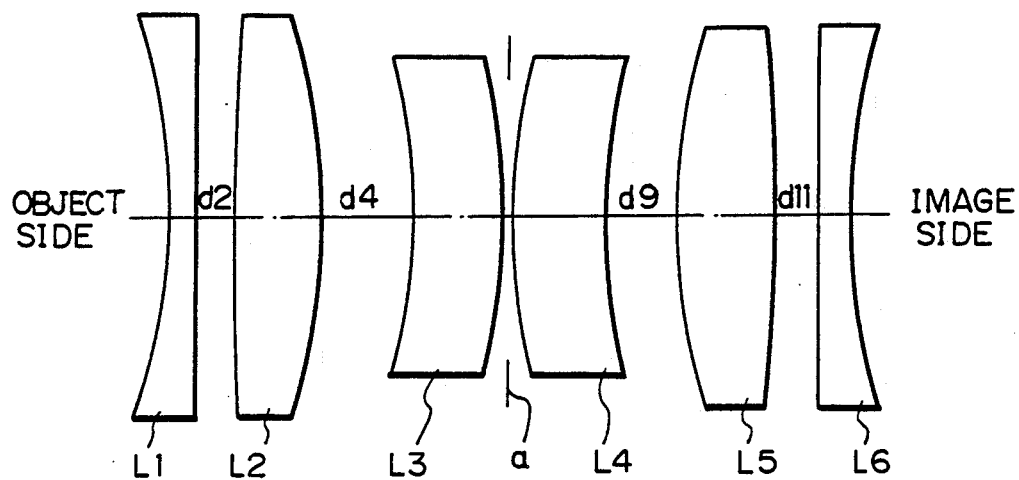
Figure 42E:
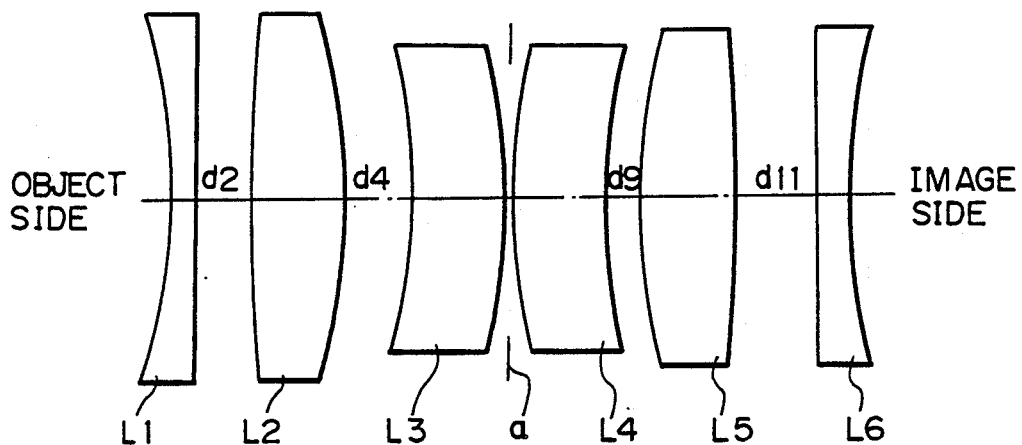
Figures 1, 2, 3, 43A:
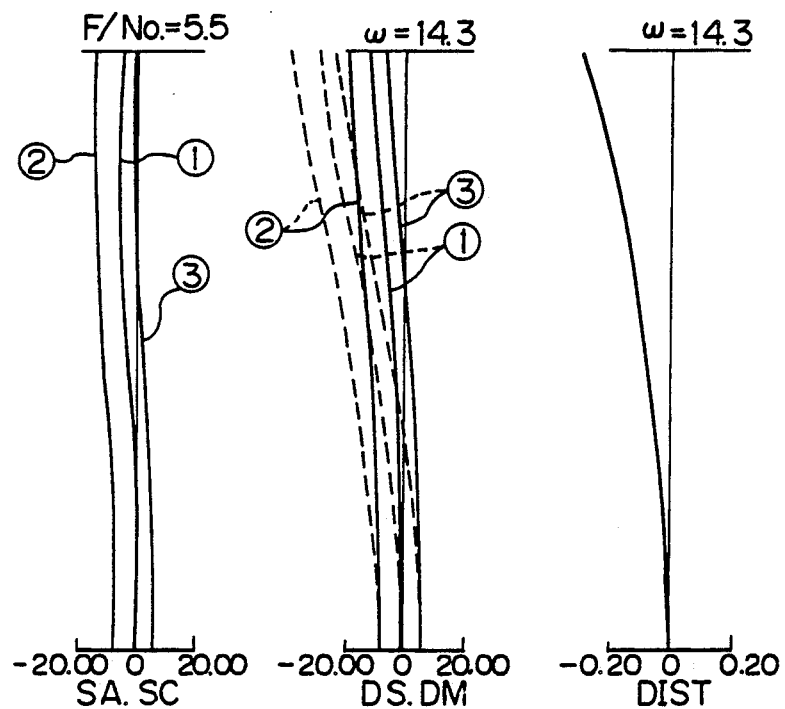
Figures 1, 2, 3, 43B:
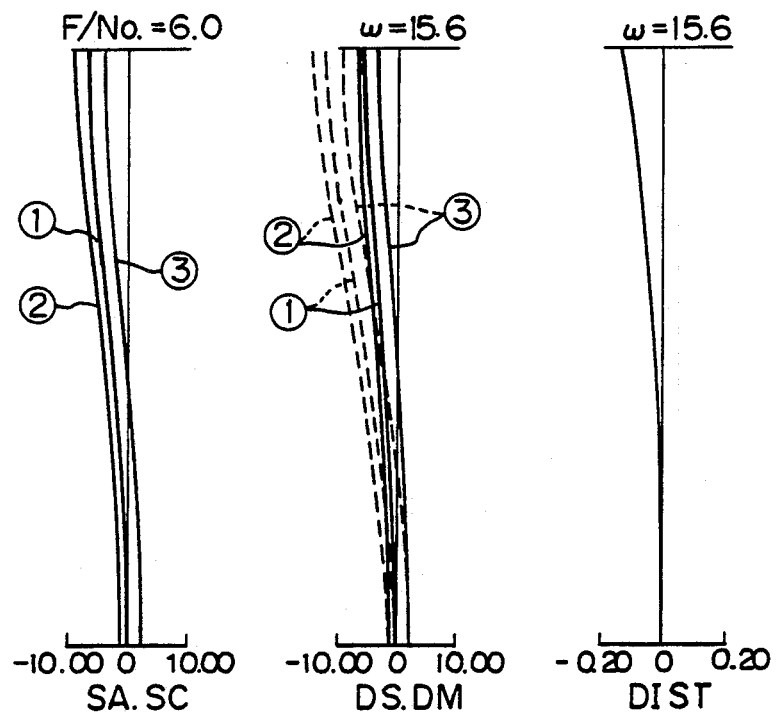
Figures 1, 2, 3, 43E:
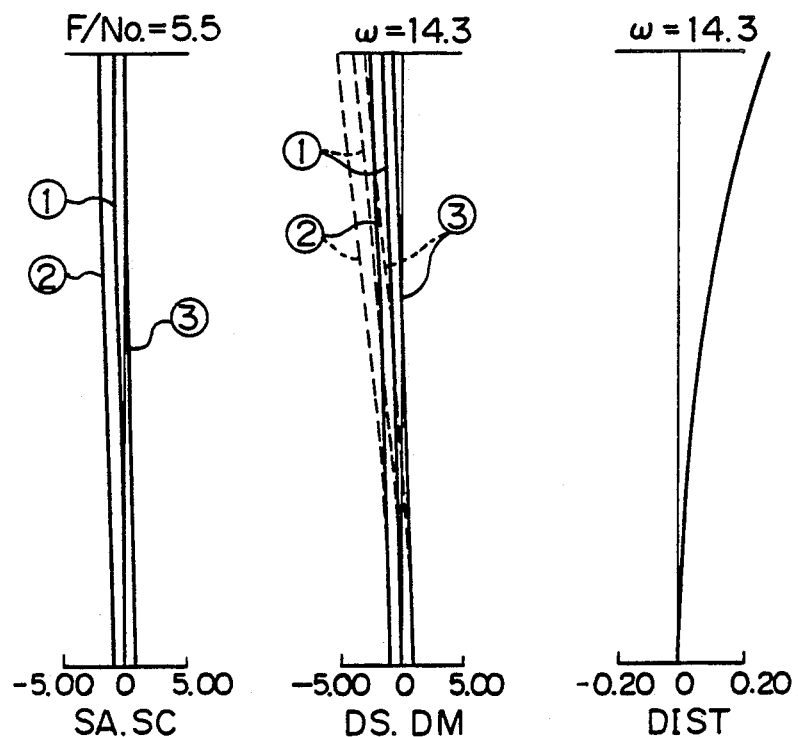
Figure 44A:
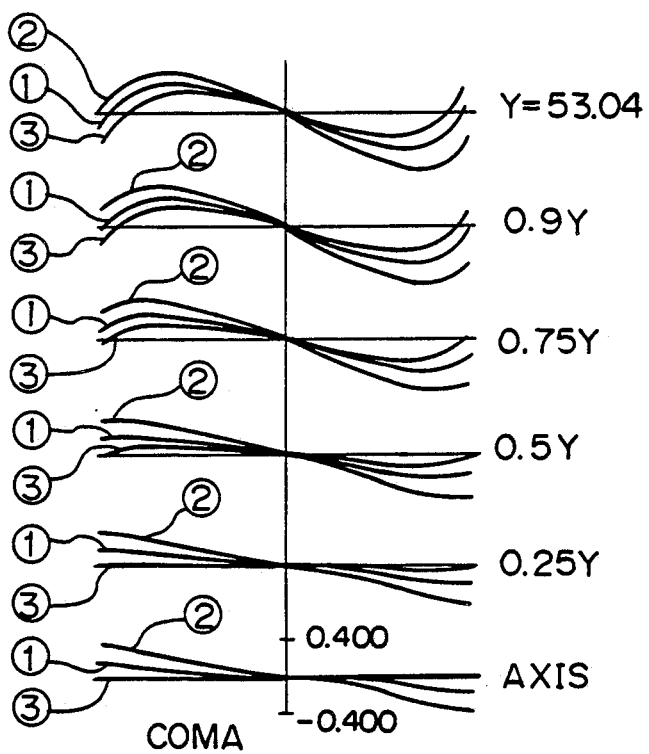
Figure 44B:
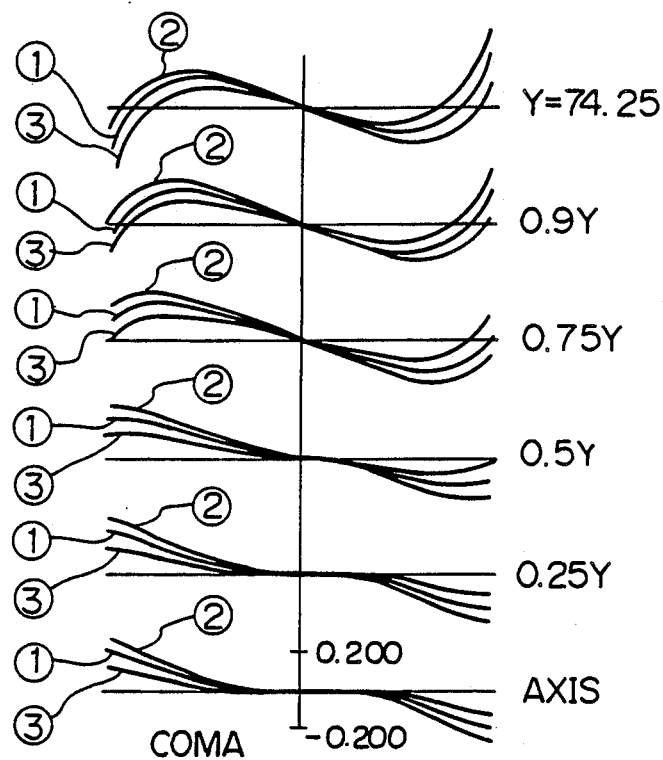
Figure 44C:
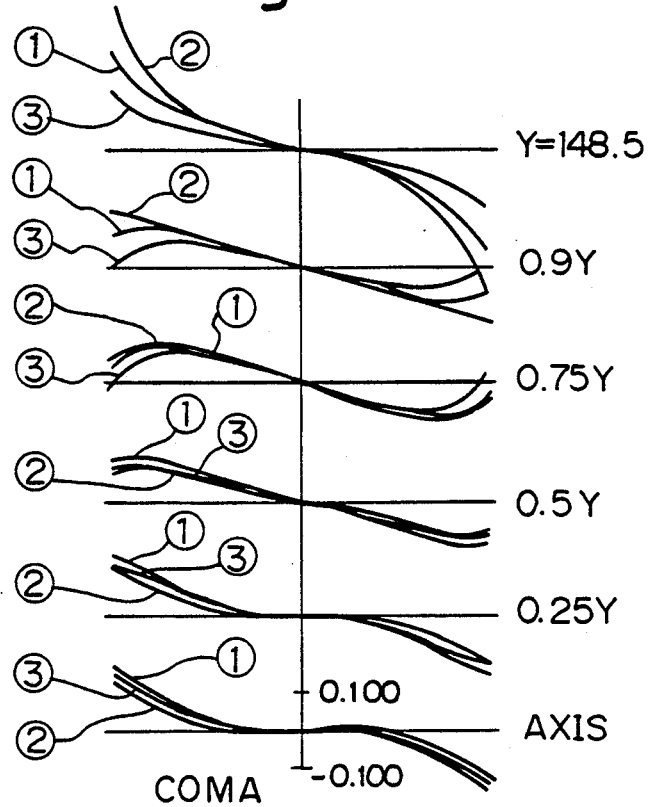
Figure 44D:
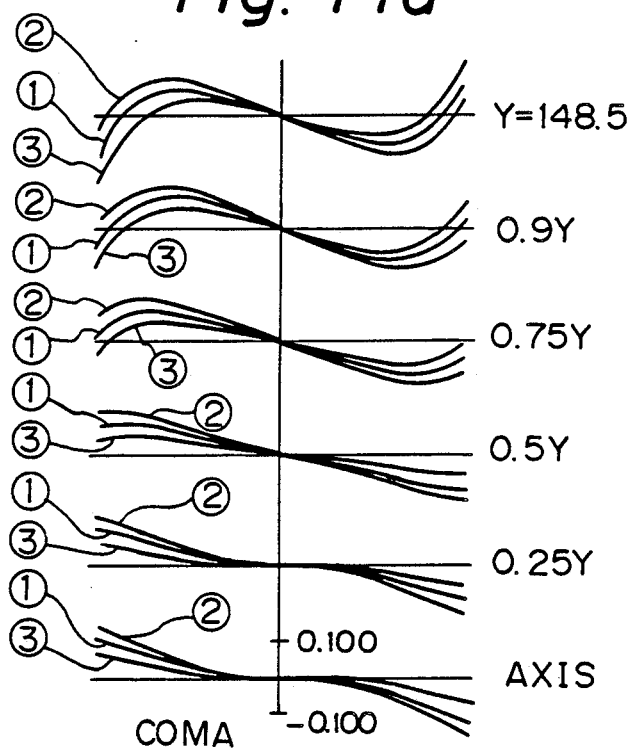
Figure 44E:
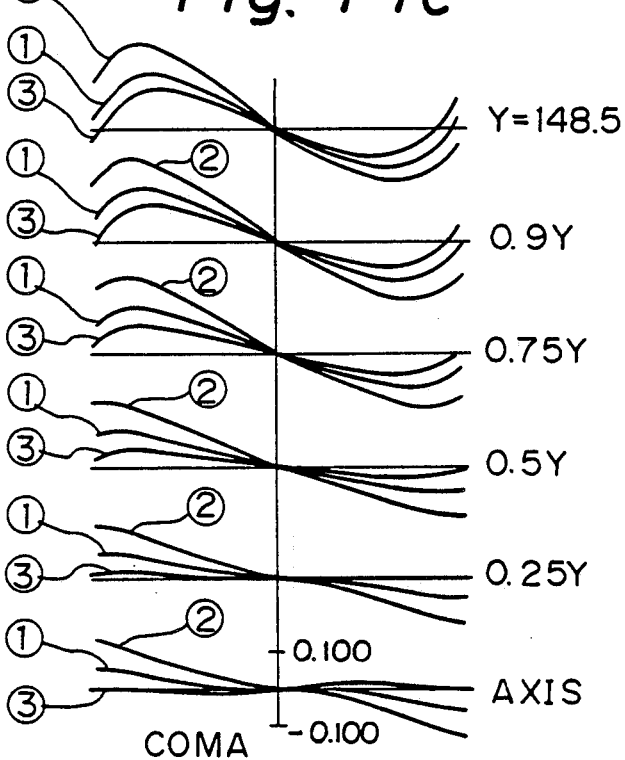

FIG. 31b-1 is a graphical view for explaining spherical aberration of the zoom lens of the eighth embodiment at the time of forming a natural size image;

FIG. 31b-2 is a graphical view for explaining astigmatism aberration of the zoom lens of the eighth embodiment at the time of forming a natural size image;

FIG. 31b-3 is a graphical view for explaining distortion aberration of the zoom lens of the eighth embodiment at the time of forming a natural size image;

FIG. 31c-1 is a graphical view for explaining spherical aberration of the zoom lens of the eighth embodiment at the time of forming a reduced size image;

FIG. 31c-2 is a graphical view for explaining astigmatism aberration of the zoom lens of the eighth embodiment at the time of forming a reduced size image;

FIG. 31c-3 is a graphical view for explaining distortion aberration of the zoom lens of the eighth embodiment at the time of forming a reduced size image;

FIG. 32a is a graphical view for explaining coma aberration of the zoom lens of the eighth embodiment at the time of forming a magnified size image;

FIG. 32b is a graphical view for explaining coma aberration of the zoom lens of the eighth embodiment at the time of forming a natural size image;

FIG. 32c is a graphical view for explaining coma aberration of the zoom lens of the eighth embodiment at the time of forming a reduced size image;

FIG. 33a is a constructional view for explaining the structure of a ninth embodiment of the zoom lens for a variable copying apparatus in accordance with the present invention at the time of forming a magnified size image;

FIG. 33b is a constructional view for explaining the structure of the zoom lens of the ninth embodiment of the present invention at the time of forming a natural size image;

FIG. 33c is a constructional view for explaining the structure of the zoom lens of the ninth embodiment of the present invention at the time of forming a reduced size image;

FIG. 34a-1 is a graphical view for explaining spherical aberration of the zoom lens of the ninth embodiment at the time of forming a magnified size image;

FIG. 34a-2 is a graphical view for explaining astigmatism aberration of the zoom lens of the ninth embodiment at the time of forming a magnified size image;

FIG. 34a-3 is a graphical view for explaining distortion aberration of the zoom lens of the ninth embodiment at the time of forming a magnified size image;

FIG. 34b-1 is a graphical view for explaining spherical aberration of the zoom lens of the ninth embodiment at the time of forming a natural size image;

FIG. 34b-2 is a graphical view for explaining astigmatism aberration of the zoom lens of the ninth embodiment at the time of forming a natural size image;

FIG. 34b-3 is a graphical view for explaining distortion aberration of the zoom lens of the ninth embodiment at the time of forming a natural size image;

FIG. 34c-1 is a graphical view for explaining spherical aberration of the zoom lens of the ninth embodiment at the time of forming a reduced size image;

FIG. 34c-2 is a graphical view for explaining astigmatism aberration of the zoom lens of the ninth embodiment at the time of forming a reduced size image;

FIG. 34c-3 is a graphical view for explaining distortion aberration of the zoom lens of the ninth embodiment at the time of forming a reduced size image;

FIG. 35a is a graphical view for explaining coma aberration of the zoom lens of the ninth embodiment at the time of forming a magnified size image;

FIG. 35b is a graphical view for explaining coma aberration of the zoom lens of the ninth embodiment at the time of forming a natural size image;

FIG. 35c is a graphical view for explaining coma aberration of the zoom lens of the ninth embodiment at the time of forming a reduced size image;

FIG. 36a is a constructional view for explaining the structure of a tenth embodiment of the zoom lens for a variable copying apparatus in accordance with the present invention at the time of forming a magnified size image;

FIG. 36b is a constructional view for explaining the structure of the zoom lens of the tenth embodiment of the present invention at the time of forming a natural size image;

FIG. 36c is a constructional view for explaining the structure of the zoom lens of the tenth embodiment of the present invention at the time of forming a reduced size image;

FIG. 37a-1 is a graphical view for explaining spherical aberration of the zoom lens of the tenth embodiment at the time of forming a magnified size image;

FIG. 37a-2 is a graphical view for explaining astigmatism aberration of the zoom lens of the tenth embodiment at the time of forming a magnified size image;

FIG. 37a-3 is a graphical view for explaining distortion aberration of the zoom lens of the tenth embodiment at the time of forming a magnified size image;

FIG. 37b-1 is a graphical view for explaining spherical aberration of the zoom lens of the tenth embodiment at the time of forming a natural size image;

FIG. 37b-2 is a graphical view for explaining astigmatism aberration of the zoom lens of the tenth embodiment at the time of forming a natural size image;

FIG. 37b-3 is a graphical view for explaining distortion aberration of the zoom lens of the tenth embodiment at the time of forming a natural size image;

FIG. 37c-1 is a graphical view for explaining spherical aberration of the zoom lens of the tenth embodiment at the time of forming a reduced size image;

FIG. 37c-2 is a graphical view for explaining astigmatism aberration of the zoom lens of the tenth embodiment at the time of forming a reduced size image;

FIG. 37c-3 is a graphical view for explaining distortion aberration of the zoom lens of the tenth embodiment at the time of forming a reduced size image;

FIG. 38a is a graphical view for explaining coma aberration of the zoom lens of the tenth embodiment at the time of forming a magnified size image;

FIG. 38b is a graphical view for explaining coma aberration of the zoom lens of the tenth embodiment at the time of forming a natural size image;

FIG. 38c is a graphical view for explaining coma aberration of the zoom lens of the tenth embodiment at the time of forming a reduced size image;

FIG. 39a is a constructional view for explaining the structure of an eleventh embodiment of the zoom lens for a variable copying apparatus in accordance with the present invention at the time of forming a magnified size image;

FIG. 39b is a constructional view for explaining the structure of the zoom lens of the eleventh embodiment of the present invention at the time of forming a natural size image;

FIG. 39c is a constructional view for explaining the structure of the zoom lens of the eleventh embodiment of the present invention at the time of forming a reduced size image;

FIG. 40a-1 is a graphical view for explaining spherical aberration of the zoom lens of the eleventh embodiment at the time of forming a magnified size image;

FIG. 40a-2 is a graphical view for explaining astigmatism aberration of the zoom lens of the eleventh embodiment at the time of forming a magnified size image;

FIG. 40a-3 is a graphical view for explaining distortion aberration of the zoom lens of the eleventh embodiment at the time of forming a magnified size image;

FIG. 40b-1 is a graphical view for explaining spherical aberration of the zoom lens of the eleventh embodiment at the time of forming a natural size image;

FIG. 40b-2 is a graphical view for explaining astigmatism aberration of the zoom lens of the eleventh embodiment at the time of forming a natural size image;

FIG. 40b-3 is a graphical view for explaining distortion aberration of the zoom lens of the eleventh embodiment at the time of forming a natural size image;

FIG. 40c-1 is a graphical view for explaining spherical aberration of the zoom lens of the eleventh embodiment at the time of forming a reduced size image;

FIG. 40c-2 is a graphical view for explaining astigmatism aberration of the zoom lens of the eleventh embodiment at the time of forming a reduced size image;

FIG. 40c-3 is a graphical view for explaining distortion aberration of the zoom lens of the eleventh embodiment at the time of forming a reduced size image;

FIG. 41a is a graphical view for explaining coma aberration of the zoom lens of the eleventh embodiment at the time of forming a magnified size image;

FIG. 41b is a graphical view for explaining coma aberration of the zoom lens of the eleventh embodiment at the time of forming a natural size image;

FIG. 41c is a graphical view for explaining coma aberration of the zoom lens of the eleventh embodiment at the time of forming a reduced size image;

FIG. 42a is a constructional view for explaining the structure of a twelfth embodiment of the zoom lens for a variable copying apparatus in accordance with the present invention at the time of forming a magnified size image of 2.8 magnification;

FIG. 42b is a constructional view for explaining the structure of a twelfth embodiment of the zoom lens for a variable copying apparatus in accordance with the present invention at the time of forming a magnified size image of 2.0 magnification;

FIG. 42c is a constructional view for explaining the structure of the zoom lens of the twelfth embodiment of the present invention at the time of forming a natural size image;

FIG. 42d is a constructional view for explaining the structure of the zoom lens of the twelfth embodiment of the present invention at the time of forming a reduced size image of 0.5 reduction ratio (magnification);

FIG. 42e is a constructional view for explaining the structure of the zoom lens of the twelfth embodiment of the present invention at the time of forming a reduced size image of 0.36 reduction ratio (magnification);

FIG. 43a-1 is a graphical view for explaining spherical aberration of the zoom lens of the twelfth embodiment at the time of forming a magnified size image of 2.8 magnification;

FIG. 43a-2 is a graphical view for explaining astigmatism aberration of the zoom lens of the twelfth embodiment at the time of forming a magnified size image of 2.8 magnification;

FIG. 43a-3 is a graphical view for explaining distortion aberration of the zoom lens of the twelfth embodiment at the time of forming a magnified size image of 2.8 magnification;

FIG. 43b-1 is a graphical view for explaining spherical aberration of the zoom lens of the twelfth embodiment at the time of forming a magnified size image of 2.0 magnification;

FIG. 43b-2 is a graphical view for explaining astigmatism aberration of the zoom lens of the twelfth embodiment at the time of forming a magnified size image of 2.0 magnification;

FIG. 43b-3 is a graphical view for explaining distortion aberration of the zoom lens of the twelfth embodiment at the time of forming a magnified size image of 2.0 magnification;

FIG. 43c-1 is a graphical view for explaining spherical aberration of the zoom lens of the twelfth embodiment at the time of forming a natural size image;

FIG. 43c-2 is a graphical view for explaining astigmatism aberration of the zoom lens of the twelfth embodiment at the time of forming a natural size image;

FIG. 43c-3 is a graphical view for explaining distortion aberration of the zoom lens of the twelfth embodiment at the time of forming a natural size image;

FIG. 43d-1 is a graphical view for explaining spherical aberration of the zoom lens of the twelfth embodiment at the time of forming a reduced size image of 0.5 reduction ratio;

FIG. 43d-2 is a graphical view for explaining astigmatism aberration of the zoom lens of the twelfth embodiment at the time of forming a reduced size image of 0.5 reduction ratio;

FIG. 43d-3 is a graphical view for explaining distortion aberration of the zoom lens of the twelfth embodiment at the time of forming a reduced size image of 0.5 reduction ratio;

FIG. 43e-1 is a graphical view for explaining spherical aberration of the zoom lens of the twelfth embodiment at the time of forming a reduced size image of 0.36 reduction ratio;

FIG. 43e-2 is a graphical view for explaining astigmatism aberration of the zoom lens of the twelfth embodiment at the time of forming a reduced size image of 0.36 reduction ratio;

FIG. 43e-3 is a graphical view for explaining distortion aberration of the zoom lens of the twelfth embodiment at the time of forming a reduced size image of 0.36 reduction ratio;

FIG. 44a is a graphical view for explaining coma aberration of the zoom lens of the twelfth embodiment at the time of forming a magnified size image of 2.8 magnification;

FIG. 44b is a graphical view for explaining coma aberration of the zoom lens of the twelfth embodiment at the time of forming a magnified size image of 2.0 magnification;

FIG. 44c is a graphical view for explaining coma aberration of the zoom lens of the twelfth embodiment at the time of forming a natural size image;

FIG. 44d is a graphical view for explaining coma aberration of the zoom lens of the twelfth embodiment at the time of forming a reduced size image of 0.5 reduction ratio; and FIG. 44e is a graphical view for explaining coma aberration of the zoom lens of the twelfth embodiment at the time of forming a reduced size image of 0.36 reduction ratio.

DESCRIPTION OF THE PREFERRED EMBODIMENTS

Embodiments of the zoom lens for a variable power copying apparatus in accordance with the first essential constitution of the present invention are described hereinafter with reference to the drawings.

For a start, a first embodiment of the zoom lens of the present invention is explained with reference to FIGS. 1, 2a to 2c, 3a-1 to 3c-3, 4a to 4c and 5a to 5c.

FIG. 1 illustrates an essential structure of the zoom lens in accordance with the present invention. The zoom lens is installed in, for example an electrophotographic copying apparatus and disposed between an object that is an original to be copied and an image carrier that is for example a photoconductor drum. This zoom lens comprises a first lens L1, a second lens L2, a third lens L3, an aperture stop 7, a fourth lens L4, a fifth lens L5 and a sixth lens L6 disposed in this order from the object side toward the image side. The first lens L1 is composed of a double concave lens or a meniscus concave lens (negative meniscus lens) having a concave surface 1 in the object side and a concave (or convex) surface 2 in the image side. The second lens L2 is composed of a convex lens (a double convex lens or a positive meniscus lens) having a convex (or concave) surface 3 and a convex surface 4. The third lens L3 is composed of a meniscus concave lens having a concave surface 5 in the object side and a convex surface 6 in the image side. The aperture stop 7 is disposed at a position (a) facing to the image side convex surface 6 of the third lens L3. The fourth lens L4 is disposed on the image side of the aperture stop 7 and composed of a meniscus concave lens having an object side oriented convex surface 8 which has the same shape as the convex surface 6 of the third lens L3 and an image side oriented concave surface 9 which has the same shape as the concave surface 5 of the third lens L3. The fifth lens L5 is disposed on the image side of the fourth lens L4 and composed of a convex lens (a double convex lens or a positive meniscus lens) having a convex surface 10 which has the same shape as the convex surface 4 of the second lens L2 and a convex or concave surface 11 which has the same shape as the surface 3 of the second lens L2. The sixth lens L6 is disposed on the image side of the fifth lens L5 and composed of a double concave lens or a meniscus concave lens having an object side oriented concave (or convex) surface 12 which has the same shape as the concave surface 2 of the first lens L1 and an image side oriented concave surface 13 which has the same shape as the concave surface 1 of the first lens L1.

Radii of curvature r1 to r13 of the lens surfaces 1 to 6 of the lenses L1 to L3, the aperture stop surface 7 and the lens surfaces 8 to 13 of the lenses L4 to L6 are represented in the following table along with the distances d1 to d12 between adjacent two surfaces on the optical axis, the refractive indices N1 to N6 of the lenses L1 to L6 and Abbe's number $\nu 1$ to $\nu 6$.

TABLE 1

| S. No | Radius of Curvature ri | | Distance di | | Refractive Index Ni | | Abbe's No $\nu i$ | |
|---|---|---|---|---|---|---|---|---|
| 1 | r1 | −27.158 | | | | | | |
| | | | d1 | 1.860 | N1 | 1.59551 | $\nu$ 1 | 39.2 |
| 2 | r2 | 4184.603 | | | | | | |
| | | | d2 | varibl | — | — | — | — |
| 3 | r3 | 77.969 | | | | | | |
| | | | d3 | 5.814 | N2 | 1.65844 | $\nu$ 2 | 50.9 |
| 4 | r4 | −25.635 | | | | | | |
| | | | d4 | varibl | — | — | — | — |
| 5 | r5 | −20.254 | | | | | | |
| | | | d5 | 3.142 | N3 | 1.54814 | $\nu$ 3 | 45.8 |
| 6 | r6 | −31.628 | | | | | | |
| | | | d6 | varibl | — | — | — | — |
| 7 | r7 | ∞ap.stp | | | | | | |
| | | | d7 | varibl | — | — | — | — |
| 8 | r8 | 31.628 | | | | | | |
| | | | d8 | 3.142 | N4 | 1.54814 | $\nu$ 4 | 45.8 |
| 9 | r9 | 20.254 | | | | | | |
| | | | d9 | varibl | — | — | — | — |
| 10 | r10 | 25.635 | | | | | | |
| | | | d10 | 5.814 | N5 | 1.65844 | $\nu$ 5 | 50.9 |
| 11 | r11 | −77.969 | | | | | | |
| | | | d11 | varibl | — | — | — | — |
| 12 | r12 | −4184.603 | | | | | | |
| | | | d12 | 1.860 | N6 | 1.59551 | $\nu$ 6 | 39.2 |
| 13 | r13 | 27.158 | | | | | | |

The zoom lens assembly system comprising the first to sixth lenses L1 to L6 is characterized as specified in the table mentioned above. The specified zoom lens assembly satisfies the following conditions $$0.4 < |f1/f0| < 0.65$$

and $$0.7 < |f3/f0| < 1.4$$

wherein f1 designates the focal length of the first lens L1, f3 desinates the focal length of the third lens L3 and f0 designates the focal length of the whole lens assembly of the zoom lens in the state of forming an image of the natural size scale. More precisely, f1=−45.3, f3=−113.9 and f0=100.0, which makes |f1/f0|0.45 and |f3/f0|1.14, respectively.

It is to be noted that the first lens L1 is precisely the same as the sixth lens L6 and the third lens L3 is precisely the same as the fourth lens L4 except that the first anf third lenses L1 and L3 are oriented opposite to the sixth and fourth lenses L6 and L4, respectively. Therefore, the zoom lens assembly also satisfies the conditions $$0.4 < |f6/f0| < 0.65$$

and $$0.7 < |f4/f0| < 1.4$$

wherein f6 designates the focal length of the sixth lens L6 and f4 designates the focal length of the fourth lens L4, respectively. In other words, |f1/f0| is equal to |f6/f0| and |f3/f0| is equal to |f4/f0|, respectively.

The condition $0.4 < |f1/f0| < 0.65$ or $0.4 < |f6/f0| < 0.65$ described above determines the power of the first lens L1 and the sixth lens L6.

If the value of |f1/f0| (=|f6/f0|) exceeds the maximum limit 0.65, the lenses have to move a large amount of distance at the time of varying the power of the zoom lens, which prevents to realize a compact structure of the zoom lens system.

On the other hand, if the value of |f1/f0|(=|f6/f0|) becomes less than the minimum limit 0.4, a very large aberration generates in the fixed lens groups, i.e., the first lens L1 and the sixth lens L6. In order to correct the aberration, it is necessary to add correction lenses to the fixed lens groups, which causes increase of the cost and prevents simplification of the zoom lens structure.

On the other hand, the condition $0.7 < |f3/f0| < 1.4$ or $0.7 < |f4/f0| < 1.4$ determines the power of the master lens composed of the third lens L3 and the fourth lens L4.

If the value of |f3/f0| (=|f4/f0|) exceeds the maximum limit 1.4, Petzval's sum becomes excessively large and the image is shifted to the negative side so that astigmatic difference (aberration) becomes large.

To the contrary, if the value of |f3/f0| (=|f4/f0|) becomes less than the minimum limit 0.7, Petzval's sum becomes excessively small and the image is shifted to the positive side so that curvature of field becomes large.

Also, if the value of |f3/f0|(=|f4/f0|) exceeds the maximum limit or falls below the minimum limit, the zoom lens characteristic on the optical axis becomes unbalanced with that out of the optical axis, which causes to degrade MTF (modulation transfer function).

The distances d2, d4, d7, d9 and d11 defined in FIG. 1 and specified in table 1 for natural size image are different from those for magnified or reduced size image since the second to fifth lenses L2 to L5 move as represented in table 2 below.

TABLE 2

| magnification m | 2.0 | 1.0 | 0.5 |
|---|---|---|---|
| lens asbl.foc.le.f | 88.7 | 100.0(f0) | 88.7 |
| distance d2 | 1.443 | 0.233 | 1.007 |
| distance d4 | 2.149 | 2.972 | 2.439 |
| distance d6 | 0.233 | 0.547 | 0.233 |
| distance d7 | 0.233 | 0.547 | 0.233 |
| distance d9 | 2.439 | 2.972 | 2.149 |
| distance d11 | 1.007 | 0.233 | 1.443 |
| F number | 7.3 | 8.0 | 7.2 |
| object height Y | 34.5 | 69.0 | 69.0 |
| half field ang. ω | 17.4° | 19.0° | 17.4° |

Figure 2A:
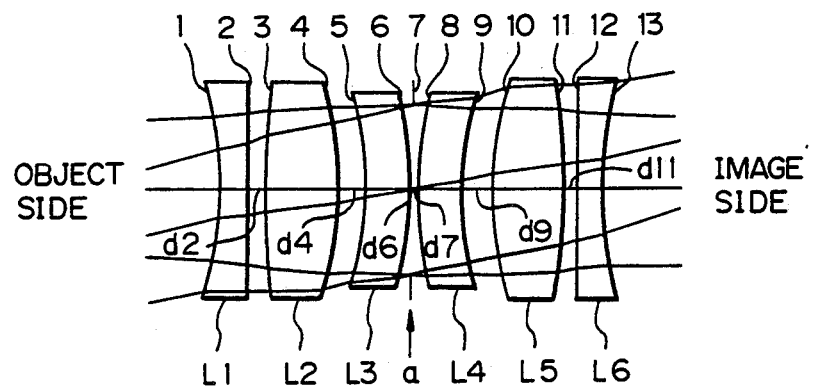
FIG. 2a is a constructional view of a first embodiment of the zoom lens of the present invention for explaining the optical path of the lens system at the time of forming a magnified size image.
Figure 2B:
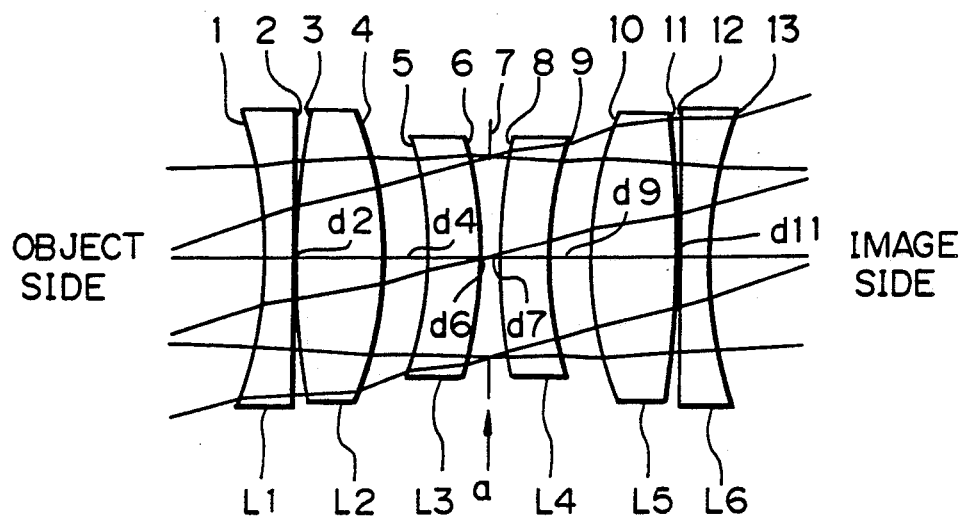
FIG. 2b is a constructional view of the first embodiment of the invention for explaining the optical path of the lens system at the time of forming a natural size image.
Figure 2C:
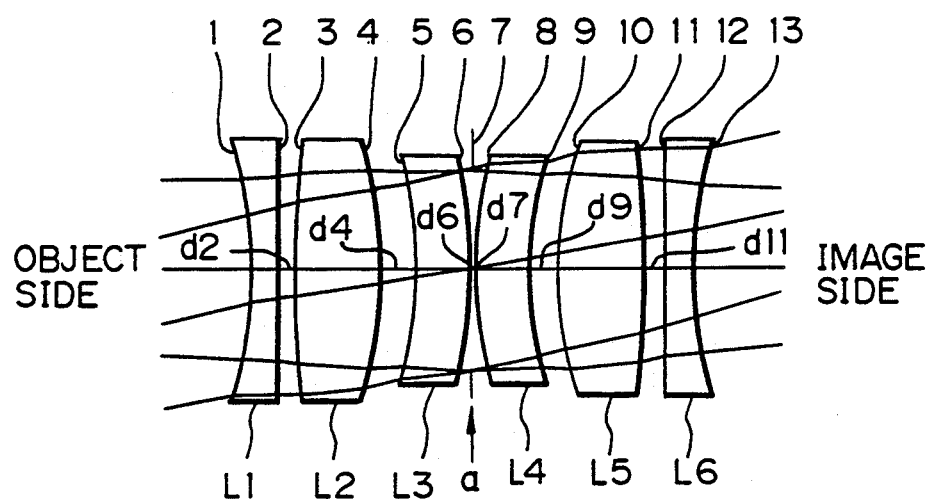
FIG. 2c is a constructional view of the first embodiment of the invention for explaining the optical path of the lens system at the time of forming a reduced size image.

FIG. 2a illustrates the zoom lens comprising the first to sixth lenses L1 to L6 specified as represented in Table 1 at the time of forming a magnified image (m=2.0). Also, FIGS. 2b and 2c illustrate the zoom lens at the time of forming a natural size image (m=1.0) and a reduced image (m=0.5), respectively.

As mentioned before, the first lens L1 and the sixth lens L6 are fixed and stationary. With regard to the distance d2 that is the amount of movement of the second lens L2 with respect to the first lens L1, the distance d2 changes from 1.443 through 0.233 to 1.007, from the magnifying state (m=2.0) through the natural size state (m=1.0) to the reduced size state (m=0.5).

On the other hand, with regard to the distance d11 that is the amount of movement of the fifth lens L5 with respect to the sixth lens L6, the distance d11 changes from 1.007 through 0.233 to 1.443, from the magnifying state (m=2.0) through the natural size state (m=1.0) to the reduced size state (m=0.5).

As can be seen by comparing the distance changes of the lenses L2 and L5 mentioned above, movement of the second lens L2 is opposite to that of the fifth lens L5 in the magnifying state and reducing state, being equalized in the natural size state. That is, the magnifying state movement of the second lens L2 is equal to the reducing state movement of the fifth lens L5, while the reducing state movement of the second lens L2 is equal to the magnifying movement of the fifth lens L5.

Also, in connection with movement of the third lens L3 (distance change d4 on the optical axis) and the fourth lens L4 (distance change d11 on the optical axis), the movement relationship is the same as that of the second and fifth lenses L2 and L5, mentioned above. Also, the relationship between the distance d6 and the distance d7 on the optical axis is the same as the above mentioned relationship between the distance d2 and the distance d11.

Therefore, within the zoom lens assembly, the lens elements L1 to L6 move in such a way that, at the time of forming the natural size image, the lenses L1 to L6 are arranged symmetrically with respect to the aperture stop 7, and that, at the time of varying the power of the zoom lens, the first lens L1 and the sixth lens L6 are fixed while the second to fifth lenses L2 to L5 are moved in such a way that the magnifying movement of the lenses is symmetrical with respect to the reducing movement thereof and vice versa.

The whole optical lens system moves along the optical axis between the object and the image along with the zooming motion of the zoom lens so that it becomes possible to continuously vary the power of the lens system maintaining the conjugate length between the object and the image constant irrespective of the magnifying state of the zoom lens.

FIGS. 3a-1, 3b-1 and 3c-1 graphically represent spherical aberration of the zoom lens of the first embodiment of the invention in the magnifying state, the natural size state and the reducing state, illustrated in FIGS. 2a, 2b and 2c, respectively. In FIGS. 3a-1, 3b-1 and 3c-1, lines ①, ② and ③ represent the aberration with respect to D-line (587.56 nm), F-line (486.13 nm) and C-line (656.27 nm), respectively. Also, FIGS. 3a-2, 3b-2 and 3c-2 graphically represent astigmatism with respect to D-line ①, F-line ② and C-line ③, for sagittal rays and meridional rays, respectively. Also, FIGS. 3a-3, 3b-3 and 3c-3 graphically represent distortion aberration.

Figure 4B:
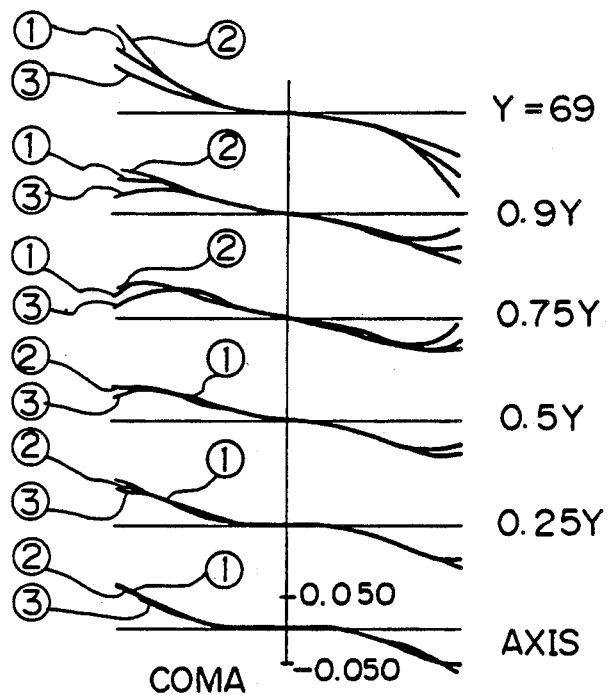
FIG. 4b is a graphical view for explaining coma aberration of the zoom lens of the first embodiment at the time of forming a natural size image.
Figure 4C:
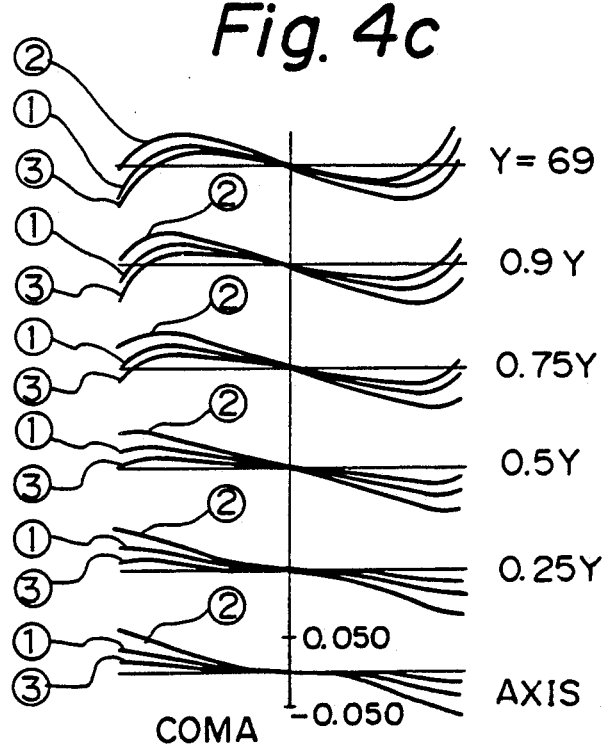
FIG. 4c is a graphical view for explaining coma aberration of the zoom lens of the first embodiment at the time of forming a reduced size image.
Figure 5A:
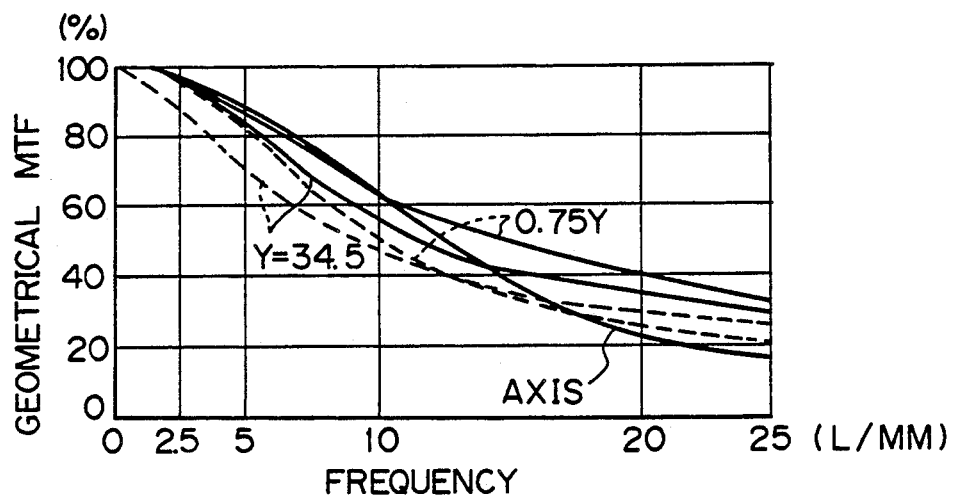
FIG. 5a is a graphical view for explaining MTF characteristic of the zoom lens of the first embodiment at the time of forming a magnified size image.
Figure 5B:
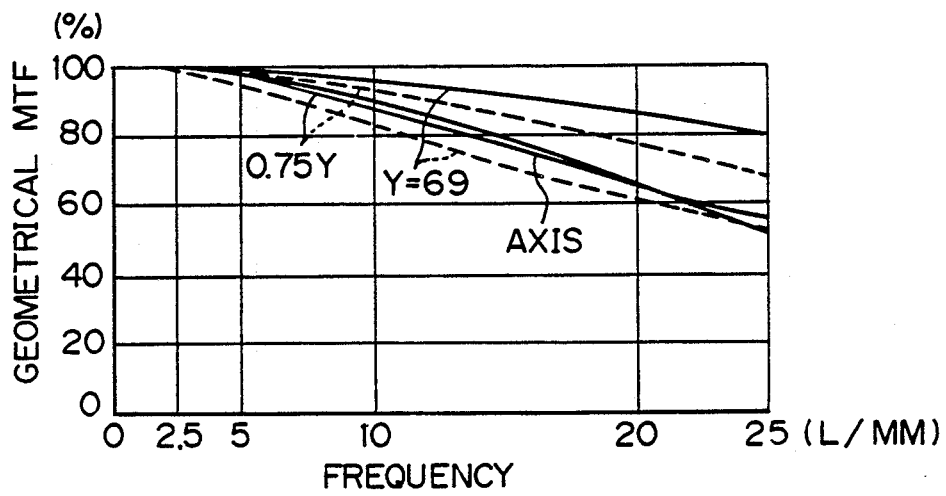
FIG. 5b is a graphical view for explaining MTF charasteristic of the zoom lens of the first embodiment at the time of forming a natural size image.
Figure 5C:
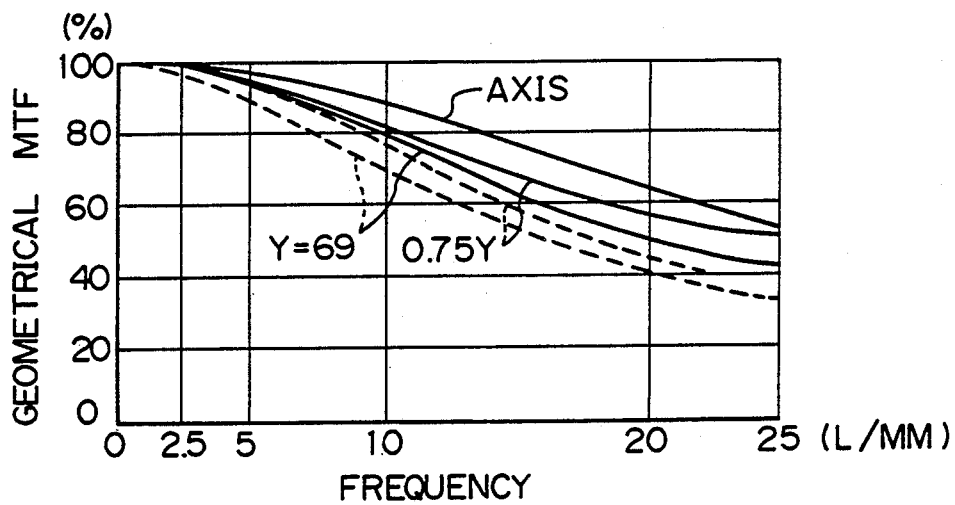
FIG. 5c is a graphical view for explaining MTF characteristic of the zoom lens of the first embodiment at the time of forming a reduced size image.

Also, with regard to coma aberration, FIG. 4a graphically represents the aberration of the zoom lens in the magnifying state (m=2.0) with respect to D-line ①, F-line ② and C-line ③, respectively. Also, FIGS. 4b and 4c graphically represent the aberration in the natural size state (m=1.0) and the reducing state (m=0.5), respectively. The height Y of the object of FIG. 4a(m=2.0) is 34.5. The height Y of the object of FIGS. 4b (m=1.0) and 4c (m=0.5) is 69.0. The drawings represent the aberration characteristic at the height Y, 0.9Y, 0.75Y, 0.5Y, 0.25Y and on the optical axis, respectively. Also, FIGS. 5a, 5b and 5c graphically represent geometrical MTF (modulation transfer function) characteristic of the zoom lens in the states of m=2.0, m=1.0 and m=0.5, respectively.

Note that, in FIGS. 3a-1, 3b-1 and 3c-1, SA designates spherical aberration and SC designates sine conditon, respectively and that spherical aberration is represented by a solid line and sine condition is represented by a dash line.

In FIGS. 3a-2, 3b-2 and 3c-2, DS and DM designate astigmatism. Solid lines represent the aberration with respect to sagittal rays and dash lines represent the aberration with respect to meridional rays, respectively.

Also, in FIGS. 3a-3, 3b-3 and 3c-3, DIST designates distortion of the image formed by the zoom lens.

Figures 1, 2, 3, 3B:
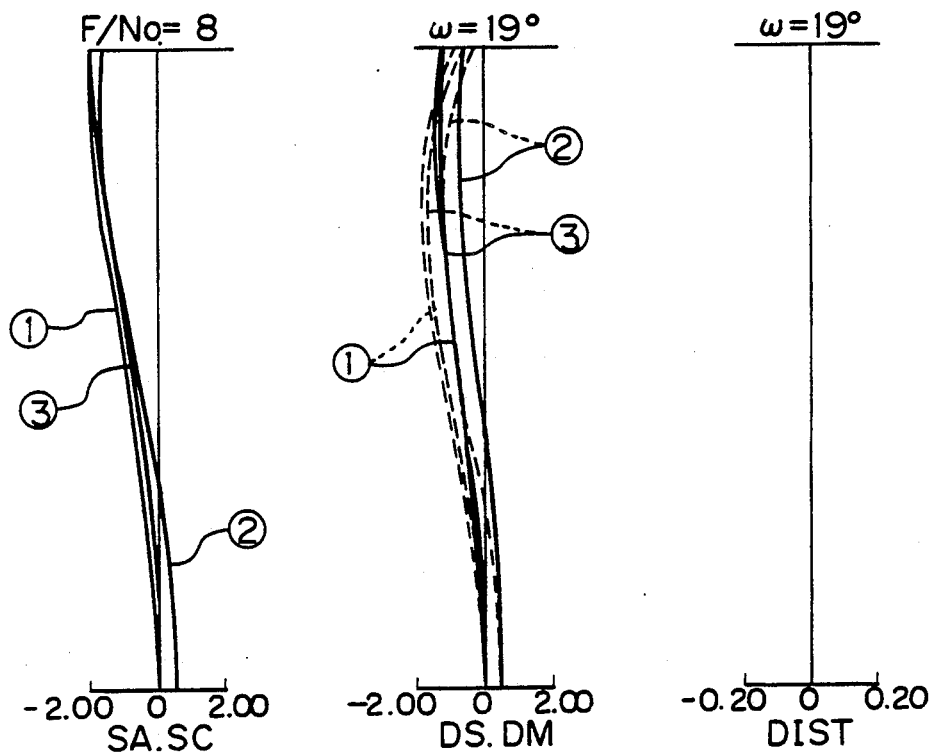

As can be seen from the above-mentioned aberration characteristic graphs of FIGS. 3a to 3c, the lens characteristics on the optical axis and out of the optical axis are well balanced in each of the magnification states. Also, with respect to coma aberration, in spite of almost 100 percent vignetting factor, flare component ratio is very small which means that the aberration is fully corrected.

Also, as can be seen from the graphs of MTF characteristic in relation to spatial frequency, the MTF characteristic represents a very high contrast in the magnifying state and reducing state as well as in the natural size state, which means that the picture quality of thehard copy finally discharged out of the copying apparatus is remarkably upgraded.

A second embodiment of the present invention is described hereinafter with reference to FIGS. 6a, 6b and 6c which illustrate the structure thereof in the magnifying state, the natural size state and the reducing state, respectively and FIGS. 7a-1 to 7a-3, 7b-1 to 7b-3, 7c-1 to 7c-3, 8a to 8c and 9a to 9c. This second embodiment comprises six lenses namely a first lens L1 to a sixth lens L6 which are specified as described in the following table 3.

TABLE 3

| S. No | Radius of Curvature ri | | Distance di | Refractive Index Ni | Abbe's No νi |
|---|---|---|---|---|---|
| 1 | r1 | −27.307 | | | |
| | | | d1 1.863 | N1 1.59270 | ν1 35.3 |
| 2 | r2 | 632.415 | | | |
| | | | d2 varibl | — | — |
| 3 | r3 | 64.660 | | | |

TABLE 3-continued

| S. No | Radius of Curvature ri | | Distance di | Refractive Index Ni | Abbe's No νi |
|---|---|---|---|---|---|
| | | | d3 5.82200 | N2 1.67003 | ν2 47.3 |
| 4 | r4 | −29.266 | | | |
| | | | d4 varibl | — | — |
| 5 | r5 | −19.954 | | | |
| | | | d5 2.14300 | N3 1.53172 | ν3 48.9 |
| 6 | r6 | −28.533 | | | |
| | | | d6 varibl | — | — |
| 7 | r7 | ∞ap.stp | | | |
| | | | d7 varibl | — | — |
| 8 | r8 | 28.533 | | | |
| | | | d8 2.14300 | N4 1.53172 | ν4 48.9 |
| 9 | r9 | 19.954 | | | |
| | | | d9 varibl | — | — |
| 10 | r10 | 29.266 | | | |
| | | | d10 5.82200 | N5 1.67003 | ν5 47.3 |
| 11 | r11 | −64.660 | | | |
| | | | d11 varibl | — | — |
| 12 | r12 | −632.415 | | | |
| | | | d12 1.86300 | N6 1.59270 | ν6 35.3 |
| 13 | r13 | 27.307 | | | |

The distance d2, d4, d6, d7, d9 and d11 between adjacent two lenses (see FIG. 1) along the optical axis are changed according to magnification as described in the following table 4.

TABLE 4

| magnification m | 2.0 | 1.0 | 0.5 |
|---|---|---|---|
| lens asbl.foc.le.f | 88.7 | 100.0(f0) | 88.7 |
| distance d2 | 1.420 | 0.233 | 0.964 |
| distance d4 | 4.116 | 5.319 | 4.527 |
| distance d6 | 0.185 | 0.233 | 0.358 |
| distance d7 | 0.358 | 0.233 | 0.185 |
| distance d9 | 4.527 | 5.319 | 4.116 |
| distance d11 | 0.964 | 0.233 | 1.420 |
| F number | 7.4 | 8.0 | 7.3 |
| object height Y | 34.5 | 69.0 | 69.0 |
| half field ang. ω | 17.4° | 19.0° | 17.4° |

Figure 6A:
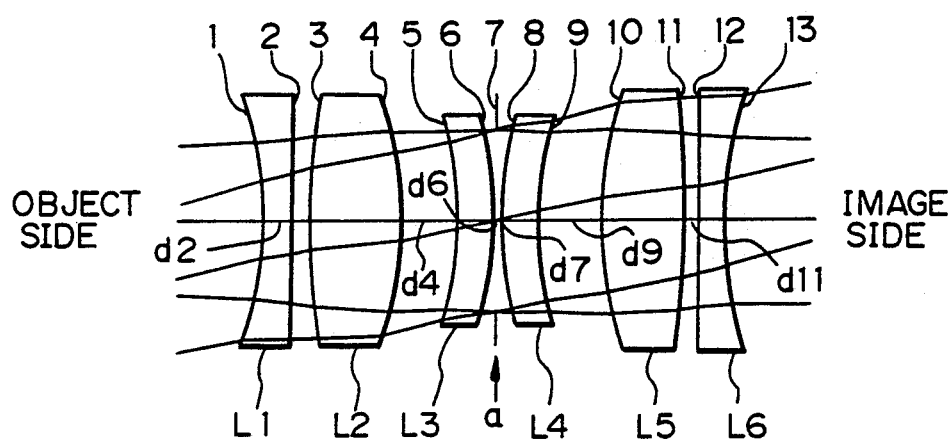
FIG. 6a is a constructional view of the zoom lens of the second embodiment of the present invention for explaining an optical path of the lens system at the time of forming a magnified size image.

FIG. 6a illustrates the zoom lens comprising the first to sixth lenses L1 to L6 specified as represented in Table 3 and Table 4 at the time of forming a magnified image (m=2.0). Also, FIGS. 6b and 6c illustrate the zoom lens at the time of forming a natural size image (m=1.0) and a reduced image (m=0.5), respectively.

As mentioned before, the first lens L1 and the sixth lens L6 are fixed and stationary. With regard to the distance d2 that is the amount of movement of the second lens L2 with respect to the first lens L1, the distance d2 changes from 1.420 through 0.233 to 0.964, from the magnifying state (m=2.0) through the natural size state (m=1.0) to the reduced size state (m=0.5).

On the other hand, with regard to the distance d11 that is the amount of movement of the fifth lens L5 with respect to the sixth lens L6, the distance d11 changes from 0.964 through 0.233 to 1.420, from the magnifying state (m=2.0) through the natural size state (m=1.0) to the reduced size state (m=0.5).

As can be seen by comparing the distance changes of the lenses L2 and L5 mentioned above, movement of the second lens L2 is opposite to that of the fifth lens L5 in the magnifying state and reducing state, being equalized in the natural size state. That is, the magnifying state movement of the second lens L2 is equal to the reducing state movement of the fifth lens L5, while the reducing state movement of the second lens L2 is equal to the magnifying movement of the fifth lens L5.

Also, in connection with movement of the third lens L3 (distance change d4 on the optical axis) and the fourth lens L4 (distance change d11 on the optical axis), the movement relationship is the same as that of the second and fifth lenses L2 and L5, mentioned above. Also, the relationship between the distance d6 and the distance d7 on the optical axis is the same as the above mentioned relationship between the distance d2 and the distance d11.

Therefore, within the zoom lens assembly, the lens elements L1 to L6 move in such a way that, at the time of forming the natural size image, the lenses L1 to L6 are arranged symmetrically with respect to the aperture stop 7, and that, at the time of varying the power of the zoom lens, the first lens L1 and the sixth lens L6 are fixed while the second to fifth lenses L2 to L5 are moved in such a way that the magnifying movement of the lenses is symmetrical with respect to the reducing movement thereof and vice versa.

Accordingly, as in the case of the first embodiment mentioned before, in accordance with the second embodiment described above, the whole optical lens system moves along the optical axis between the object and the image along with the zooming motion of the zoom lens so that it becomes possible to continuously vary the power of the lens system maintaining the conjugate length between the object and the image constant irrespective of the magnifying state of the zoom lens.

Figure 6B:
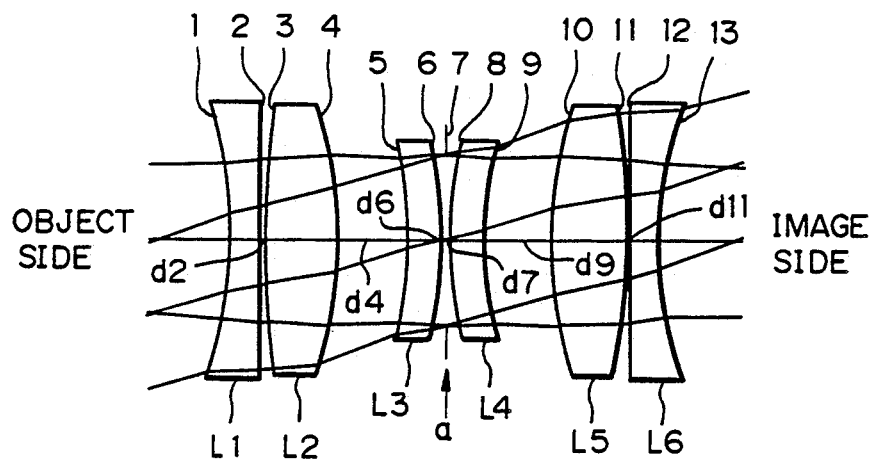
FIG. 6b is a constructional view of the zoom lens of the second embodiment for explaining the optical path thereof at the time of forming a natural size image.
Figure 6C:
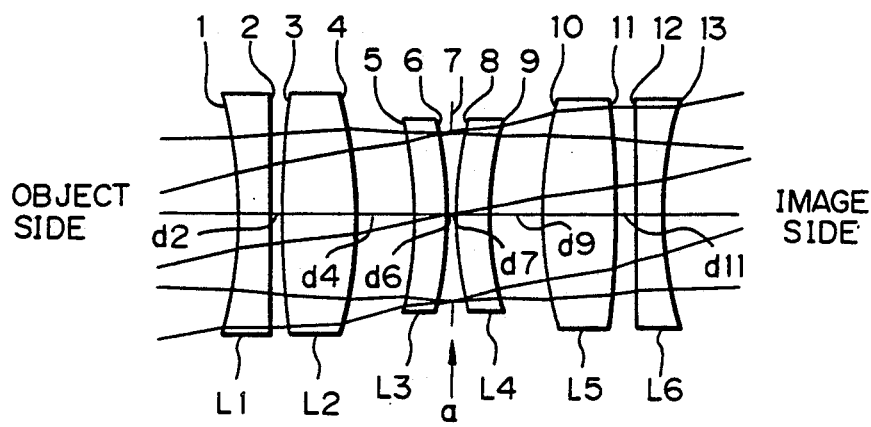
FIG. 6c is a constructional view of the zoom lens of the second embodiment for explaining the optical path thereof at the time of forming a reduced size image.

FIGS. 7a-1, 7b-1 and 7c-1 graphically represent spherical aberration of the zoom lens of the second embodiment of the invention in the magnifying state, the natural size state and the reducing state, illustrated in FIGS. 6a, 6b and 6c, respectively. In FIGS. 7a-1, 7b-1 and 7c-1, lines ①, ② and ③ represent the aberration with respect to D-line (587.56 nm), F-line (486.13 nm) and C-line (656.27 nm), respectively. Also, FIGS. 7a-2, 7b-2 and 7c-2 graphically represent astigmatism with respect to D-line ①, F-line ② and C-line ③, for sagittal rays and meridional rays, respectively. Also, FIGS. 7a-3, 7b-3 and 7c-3 graphically represent distortion aberration.

Figure 8B:
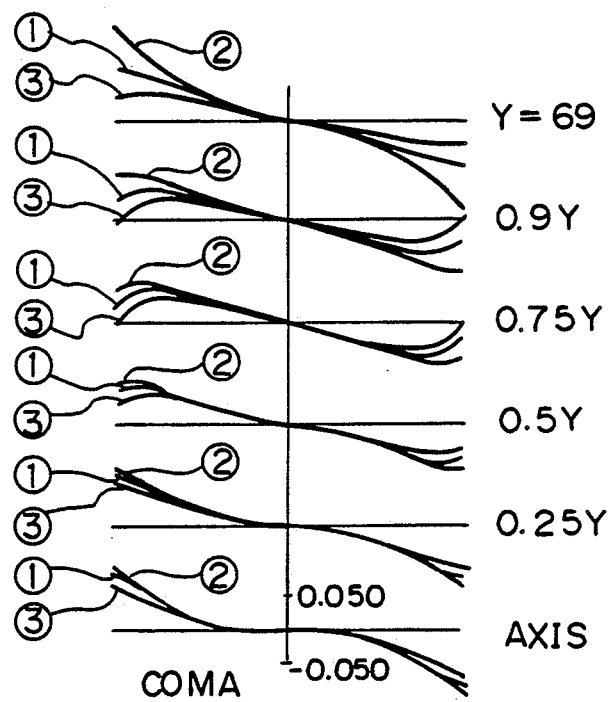
FIG. 8b is a graphical view for explaining coma aberration of the zoom lens of the second embodiment at the time of forming a natural size image.
Figure 8C:
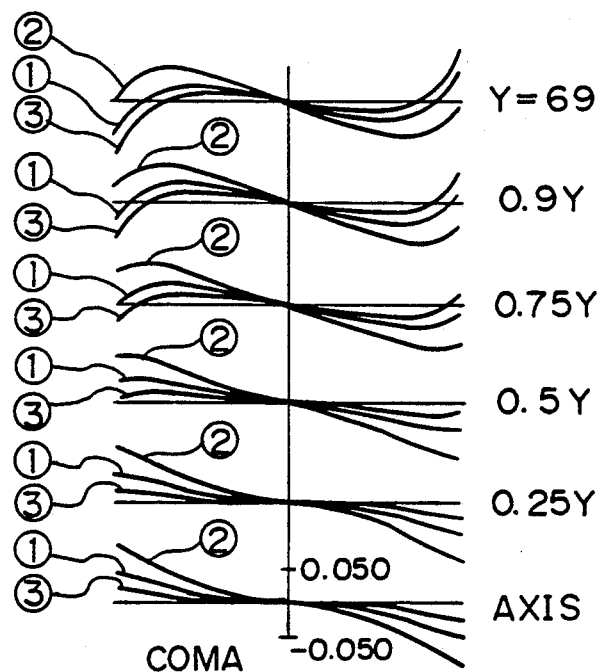
FIG. 8c is a graphical view for explaining coma aberration of the zoom lens of the second embodiment at the time of forming a reduced size image.
Figure 9A:
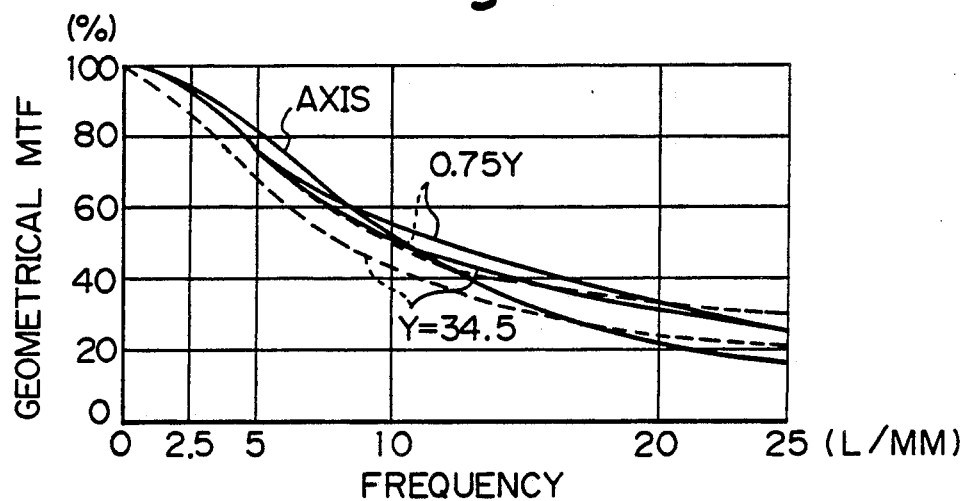
FIG. 9a is a graphical view for explaining MTF characteristic of the zoom lens of the second embodiment at the time of forming a magnified size image.
Figure 9B:
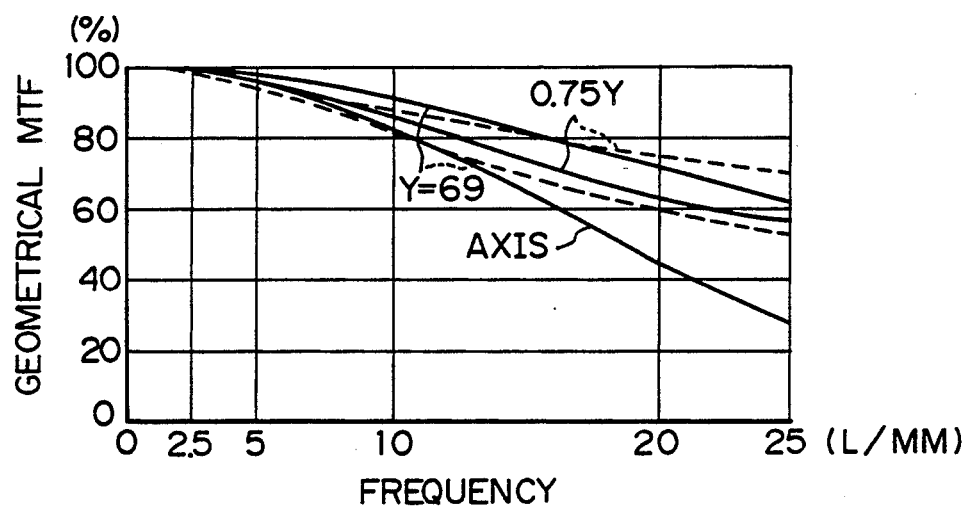
FIG. 9b is a graphical view for explaining MTF charasteristic of the zoom lens of the second embodiment at the time of forming a natural size image.
Figure 9C:
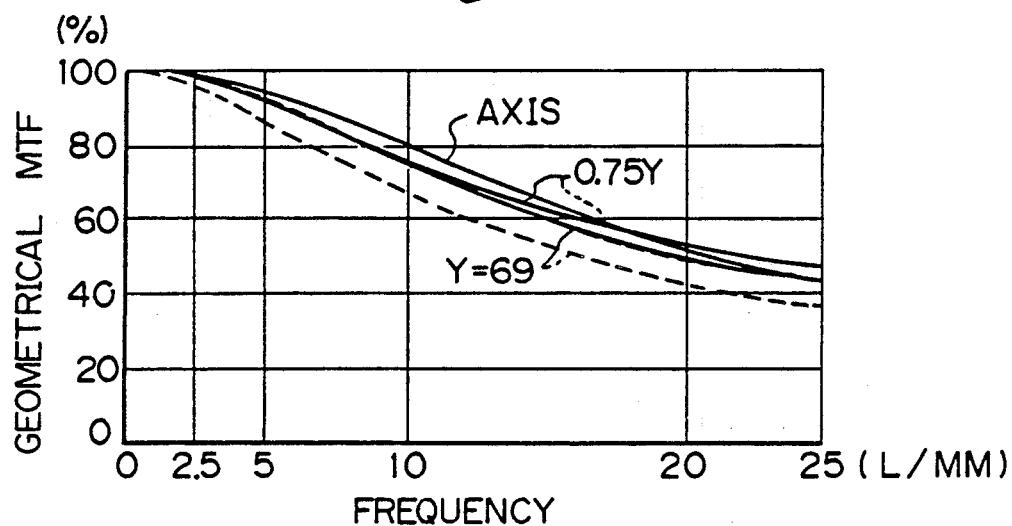
FIG. 9c is a graphical view for explaining MTF characteristic of the zoom lens of the second embodiment at the time of forming a reduced size image.

Also, with regard to coma aberration, FIG. 8a graphically represents the aberration of the zoom lens in the magnifying state (m=2.0) with respect to D-line ①, F-line ② and C-line ③, respectively. Also, FIGS. 8b and 8c graphically represent the aberration in the natural size state (m=1.0) and the reducing state (m=0.5), respectively. The height Y of the object of FIG. 8a (m=2.0) is 34.5. The height Y of the object of FIGS. 8b (m=1.0) and 8c (m=0.5) is 69.0. The drawings represent the aberration characteristic at the height Y, 0.9Y, 0.75Y, 0.5Y, 0.25Y and on the optical axis, respectively. Also, FIGS. 9a, 9b and 9c graphically represent geometrical MTF (modulation transfer function) characteristic of the zoom lens in the states of m=2.0, m=1.0 and m=0.5, respectively.

Note that, in FIGS. 7a-1, 7b-1 and 7c-1, SA designates spherical aberration and SC designates sine conditon, respectively and that spherical aberration is represented by a solid line and sine condition is represented by a dash line.

In FIGS. 7a-2, 7b-2 and 7c-2, DS and DM designate astigmatism. Solid lines represent the aberration with respect to sagittal rays and dash lines represent the aberration with respect to meridional rays, respectively.

Also, in FIGS. 7a-3, 7b-3 and 7c-3, DIST designates distortion of the image formed by the zoom lens.

As can be seen from the above-mentioned aberration characteristic graphs of FIGS. 7a to 7c, the lens characteristics on the optical axis and out of the optical axis are well balanced in each of the magnification states. Also, with respect to coma aberration, in spite of almost 100 percent vignetting factor, flare component ratio is very small which means that the aberration is fully corrected.

A third embodiment of the present invention is described hereinafter with reference to FIGS. 10a, 10b and 10c which illustrate the structure thereof in the magnifying state, the natural size state and the reducing state, respectively and FIGS. 11a-1 to 11a-3, 11b-1 to 11b-3, 11c-1 to 11c-3, 12a to 12c and 13a to 13c. This third embodiment comprises six lenses namely a first lens L1 to a sixth lens L6 which are specified as described in the following table 5.

TABLE 5

| S. No | Radius of Curvature ri | Distance di | | Refractive Index Ni | | Abbe's No ν i |
|---|---|---|---|---|---|---|
| 1 | r1 −29.152 | | | | | |
| | | d1 | 1.861 | N1 | 1.72342 | ν 1 38.0 |
| 2 | r2 −180.948 | | | | | |
| | | d2 | varibl | — | — | — |
| 3 | r3 109.244 | | | | | |
| | | d3 | 5.107 | N2 | 1.74320 | ν 2 49.3 |
| 4 | r4 −27.385 | | | | | |
| | | d4 | varibl | — | — | — |
| 5 | r5 −21.825 | | | | | |
| | | d5 | 4.472 | N3 | 1.56732 | ν 3 42.8 |
| 6 | r6 −37.428 | | | | | |
| | | d6 | varibl | — | — | — |
| 7 | r7 ∞ap.stp | | | | | |
| | | d7 | varibl | — | — | — |
| 8 | r8 37.438 | | | | | |
| | | d8 | 4.472 | N4 | 1.56732 | ν 4 42.8 |
| 9 | r9 21.825 | | | | | |
| | | d9 | varibl | — | — | — |
| 10 | r10 27.385 | | | | | |
| | | d10 | 5.107 | N5 | 1.74320 | ν 5 49.3 |
| 11 | r11 −109.244 | | | | | |
| | | d11 | varibl | — | — | — |
| 12 | r12 180.948 | | | | | |
| | | d12 | 1.861 | N6 | 1.72342 | ν 6 38.0 |
| 13 | r13 29.152 | | | | | |

The distance d2, d4, d6, d7, d9 and d11 between adjacent two lenses (see FIG. 1) along the optical axis are changed according to magnification as described in the following table 6.

TABLE 6

| | | | |
|---|---|---|---|
| magnification m | 2.0 | 1.0 | 0.5 |
| lens asbl.foc.le.f | 88.7 | 100.0(f0) | 88.7 |
| distance d2 | 1.626 | 0.233 | 1.071 |
| distance d4 | 1.932 | 2.730 | 2.262 |
| distance d6 | 0.233 | 0.716 | 0.233 |
| distance d7 | 0.233 | 0.716 | 0.233 |
| distance d9 | 2.262 | 2.730 | 1.932 |
| distance d11 | 1.071 | 0.233 | 1.626 |
| F number | 7.4 | 8.0 | 7.3 |
| object height Y | 34.5 | 69.0 | 69.0 |
| half field ang. ω | 17.4° | 19.0° | 17.4° |

Figure 10A:
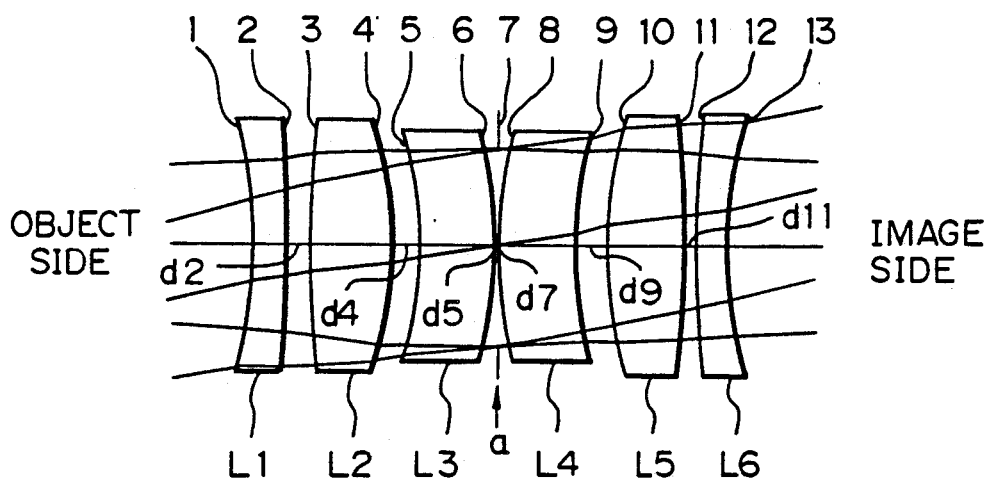
FIG. 10a is a constructional view of the zoom lens of the third embodiment of the present invention for explaining an optical path of the lens system at the time of forming a magnified size image.

FIG. 10a illustrates the zoom lens comprising the first to sixth lenses L1 to L6 specified as represented in Table 5 and Table 6 at the time of forming a magnified image (m=2.0). Also, FIGS. 10b and 10c illustrate the zoom lens at the time of forming a natural size image (m=1.0) and a reduced image (m=0.5), respectively.

In accordance with the third embodiment mentioned above, as in the case of the first embodiment, it becomes possible to continuously vary the power of the zoom lens maintaining the conjugate length between the object and the image constant irrespective of the magnifying state thereof.

Figure 10B:
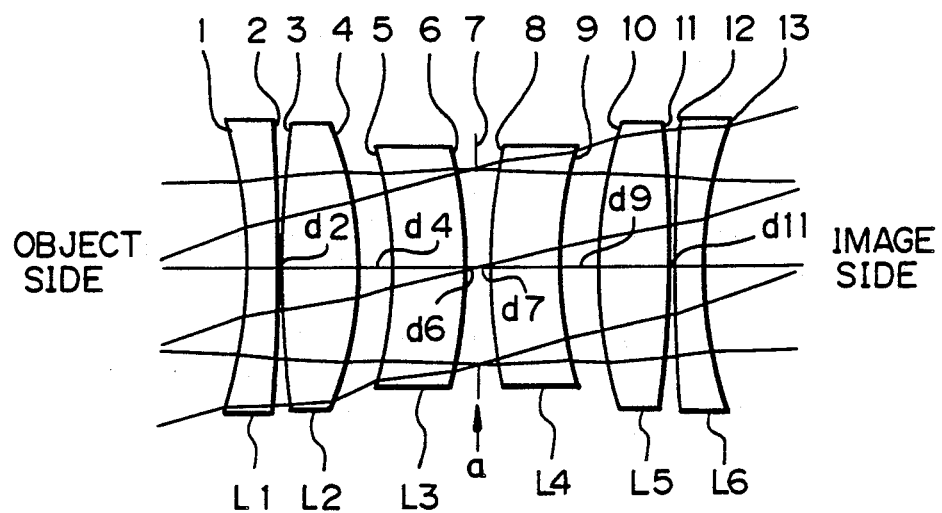
FIG. 10b is a constructional view of the zoom lens of the third embodiment for explaining the optical path thereof at the time of forming a natural size image.
Figure 10C:
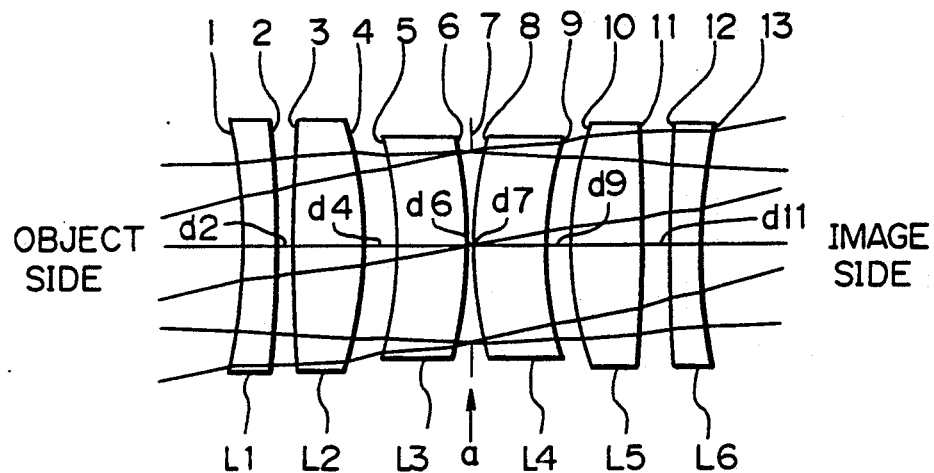
FIG. 10c is a constructional view of the zoom lens of the third embodiment for explaining the optical path thereof at the time of forming a reduced size image.
Figures 1, 2, 3, 11C:
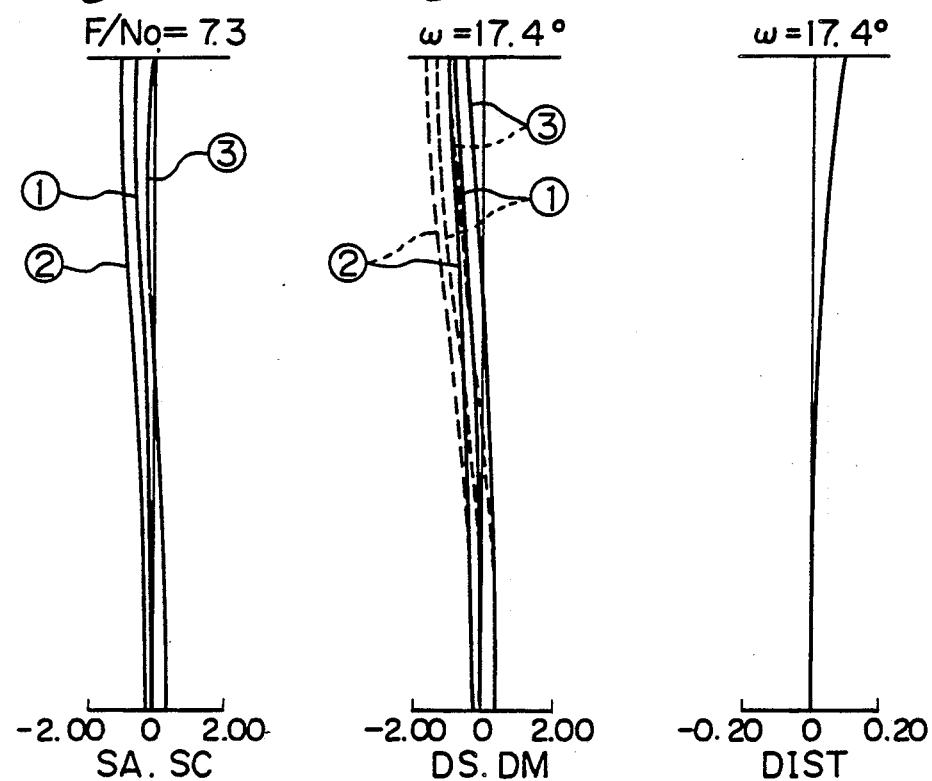

Also, FIGS. 11a-1, 11b-1 and 11c-1 graphically represent spherical aberration of the zoom lens in the magnifying state, the natural size state and the reducing state, illustrated in FIGS. 10a, 10b and 10c, respectively. Also, astigmatism of the zoom lens is represented in FIGS. 11a-2, 11b-2 and 11c-2, in the different magnifying state, respectively. Also, distortion aberration of the zoom lens is represented in FIGS. 11a-3, 11b-3 and 11c-3.

Figure 12A:
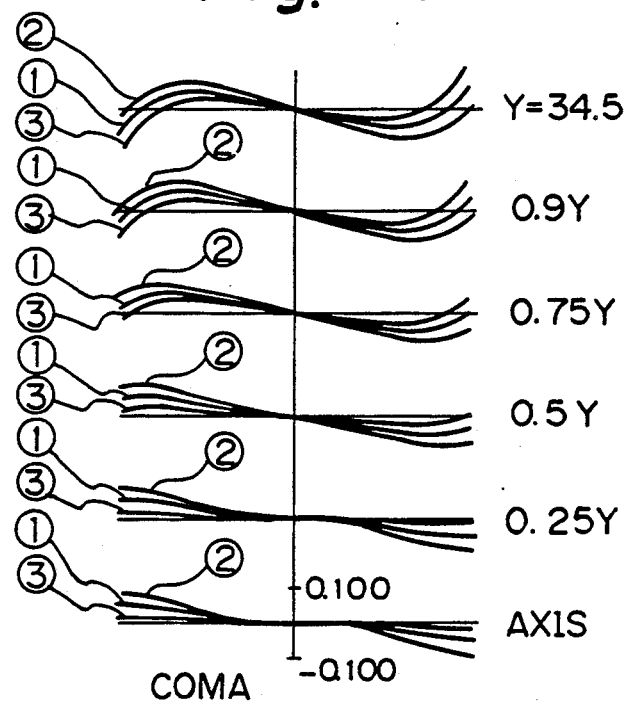
FIG. 12a is a graphical view for explaining coma aberration of the zoom lens of the third embodiment at the time of forming a magnified size image.
Figure 12B:
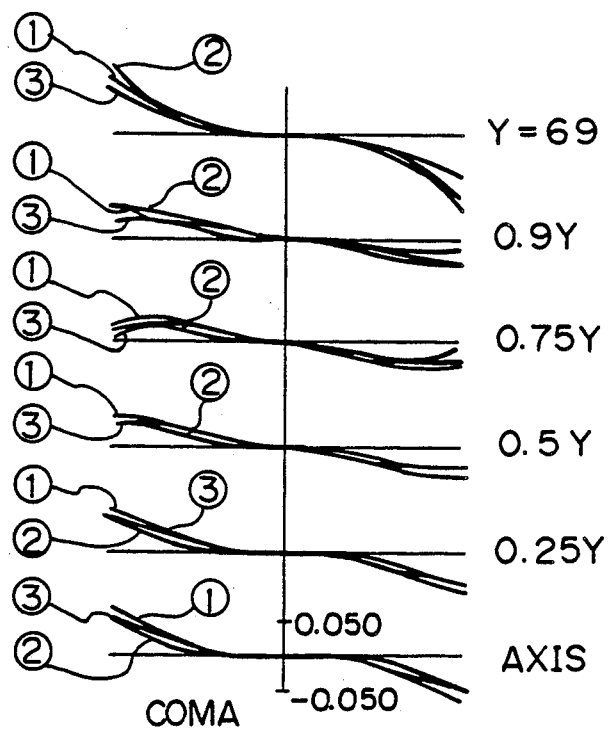
FIG. 12b is a graphical view for explaining coma aberration of the zoom lens of the third embodiment at the time of forming a natural size image.
Figure 12C:
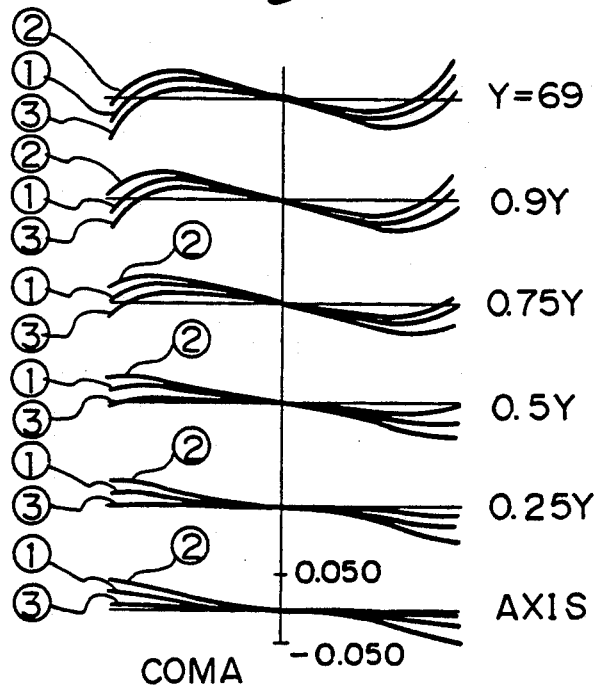
FIG. 12c is a graphical view for explaining coma aberration of the zoom lens of the third embodiment at the time of forming a reduced size image.
Figure 13A:
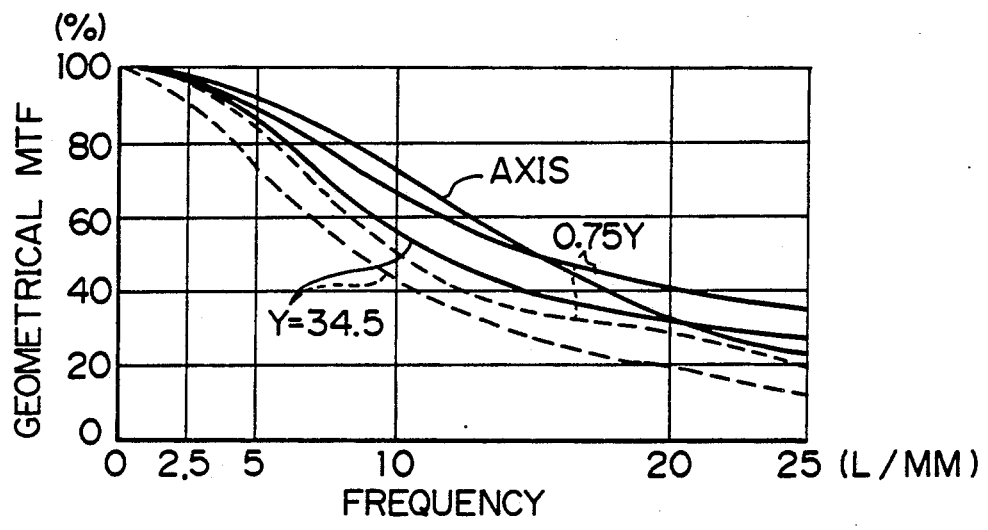
FIG. 13a is a graphical view for explaining MTF characteristic of the zoom lens of the third embodiment at the time of forming a magnified size image.
Figure 13B:
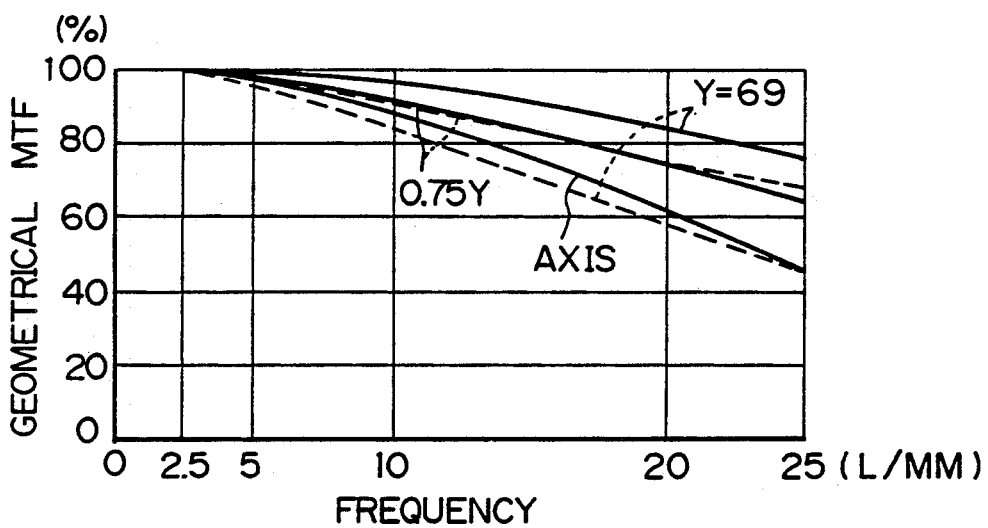
FIG. 13b is a graphical view for explaining MTF charasteristic of the zoom lens of the third embodiment at the time of forming a natural size image.
Figure 13C:
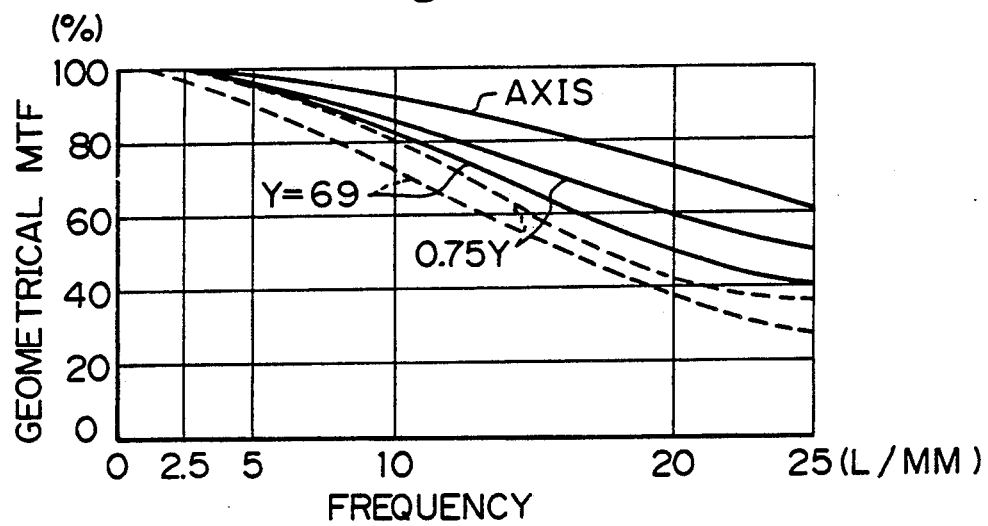
FIG. 13c is a graphical view for explaining MTF characteristic of the zoom lens of the third embodiment at the time of forming a reduced size image.

In connection with the coma aberration of the zoom lens, FIGS. 12a 12b and 12c graphically represent the aberration in relation to the magnifying state of the zoom lens. Also, in connection with the geometrical MTF characteristic, FIGS. 13a, 13b and 13c graphically represent the characteristic in relation to the magnifying state of the zoom lens.

A fourth embodiment of the present invention is described hereinafter with reference to FIGS. 14a, 14b and 14c which illustrate the structure thereof in the magnifying state, the natural size state and the reducing state, respectively and FIGS. 15a-1 to 15a-3, 15b-1 to 15b-3, 15c-1 to 15c-3, 16a to 16c and 17a to 17c. This fourth embodiment comprises six lenses namely a first lens L1 to a sixth lens L6 which are specified as described in the following table 7.

TABLE 7

| S. No | Radius of Curvature ri | Distance di | | Refractive Index Ni | | Abbe's No ν i | |
|---|---|---|---|---|---|---|---|
| 1 | r1 | −27.199 | | | | | |
| | | d1 | 3.570 | N1 | 1.83400 | ν 1 | 37.3 |
| 2 | r2 | −66.222 | | | | | |
| | | d2 | varibl | — | — | — | — |
| 3 | r3 | −3061.571 | | | | | |
| | | d3 | 5.122 | N2 | 1.74320 | ν 2 | 49.3 |
| 4 | r4 | −22.497 | | | | | |
| | | d4 | varibl | — | — | — | — |
| 5 | r5 | −20.820 | | | | | |
| | | d5 | 1.860 | N3 | 1.56732 | ν 3 | 42.8 |
| 6 | r6 | −41.251 | | | | | |
| | | d6 | varibl | — | — | — | — |
| 7 | r7 | ∞ap.stp | | | | | |
| | | d7 | varibl | — | — | — | — |
| 8 | r8 | 41.241 | | | | | |
| | | d8 | 1.860 | N4 | 1.56732 | ν 4 | 42.8 |
| 9 | r9 | 20.820 | | | | | |
| | | d9 | varibl | — | — | — | — |
| 10 | r10 | 22.497 | | | | | |
| | | d10 | 5.122 | N5 | 1.74320 | ν 5 | 49.3 |
| 11 | r11 | 3061.571 | | | | | |
| | | d11 | varibl | — | — | — | — |
| 12 | r12 | 66.222 | | | | | |
| | | d12 | 3.570 | N6 | 1.83400 | ν 6 | 37.3 |
| 13 | r13 | 27.199 | | | | | |

The distance d2, d4, d6, d7, d9 and d11 between adjacent two lenses (see FIG. 1) along the optical axis are changed according to magnification as described in the following table 8.

TABLE 8

| magnification m | 2.0 | 1.0 | 0.5 |
|---|---|---|---|
| lens asbl.foc.le.f | 88.8 | 100.0(f0) | 88.8 |
| distance d2 | 1.434 | 0.140 | 1.715 |
| distance d4 | 0.472 | 0.752 | 0.550 |
| distance d6 | 2.029 | 3.235 | 2.054 |
| distance d7 | 2.054 | 3.235 | 2.029 |
| distance d9 | 0.550 | 0.752 | 0.472 |
| distance d11 | 1.715 | 0.140 | 1.434 |
| F number | 7.3 | 8.0 | 7.3 |
| object height Y | 34.5 | 69.0 | 69.0 |
| half field ang. ω | 17.4° | 19.0° | 17.4° |

Figure 14A:
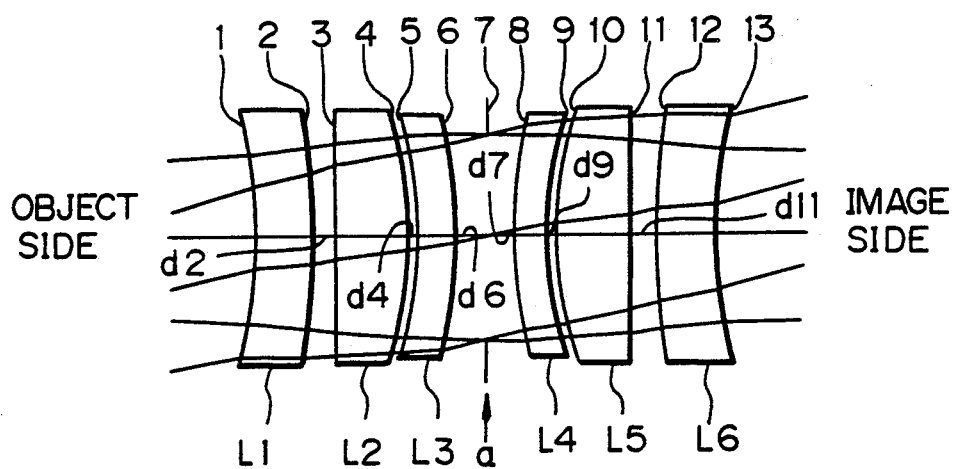
FIG. 14a is a constructional view of the zoom lens of the fourth embodiment of the present invention for explaining an optical path of the lens system at the time of forming a magnified size image.

FIG. 14a illustrates the zoom lens comprising the first to sixth lenses L1 to L6 specified as represented in Table 7 and Table 8 at the time of forming a magnified image (m=2.0). Also, FIGS. 14b and 14c illustrate the zoom lens at the time of forming a natural size image (m=1.0) and a reduced image (m=0.5), respectively.

In accordance with the fourth embodiment mentioned above, as in the case of the first embodiment, it becomes possible to continuously vary the power of the zoom lens maintaining the conjugate length between the object and the image constant irrespective of the magnifying state thereof.

Figure 14B:
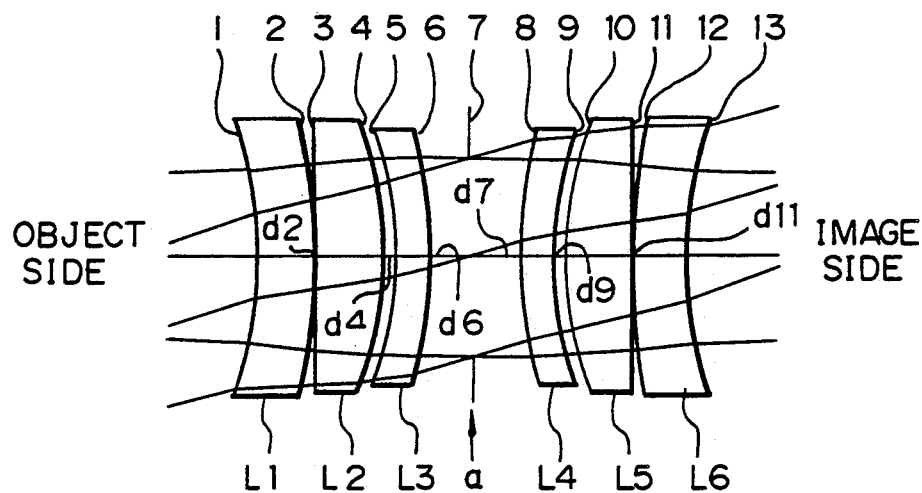
FIG. 14b is a constructional view of the zoom lens of the fourth embodiment for explaining the optical path thereof at the time of forming a natural size image.
Figure 14C:
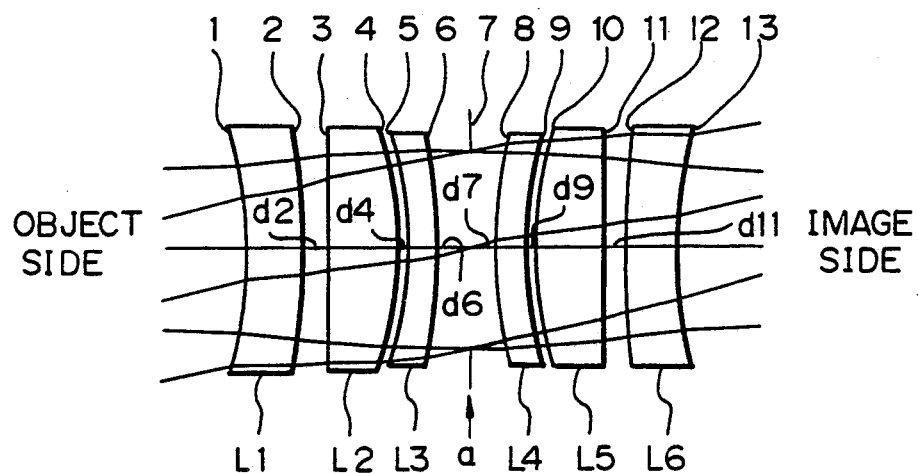
FIG. 14c is a constructional view of the zoom lens of the fourth embodiment for explaining the optical path thereof at the time of forming a reduced size image.

Also, FIGS. 15a-1, 15b-1 and 15c-1 graphically represent spherical aberration of the zoom lens in the magnifying state, the natural size state and the reducing state, illustrated in FIGS. 14a, 14b and 14c, respectively. Also, astigmatism of the zoom lens is represented in FIGS. 15a-2, 15b-2 and 15c-2, in the different magnifying state, respectively. Also, distortion aberration of the zoom lens is represented in FIGS. 15a-3, 15b-3 and 15c-3.

Figure 16B:
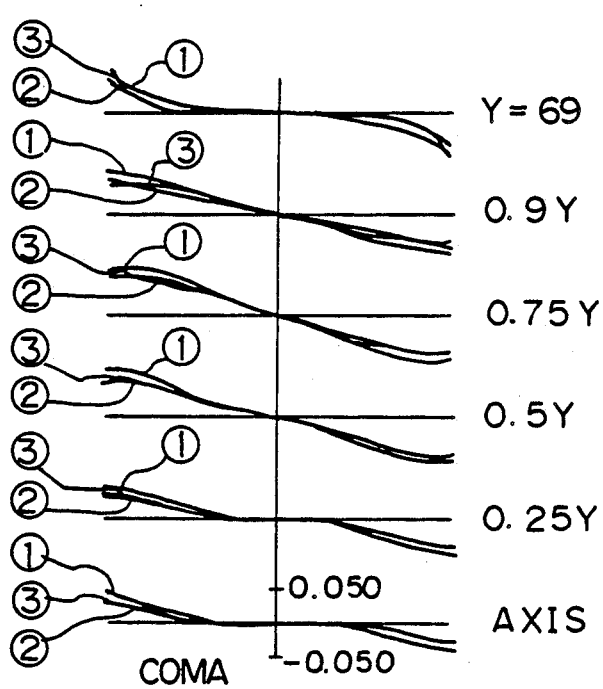
FIG. 16b is a graphical view for explaining coma aberration of the zoom lens of the fourth embodiment at the time of forming a natural size image.
Figure 16C:
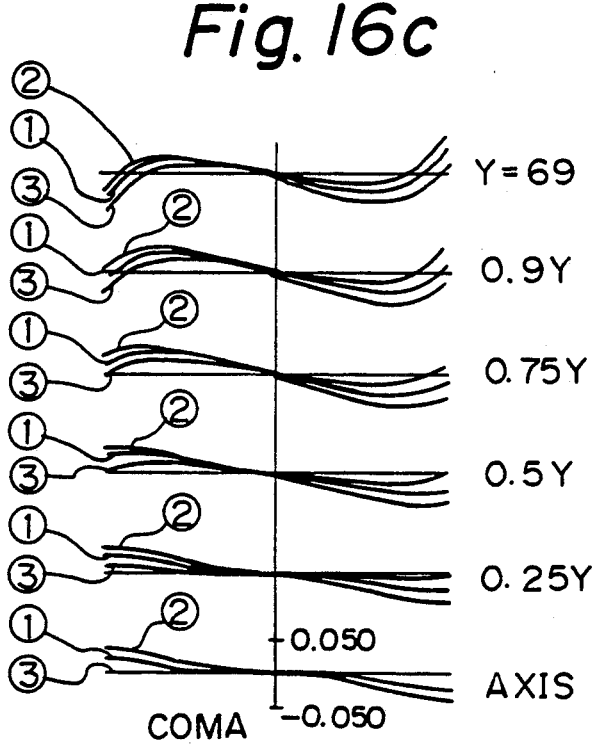
FIG. 16c is a graphical view for explaining coma aberration of the zoom lens of the fourth embodiment at the time of forming a reduced size image.
Figure 17A:
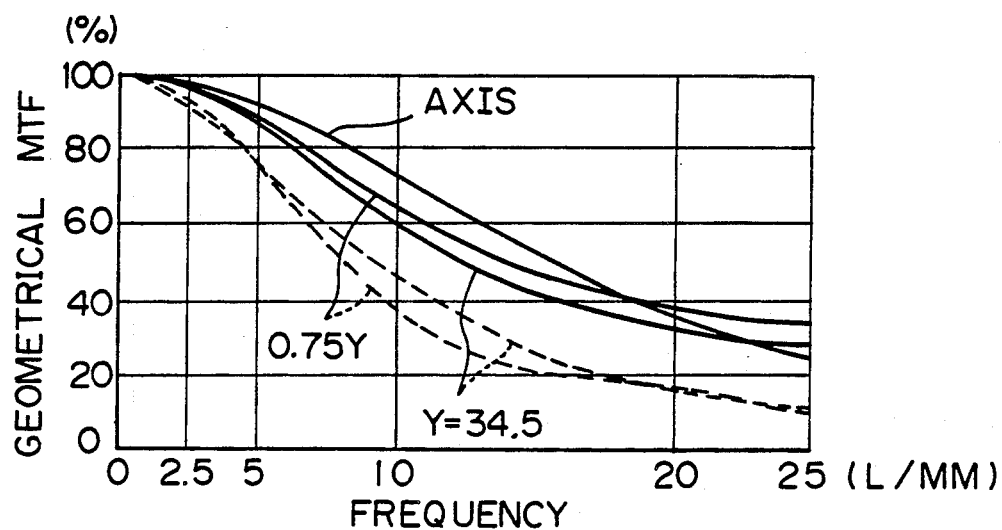
FIG. 17a is a graphical view for explaining MTF characteristic of the zoom lens of the fourth embodiment at the time of forming a magnified size image.
Figure 17B:
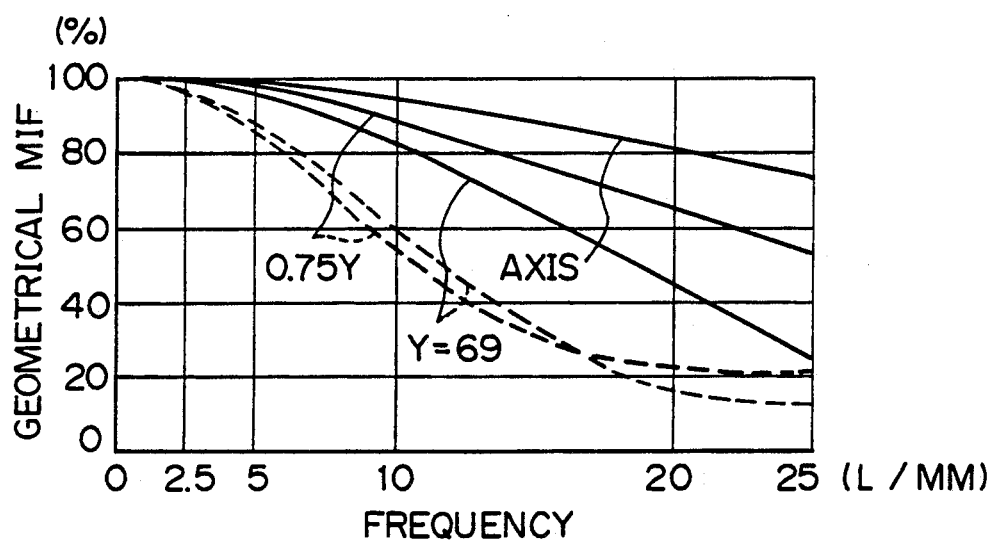
FIG. 17b is a graphical view for explaining MTF charasteristic of the zoom lens of the fourth embodiment at the time of forming a natural size image.
Figure 17C:
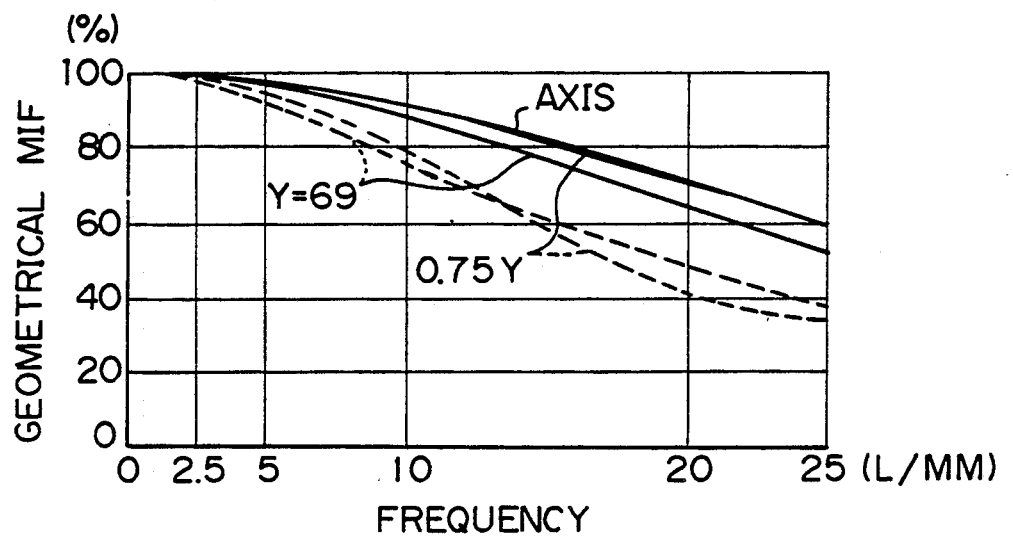
FIG. 17c is a graphical view for explaining MTF characteristic of the zoom lens of the fourth embodiment at the time of forming a reduced size image.

In connection with the coma aberration of the zoom lens, FIGS. 16a, 16b and 16c graphically represent the aberration in relation to the magnifying state of the zoom lens. Also, in connection with the geometrical MTF characteristic, FIGS. 17a, 17b and 17c graphically represent the characteristic in relation to the magnifying state of the zoom lens.

A fifth embodiment of the present invention is described hereinafter with reference to FIGS. 18a, 18b and 18c which illustrate the structure thereof in the magnifying state, the natural size state and the reducing state, respectively and FIGS. 19a-1 to 19a-3, 19b-1 to 19b-3, 19c-1 to 19c-3, 20a to 20c and 21a to 21c. This fifth embodiment comprises six lenses namely a first lens L1 to a sixth lens L6 which are specified as described in the following table 9.

TABLE 9

| S. No | Radius of Curvature ri | Distance di | | Refractive Index Ni | | Abbe's No ν i | |
|---|---|---|---|---|---|---|---|
| 1 | r1 | −27.307 | | | | | |
| | | d1 | 1.863 | N1 | 1.59270 | ν 1 | 35.3 |
| 2 | r2 | 632.415 | | | | | |
| | | d2 | varibl | — | — | — | — |
| 3 | r3 | 64.660 | | | | | |
| | | d3 | 5.822 | N2 | 1.67003 | ν 2 | 47.3 |
| 4 | r4 | −29.266 | | | | | |
| | | d4 | varibl | — | — | — | — |
| 5 | r5 | −19.954 | | | | | |
| | | d5 | 2.143 | N3 | 1.53172 | ν 3 | 48.9 |
| 6 | r6 | −28.533 | | | | | |
| | | d6 | varibl | — | — | — | — |
| 7 | r7 | ∞ap.stp | | | | | |
| | | d7 | varibl | — | — | — | — |
| 8 | r8 | 28.533 | | | | | |
| | | d8 | 2.143 | N4 | 1.53172 | ν 4 | 48.9 |
| 9 | r9 | 19.954 | | | | | |
| | | d9 | varibl | — | — | — | — |
| 10 | r10 | 29.266 | | | | | |
| | | d10 | 5.822 | N5 | 1.67003 | ν 5 | 47.3 |
| 11 | r11 | −64.660 | | | | | |
| | | d11 | varibl | — | — | — | — |
| 12 | r12 | −632.415 | | | | | |
| | | d12 | 1.863 | N6 | 1.59270 | ν 6 | 35.3 |
| 13 | r13 | 27.307 | | | | | |

The distance d2, d4, d6, d7, d9 and d11 between adjacent two lenses (see FIG. 1) along the optical axis are changed according to magnification as described in the following table 10.

TABLE 10

| magnification m | 2.0 | 1.0 | 0.5 |
|---|---|---|---|
| lens asbl.foc.le.f | 88.7 | 100.0(f0) | 88.7 |

TABLE 10-continued

| distance d2 | 1.420 | 0.233 | 0.964 |
| distance d4 | 4.116 | 5.319 | 4.527 |
| distance d6 | 0.249 | 0.233 | 0.294 |
| distance d7 | 0.294 | 0.233 | 0.249 |
| distance d9 | 4.527 | 5.319 | 4.116 |
| distance d11 | 0.964 | 0.233 | 1.420 |
| F number | 7.4 | 8.0 | 7.3 |
| object height Y | 34.5 | 69.0 | 69.0 |
| half field ang. ω | 17.4° | 19.0° | 17.4° |

Figure 18A:
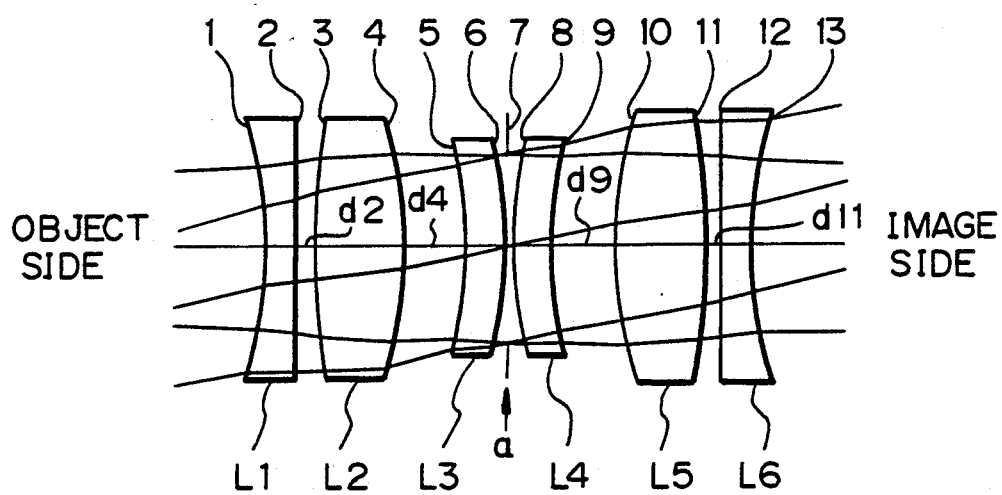
FIG. 18a is a constructional view of the zoom lens of the fifth embodiment of the present invention for explaining an optical path of the lens system at the time of forming a magnified size image.

FIG. 18a illustrates the zoom lens comprising the first to sixth lenses L1 to L6 specified as represented in Table 9 and Table 10 at the time of forming a magnified image (m=2.0). Also, FIGS. 18b and 18c illustrate the zoom lens at the time of forming a natural size image (m=1.0) and a reduced image (m=0.5), respectively.

In accordance with the fifth embodiment mentioned above, as in the case of the first embodiment, it becomes possible to continuously vary the power of the zoom lens maintaining the conjugate length between the object and the image constant irrespective of the magnifying state thereof.

Figure 18B:
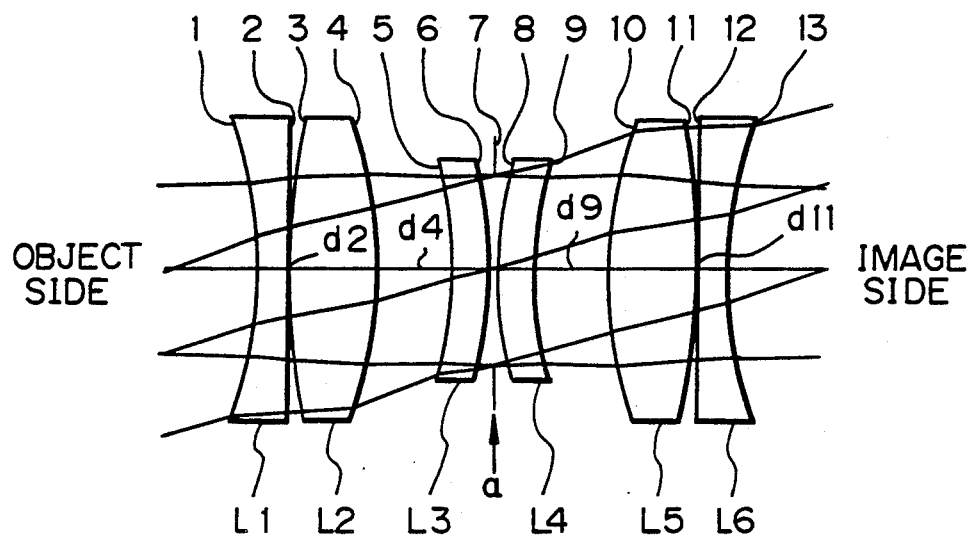
FIG. 18b is a constructional view of the zoom lens of the fifth embodiment for explaining the optical path thereof at the time of forming a natural size image.
Figure 18C:
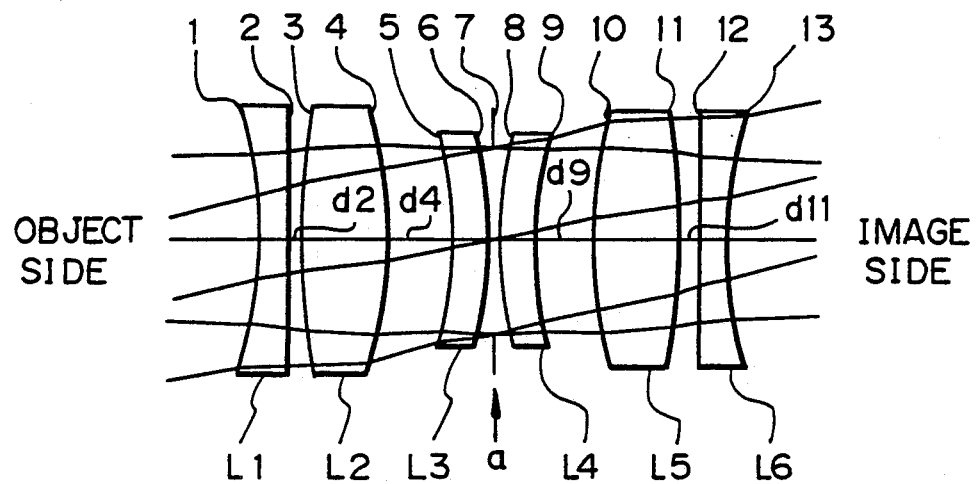
FIG. 18c is a constructional view of the zoom lens of the fifth embodiment for explaining the optical path thereof at the time of forming a reduced size image.

Also, FIGS. 19a-1, 19b-1 and 19c-1 graphically represent spherical aberration of the zoom lens in the magnifying state, the natural size state and the reducing state, illustrated in FIGS. 18a, 18b and 18c, respectively. Also, astigmatism of the zoom lens is represented in FIGS. 19a-2, 19b-2 and 19c-2, in the different magnifying state, respectively. Also, distortion aberration of the zoom lens is represented in FIGS. 19a-3, 19b-3 and 19c-3.

Figure 20B:
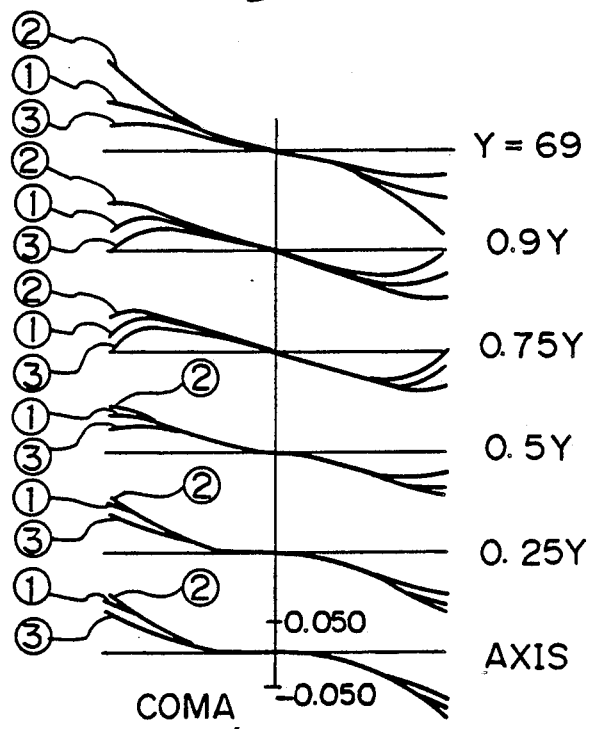
FIG. 20b is a graphical view for explaining coma aberration of the zoom lens of the fifth embodiment at the time of forming a natural size image.
Figure 20C:
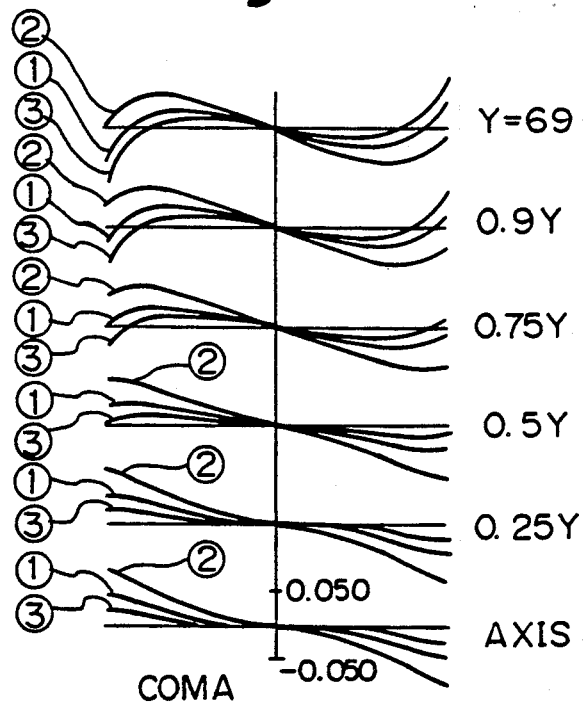
FIG. 20c is a graphical view for explaining coma aberration of the zoom lens of the fifth embodiment at the time of forming a reduced size image.
Figure 21A:
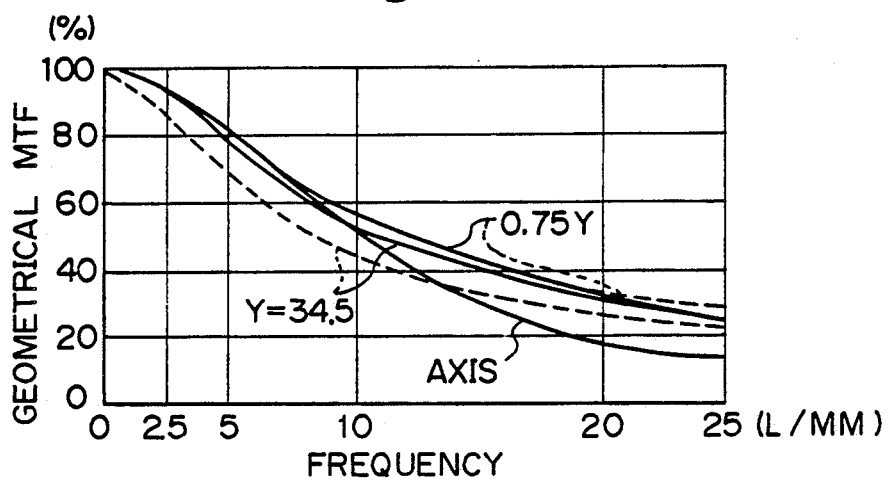
FIG. 21a is a graphical view for explaining MTF characteristic of the zoom lens of the fifth embodiment at the time of forming a magnified size image.
Figure 21B:
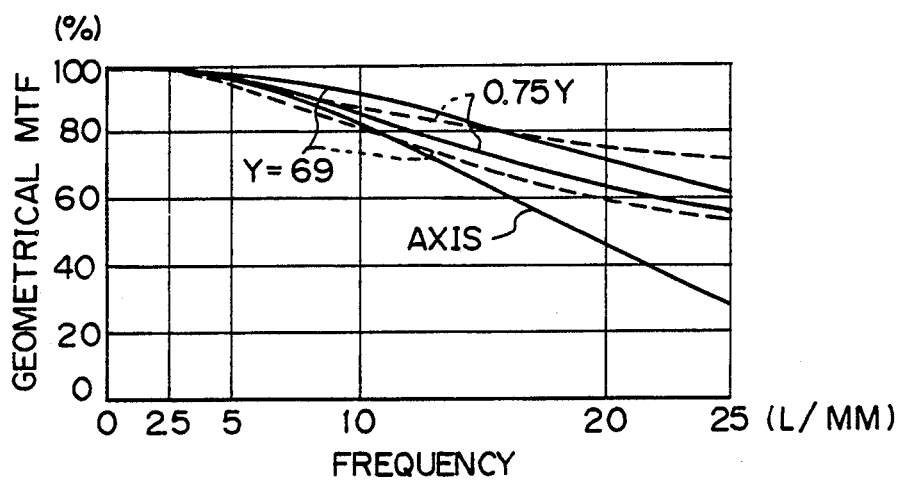
FIG. 21b is a graphical view for explaining MTF charasteristic of the zoom lens of the fifth embodiment at the time of forming a natural size image.
Figure 21C:
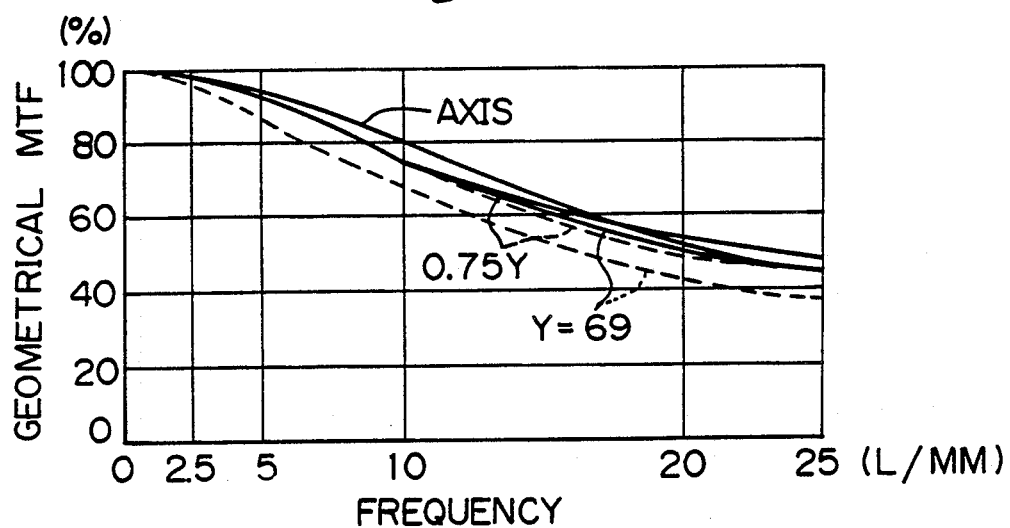
FIG. 21c is a graphical view for explaining MTF characteristic of the zoom lens of the fifth embodiment at the time of forming a reduced size image.

In connection with the coma aberration of the zoom lens, FIGS. 20a, 20b and 20c graphically represent the aberration in relation to the magnifying state of the zoom lens. Also, in connection with the geometrical MTF characteristic, FIGS. 21a, 21b and 21c graphically represent the characteristic in relation to the magnifying state of the zoom lens.

A sixth embodiment of the present invention is described hereinafter with reference to FIGS. 22a, 22b and 22c which illustrate the structure thereof in the magnifying state, the natural size state and the reducing state, respectively and FIGS. 23a-1 to 23a-3, 23b-1 to 23b-3, 23c-1 to 23c-3, 24a to 24c and 25a to 25c. This sixth embodiment comprises six lenses namely a first lens L1 to a sixth lens L6 which are specified as described in the following table 11.

TABLE 11

| S. No | Radius of Curvature ri | Distance di | Refractive Index Ni | Abbe's No νi |
|---|---|---|---|---|
| 1 | r1 −26.022 | | | |
| | | d1 1.861 | N1 1.59270 | ν1 35.3 |
| 2 | r2 23852.746 | | | |
| | | d2 varibl | — | — |
| 3 | r3 70.647 | | | |
| | | d3 5.466 | N2 1.67003 | ν2 47.3 |
| 4 | r4 −28.097 | | | |
| | | d4 varibl | — | — |
| 5 | r5 −19.755 | | | |
| | | d5 1.899 | N3 1.53172 | ν3 48.9 |
| 6 | r6 −28.109 | | | |
| | | d6 0.341 | — | — |
| 7 | r7 ∞ap.stp | | | |
| | | d7 0.341 | — | — |
| 8 | r8 28.109 | | | |
| | | d8 1.899 | N4 1.53172 | ν4 48.9 |
| 9 | r9 19.755 | | | |
| | | d9 varibl | — | — |
| 10 | r10 28.097 | | | |
| | | d10 5.466 | N5 1.67003 | ν5 47.3 |

TABLE 11-continued

| S. No | Radius of Curvature ri | Distance di | Refractive Index Ni | Abbe's No νi |
|---|---|---|---|---|
| 11 | r11 −70.647 | | | |
| | | d11 varibl | — | — |
| 12 | r12 −23852.746 | | | |
| | | d12 1.861 | N6 1.59270 | ν6 35.3 |
| 13 | r13 26.022 | | | |

The distance d2, d4, d9 and d11 between adjacent two lenses (see FIG. 1) along the optical axis are changed according to magnification as described in the following table 12.

TABLE 12

| magnification m | 2.0 | 1.0 | 0.5 |
|---|---|---|---|
| lens asbl.foc.le.f | 88.7 | 100.0(f0) | 88.7 |
| distance d2 | 1.383 | 0.233 | 0.971 |
| distance d4 | 3.974 | 5.124 | 4.386 |
| distance d9 | 4.386 | 5.124 | 3.974 |
| distance d11 | 0.971 | 0.233 | 1.383 |
| F number | 7.4 | 8.0 | 7.3 |
| object height Y | 34.5 | 69.0 | 69.0 |
| half field ang. ω | 17.4° | 19.0° | 17.4° |

Figure 22A:
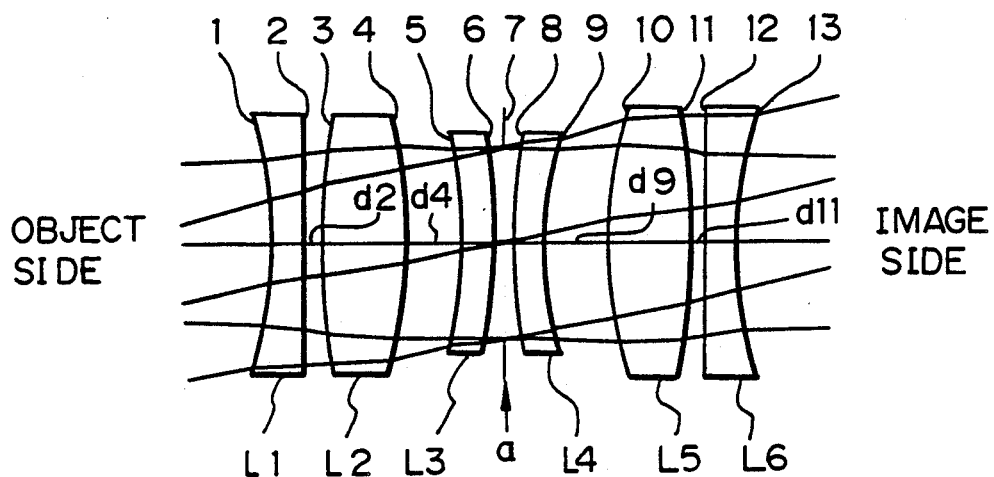
FIG. 22a is a constructional view of the zoom lens of the sixth embodiment of the present invention for explaining an optical path of the lens system at the time of forming a magnified size image.

FIG. 22a illustrates the zoom lens comprising the first to sixth lenses L1 to L6 specified as represented in Table 11 and Table 12 at the time of forming a magnified image (m=2.0). Also, FIGS. 22b and 22c illustrate the zoom lens at the time of forming a natural size image (m=1.0) and a reduced image (m=0.5), respectively.

In accordance with the sixth embodiment mentioned above, as in the case of the first embodiment, it becomes possible to continuously vary the power of the zoom lens maintaining the conjugate length between the object and the image constant irrespective of the magnifying state thereof.

In accordance with the sixth embodiment, value of d6 and d7 are fixed as 0.341 wherein d6 designates the distance between the lens surface 6 of the third lens L3 and the aperture stop 7 and d7 designates the distance between the lens surface 8 of the fourth lens L4 and the aperture stop 7, as illustrated in FIG. 1. Therefore, the zooming motion is carried out only by the second lens L2 and the fifth lens L5, whereas the first lens L1, the third lens L3, the fourth lens L4 and the sixth lens L6 are stationary to constitute fixed lens groups.

Figure 22B:
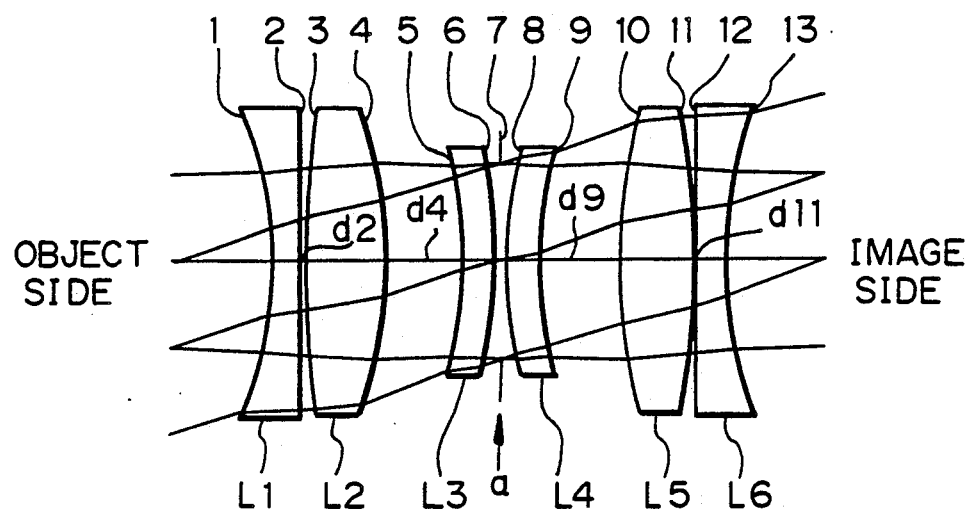
FIG. 22b is a constructional view of the zoom lens of the sixth embodiment for explaining the optical path thereof at the time of forming a natural size image.
Figure 22C:
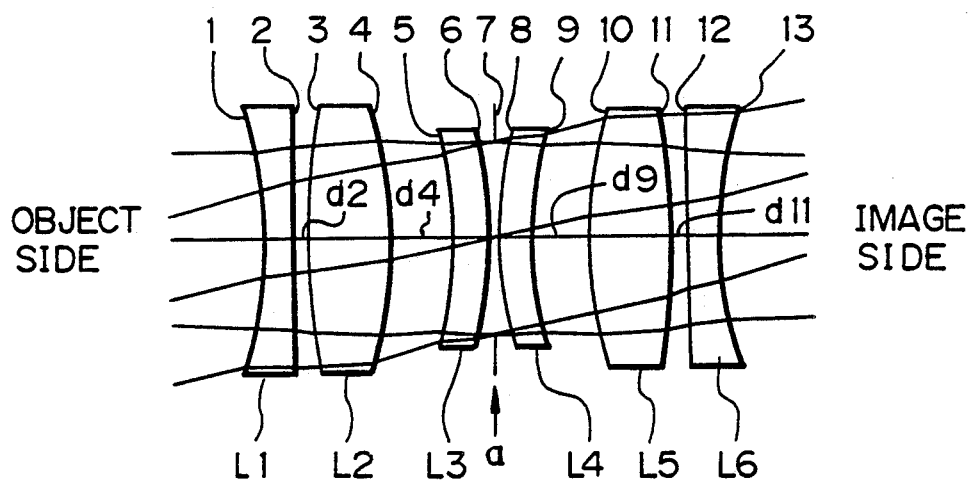
FIG. 22c is a constructional view of the zoom lens of the sixth embodiment for explaining the optical path thereof at the time of forming a reduced size image.
Figures 1, 2, 3, 23C:
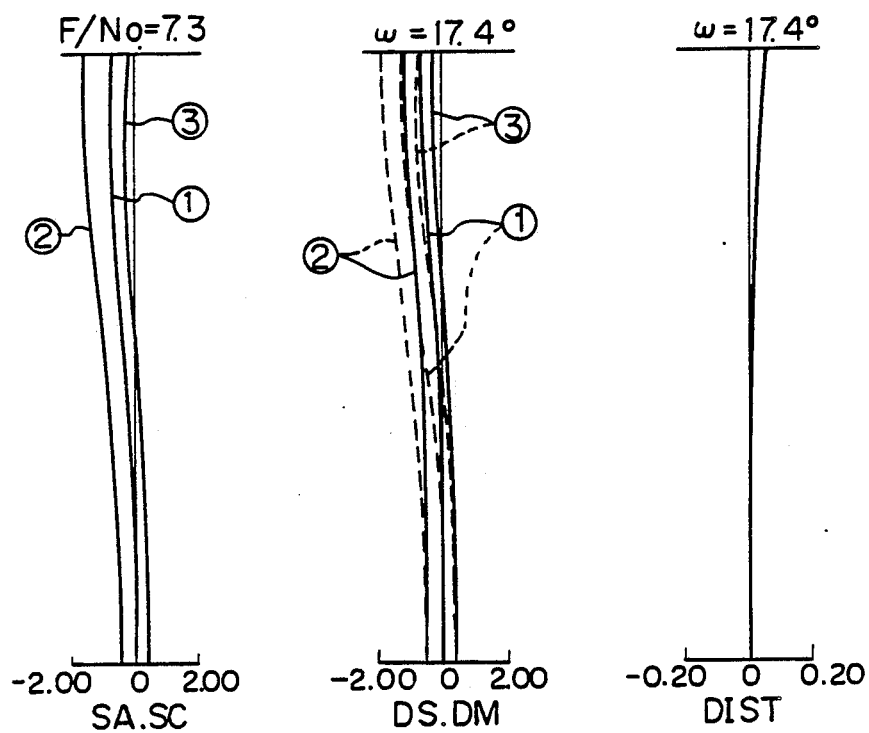

Also, FIGS. 23a-1, 23b-1 and 23c-1 graphically represent spherical aberration of the zoom lens in the magnifying state, the natural size state and the reducing state, illustrated in FIGS. 22a, 22b and 22c, respectively. Also, astigmatism of the zoom lens is represented in FIGS. 23a-2, 23b-2 and 23c-2, in the different magnifying state, respectively. Also, distortion aberration of the zoom lens is represented in FIGS. 23a-3, 23b-3 and 23c-3.

Figure 24A:
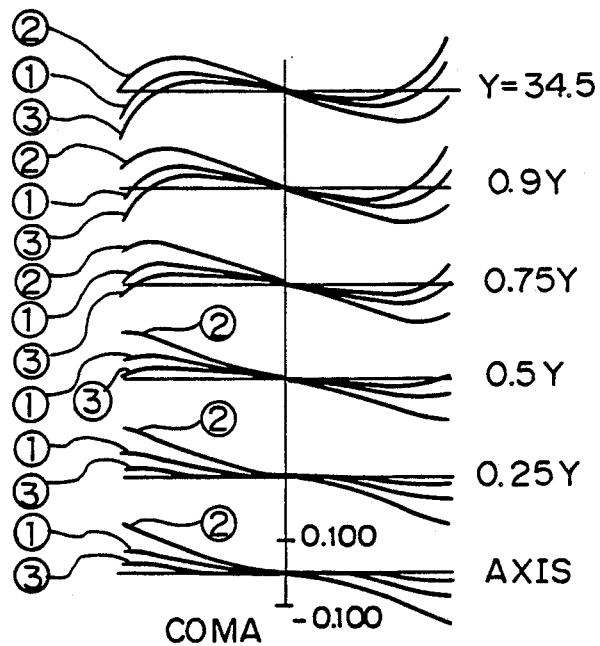
FIG. 24a is a graphical view for explaining coma aberration of the zoom lens of the sixth embodiment at the time of forming a magnified size image.
Figure 24B:
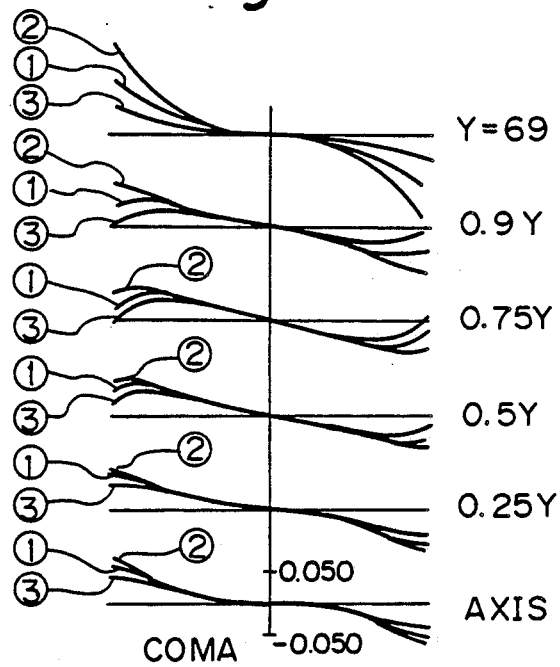
FIG. 24b is a graphical view for explaining coma aberration of the zoom lens of the sixth embodiment at the time of forming a natural size image.
Figure 24C:
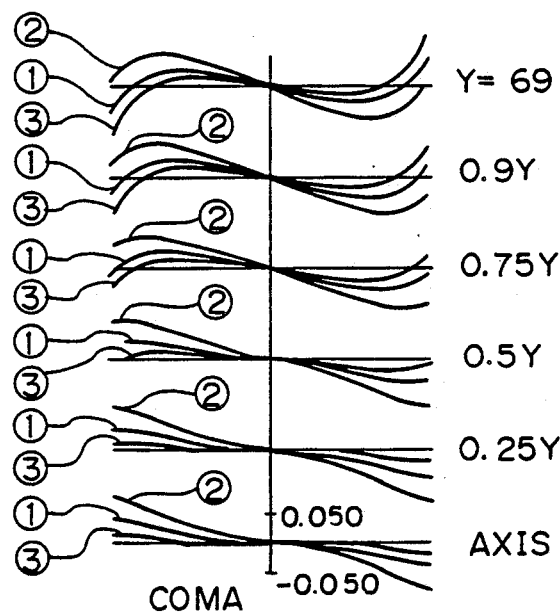
FIG. 24c is a graphical view for explaining coma aberration of the zoom lens of the sixth embodiment at the time of forming a reduced size image.
Figure 25A:
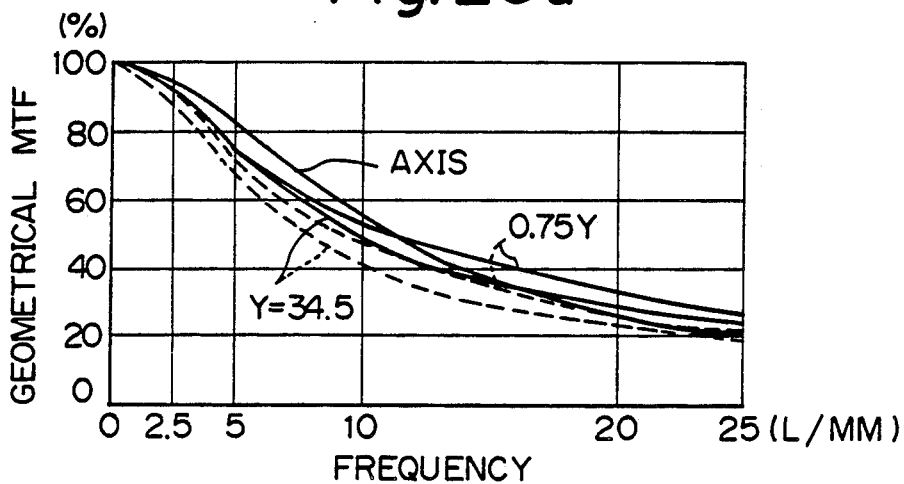
FIG. 25a is a graphical view for explaining MTF characteristic of the zoom lens of the sixth embodiment at the time of forming a magnified size image.
Figure 25B:
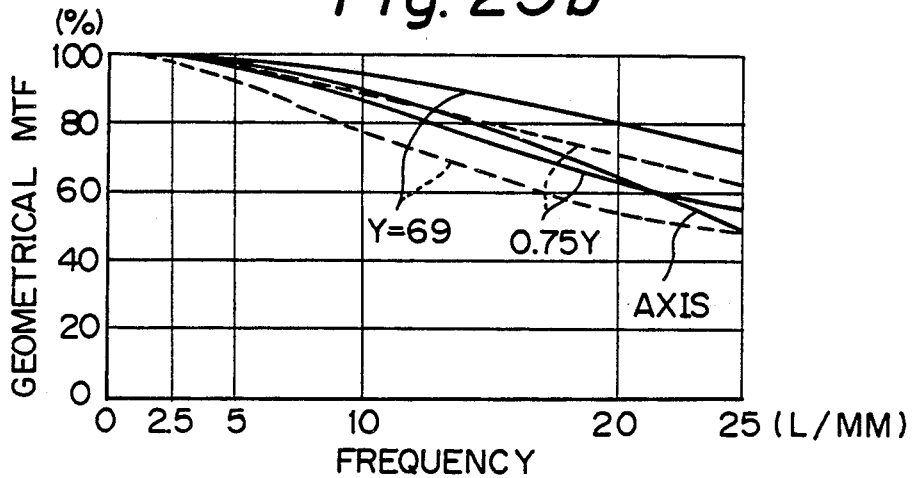
FIG. 25b is a graphical view for explaining MTF charasteristic of the zoom lens of the sixth embodiment at the time of forming a natural size image.
Figure 25C:
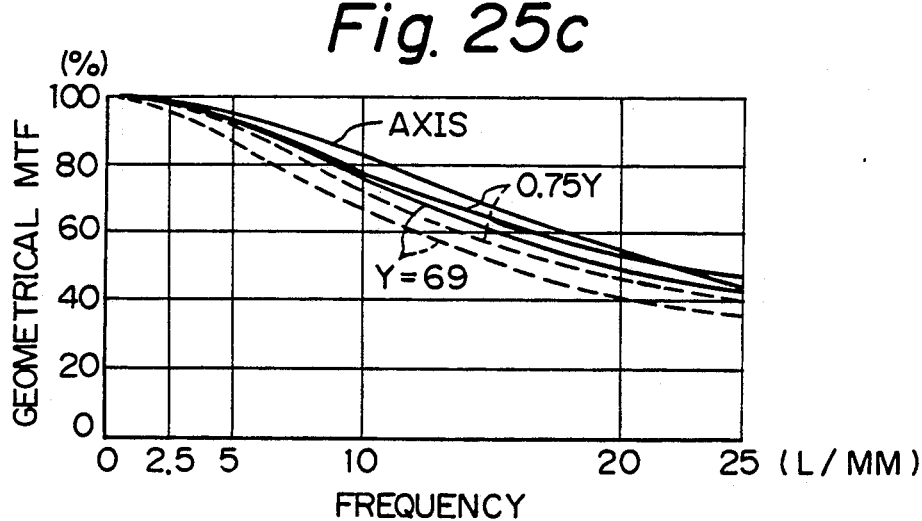
FIG. 25c is a graphical view for explaining MTF characteristic of the zoom lens of the sixth embodiment at the time of forming a reduced size image.

In connection with the coma aberration of the zoom lens, FIGS. 24a, 24b and 24c graphically represent the aberration in relation to the magnifying state of the zoom lens. Also, in connection with the geometrical MTF characteristic, FIGS. 25a, 25b and 25c graphically represent the characteristic in relation to the magnifying state of the zoom lens.

Each of the first to sixth embodiments of the present invention mentioned above satisfies the following conditions as described before.

$$0.4 < |f1/f0| < 0.65$$

and $$0.7 < |f3/f0| < 1.4$$

The value of each factor is represented in the following table 13.

TABLE 13

| | focs le. f1, f6 | focs le. f3, f4 | |f1/f0| | |f3/f0| |
|---|---|---|---|---|
| 1st emb | −45.3 | −113.9 | 0.45 | 1.14 |
| 2nd emb | −44.1 | −136.7 | 0.44 | 1.37 |
| 3rd emb | −48.3 | −102.9 | 0.48 | 1.03 |
| 4th emb | −57.8 | −76.6 | 0.58 | 0.77 |
| 5th emb | −44.1 | −136.7 | 0.44 | 1.37 |
| 6th emb | −43.9 | −135.7 | 0.44 | 1.36 |
| | | (f0 = 100.0) | | |

As can be seen from the table 13, all of the first to sixth embodiments satisfy the conditions mentioned above.

A seventh embodiment to an eleventh embodiment of the zoom lens for a variable power copying apparatus in accordance with the second essential constitution of the present invention are described hereinafter with reference to the drawings.

For a start, a seventh embodiment of the zoom lens of the present invention is explained with reference to FIGS. 26, 27a to 27c, 28a-1 to 28a-3, 28b-1 to 28b-3, 28c-1 to 28c-3, and 29a to 29c.

Figure 26:
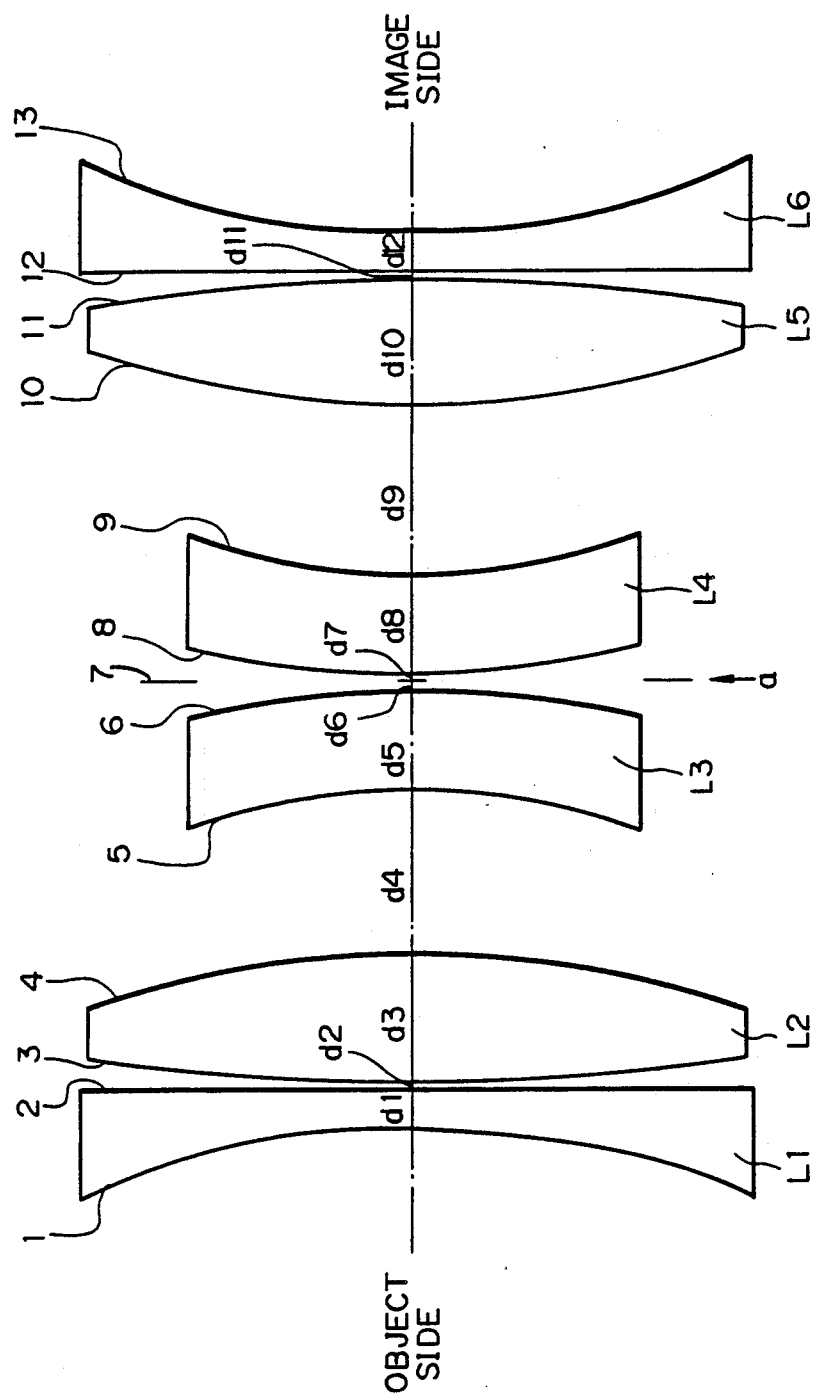
FIG. 26 is a constructional view of a second essential structure of a zoom lens for a variable power copying apparatus in accordance with the present invention.

FIG. 26 illustrates an essential structure of the zoom lens in accordance with the present invention. The zoom lens is installed in, for example an electrophotographic copying apparatus and disposed between an object that is an original to be copied and an image carrier that is for example a photoconductor drum. This zoom lens comprises a first lens L1, a second lens L2, a third lens L3, an aperture stop 7, a fourth lens L4, a fifth lens L5 and a sixth lens L6 disposed in this order from the object side toward the image side. The first lens L1 is composed of a double concave lens or a meniscus concave lens (a negative concave lens) having a concave surface 1 in the object side and a concave or convex surface 2 in the image side. The second lens L2 is composed of a convex lens (a double convex lens or a positive meniscus lens) having a convex or concave surface 3 and a convex surface 4. The third lens L3 is composed of a meniscus concave lens having a concave surface 5 in the object side and a convex surface 6 in the image side. The aperture stop 7 is disposed at a position (a) facing to the image side convex surface 6 of the third lens L3. The fourth lens L4 is disposed on the image side of the aperture stop 7 and composed of a meniscus concave lens having an object side oriented convex surface 8 which has the same shape as the convex surface 6 of the third lens L3 and an image side oriented concave surface 9 which has the same shape as the concave surface 5 of the third lens L3. The fifth lens L5 is disposed on the image side of the fourth lens L4 and composed of a convex lens (a double convex lens or a positive meniscus lens) having a convex surface 10 which has the same shape as the convex surface 4 of the second lens L2 and a convex or concave surface 11 which has the same shape as the surface 3 of the second lens L2. The sixth lens L6 is disposed on the image side of the fifth lens L5 and composed of a double concave lens or a meniscus concave lens having a concave surface oriented to the image side. The sixth lens L6 has a concave or convex surface 12 which has the same shape as the surface 2 of the first lens L1 and a concave surface 13 which has the same shape as the concave surface 1 of the first lens L1.

Radii of curvature r1 to r13 of the lens surfaces 1 to 6 of the lenses L1 to L3, the aperture stop surface 7 and the lens surfaces 8 to 13 of the lenses L4 to L6 are represented in the following table 14 along with the distances d1 to d12 between adjacent two surfaces on the optical axis, the refractive indices N1 to N6 of the lenses L1 to L6 and Abbe's number $\nu 1$ to $\nu 6$.

In this embodiment, the zooming motion of the zoom lens is carried out by the second lens L2 and the fifth lens L5. The other lenses, i.e., the first lens L1, the third lens L3, the fourth lens L4 and the sixth lens L6 are stationary and constitute fixed lens groups.

TABLE 14

| S. No | Radius of Curvature ri | | Distance di | Refractive Index Ni | | Abbe's No $\nu$ i | |
|---|---|---|---|---|---|---|---|
| 1 | r1 | −59.782 | | | | | |
| | | | d1 | 3.309 | N1 1.59551 | $\nu$ 1 | 39.2 |
| 2 | r2 | 1897.085 | | | | | |
| | | | d2 | varibl | — | — | — |
| 3 | r3 | 161.802 | | | | | |
| | | | d3 | 12.468 | N2 1.67003 | $\nu$ 2 | 47.2 |
| 4 | r4 | −61.707 | | | | | |
| | | | d4 | varibl | — | — | — |
| 5 | r5 | −42.215 | | | | | |
| | | | d5 | 8.001 | N3 1.78472 | $\nu$ 3 | 25.7 |
| 6 | r6 | −53.865 | | | | | |
| | | | d6 | 0.503 | — | — | — |
| 7 | r7 | ∞ap.stp | | | | | |
| | | | d7 | 0.503 | — | — | — |
| 8 | r8 | 53.865 | | | | | |
| | | | d8 | 8.001 | N4 1.78472 | $\nu$ 4 | 25.7 |
| 9 | r9 | 42.215 | | | | | |
| | | | d9 | varibl | — | — | — |
| 10 | r10 | 61.707 | | | | | |
| | | | d10 | 12.468 | N5 1.67003 | $\nu$ 5 | 47.2 |
| 11 | r11 | −161.802 | | | | | |
| | | | d11 | varibl | — | — | — |
| 12 | r12 | −1897.085 | | | | | |
| | | | d12 | 3.309 | N6 1.59551 | $\nu$ 6 | 39.2 |
| 13 | r13 | 59.782 | | | | | |

The zoom lens assembly system comprising the first to sixth lenses L1 to L6 is characterized as specified in the table mentioned above. The specified zoom lens assembly satisfies the following conditions, i. e., $$0.4 < |f1/f0| < 0.7$$

and $$0.3 < f2/f0 < 0.45$$

wherein f1 designates the focal length of the first lens L1, f2 designates the focal length of the second lens L2 and f0 designates the focal length of the whole lens assembly of the zoom lens in the state of forming an image of the natural size scale. More precisely, f1= −97.26, f2=68.2 and f0=190.02, which makes |f1/f0|0.51 and f2/f0 0.359, respectively.

It is to be noted that the first lens L1 is precisely the same as the sixth lens L6 and the second lens L2 is precisely the same as the fifth lens L5 except that the first anf second lenses L1 and L2 are oriented opposite to the sixth and fifth lenses L6 and L5, respectively. Therefore, the zoom lens assembly also satisfies the conditions, i.e., $$0.4 < |f6/f0| < 0.7$$

and $0.3 < f5/f0 < 0.45$ wherein f6 designates the focal length of the sixth lens L6 and f5 designates the focal length of the fifth lens L5, respectively. In other words, $|f1/f0|$ is equal to $|f6/f0|$ and $f2/f0$ is equal to $f5/f0$, respectively.

The condition $0.4 < |f1/f0| < 0.7$ or $0.4 < |f6/f0| < 0.7$ described above determines the power of the first and sixth lenses L1 and L6 which are arranged as fixed lens groups added to the outside of the movable master lens consisting of the second to fifth lenses L2 to L5.

If the value of $|f1/f0|(=|f6/f0|)$ exceeds the maximum limit 0.7, the lenses have to move a large amount of distance at the time of varying the power of the zoom lens, which prevents to realize a compact structure of the zoom lens system.

On the other hand, if the value of $|f1/f0|(=|f6/f0|)$ becomes less than the minimum limit 0.4, a very large aberration generates in the fixed lens groups, i.e., the first lens L1 and the sixth lens L6. In order to correct the aberration, it is necessary to add correction lenses to the fixed lens groups, which causes increase of the cost and prevents simplification of the zoom lens structure.

On the other hand, the condition $0.3 < f2/f0 < 0.45$ or $0.3 < f5/f0 < 0.45$ determines the power of the master lens composed of the second to fifth lenses L2 to L5.

If the value of $f2/f0(=f5/f0)$ exceeds the maximum limit 0.45, Petzval's sum becomes excessively large and the image is shifted to the negative side so that astigmatic difference (aberration) becomes large.

To the contrary, if the value of $f2/f0(=f5/f0)$ becomes less than the minimum limit 0.3, Petzval's sum becomes excessively small and the image is shifted to the positive side so that curvature of field becomes large.

Also, if the value of $f2/f0(=f5/f0)$ exceeds the maximum limit or falls below the minimum limit, the zoom lens characteristic on the optical axis and that out of the optical axis become unbalanced with each other, which causes to degrade MTF (modulation transfer function).

The distances d2, d4, d9 and d11 defined in FIG. 26 and specified in table 14 for natural size image are different from those for magnified or reduced size image since the second lens L2 and the fifth lens L5 move as represented in table 15 below.

TABLE 15

| magnification m | 2.0 | 1.0 | 0.5 |
|---|---|---|---|
| lens asbl. foc. le. f | 168.48 | 190.02(f0) | 168.48 |
| distance d2 | 3.942 | 1.018 | 2.655 |
| distance d4 | 7.622 | 10.546 | 8.909 |
| distance d9 | 8.909 | 10.546 | 7.622 |
| distance d11 | 2.655 | 1.018 | 3.942 |
| F number | 6.0 | 6.5 | 6.0 |
| object height Y | 74.25 | 148.5 | 148.5 |
| half field ang. ω | 16.4° | 21.3° | 16.4° |

Figure 27A:
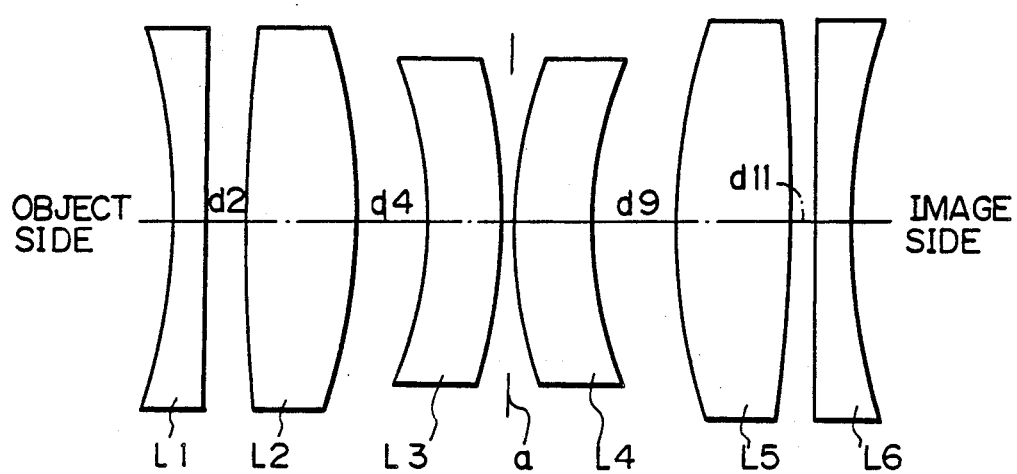
FIG. 27a is a constructional view for explaining the structure of a seventh embodiment of the zoom lens for a variable copying apparatus in accordance with the present invention at the time of forming a magnified size image.
Figure 27B:
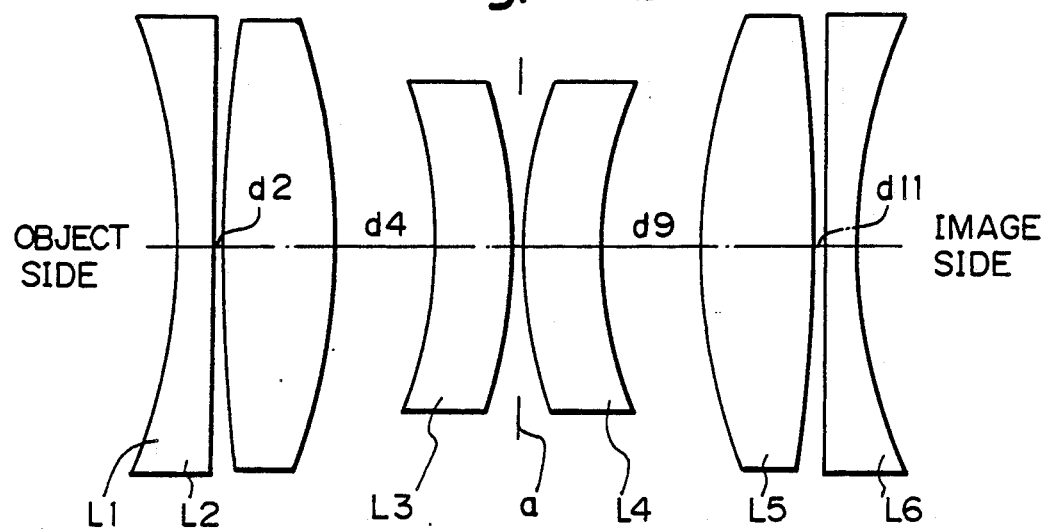
FIG. 27b is a constructional view for explaining the structure of the zoom lens of the seventh embodiment of the present invention at the time of forming a natural size image.
Figure 27C:
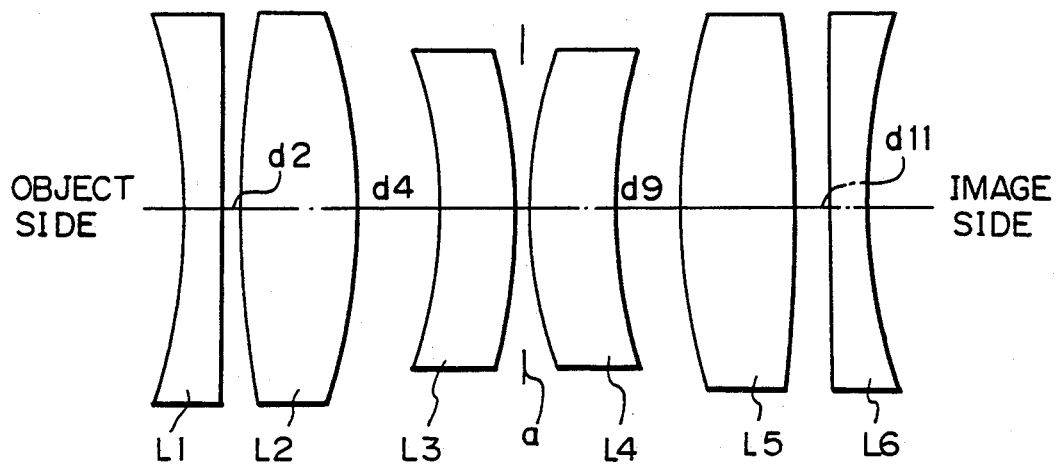
FIG. 27c is a constructional view for explaining the structure of the zoom lens of the seventh embodiment of the present invention at the time of forming a reduced size image.

FIG. 27a illustrates the zoom lens comprising the first to sixth lenses L1 to L6 specified as represented in Table 14 at the time of forming a magnified image (m=2.0). Also, FIGS. 27b and 27c illustrate the zoom lens at the time of forming a natural size image (m=1.0) and a reduced image (m=0.5), respectively.

As mentioned before, the first lens L1, the third lens L3, the fourth lens L4 and the sixth lens L6 are fixed and stationary. With regard to the distance d2 that is the amount of movement of the second lens L2 with respect to the first lens L1, the distance d2 changes from 3.942 through 1.018 to 2.655, from the magnifying state (m=2.0) through the natural size state (m=1.0) to the reduced size state (m=0.5).

On the other hand, with regard to the distance d11 that is the amount of movement of the fifth lens L5 with respect to the sixth lens L6, the distance d11 changes from 2.655 through 1.018 to 3.942, from the magnifying state (m=2.0) through the natural size state (m=1.0) to the reduced size state (m=0.5).

As can be seen by comparing the distance changes of the lenses L2 and L5 mentioned above, movement of the second lens L2 is opposite to that of the fifth lens L5 in the magnifying state and reducing state, being equalized in the natural size state. That is, the magnifying state movement of the second lens L2 is equal to the reducing state movement of the fifth lens L5, while the reducing state movement of the second lens L2 is equal to the magnifying movement of the fifth lens L5.

Therefore, within the zoom lens assembly, the lens elements L1 to L6 move in such a way that, at the time of forming the natural size image, the lenses L1 to L6 are arranged symmetrical with respect to the aperture stop 7, and that, at the time of varying the power of the zoom lens, the first lens L1, the third lens L3, the fourth lens L4 and the sixth lens L6 are fixed while the second lens L2 and the fifth lens L5 are moved in such a way that the magnifying movement of the lenses is symmetrical with respect to the reducing movement thereof and vice versa.

The whole optical lens system moves along the optical axis between the object and the image along with the zooming motion of the zoom lens so that it becomes possible to continuously vary the power of the lens system maintaining the conjugate length between the object and the image constant irrespective of the magnifying state of the zoom lens.

FIGS. 28a-1, 28b-1 and 28c-1 graphically represent spherical aberration of the zoom lens of the seventh embodiment of the invention in the magnifying state, the natural size state and the reducing state, illustrated in FIGS. 27a, 27b and 27c, respectively. In FIGS. 28a-1, 28b-1 and 28c-1, lines ①, ② and ③ represent the aberration with respect to D-line (587.56 nm), C-line (656.27 nm) and F-line (486.13 nm), respectively. Also, FIGS. 28a-2, 28b-2 and 28c-2 graphically represent astigmatism with respect to D-line ①, C-line ② and F-line ③, for sagittal rays and meridional rays, respectively. Also, FIGS. 28a-3, 28b-3 and 28c-3 graphically represent distortion aberration.

Figure 29A:
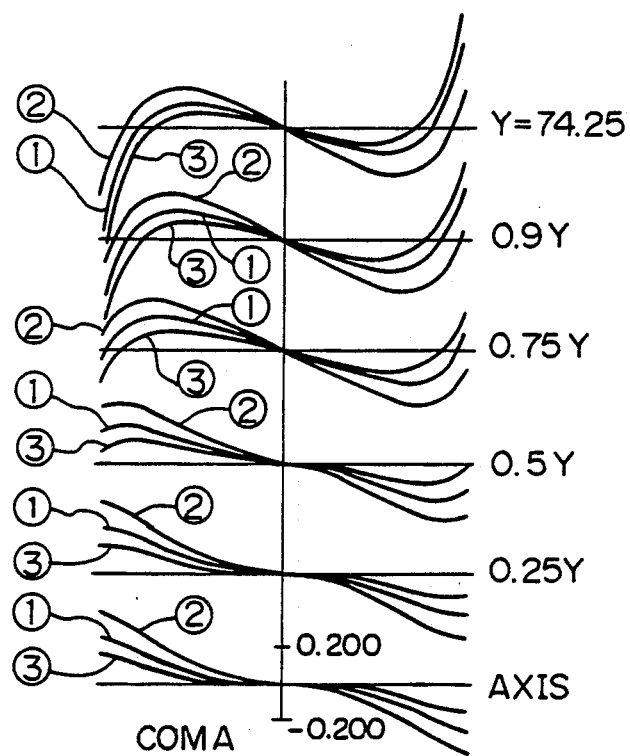
Figure 29B:
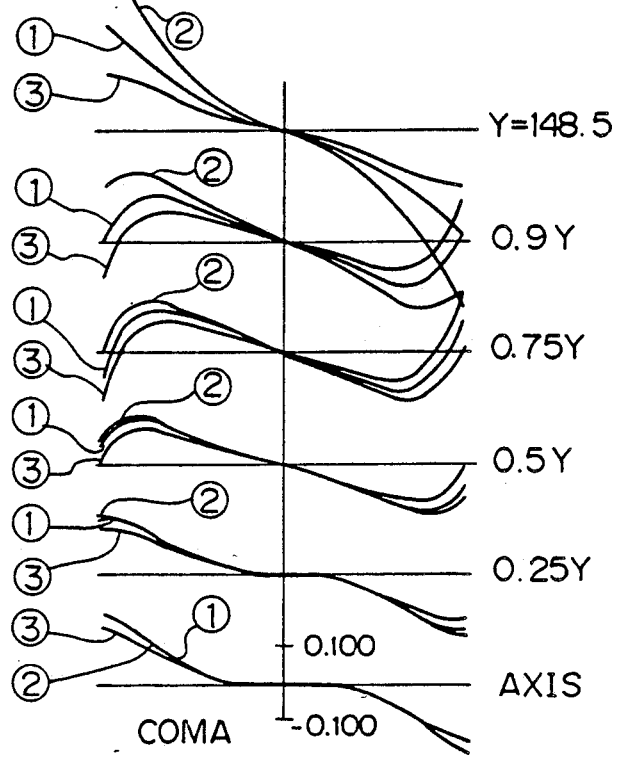
Figure 29C:
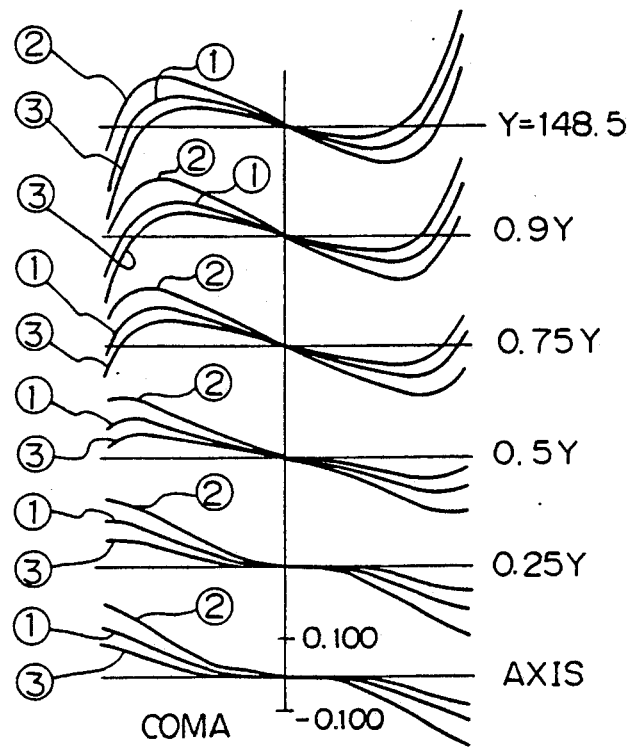

Also, with regard to coma aberration, FIG. 29a graphically represents the aberration of the zoom lens in the magnifying state (m=2.0) with respect to D-line ①, C-line ② and F-line ③, respectively. Also, FIGS. 29b and 29c graphically represent the aberration in the natural size state (m=1.0) and the reducing state (m=0.5), respectively. The height Y of the object of FIG. 29a (m=2.0) is 74.25. The height Y of the object of FIGS. 29b (m=1.0) and 29c (m=0.5) is 148.5. The drawings represent the aberration characteristic at the height Y, 0.9Y, 0.75Y, 0.5Y, 0.25Y and on the optical axis, respectively.

Note that, in FIGS. 28a-1, 28b-1 and 28c-1, SA designates spherical aberration and SC designates sine condition, respectively and that spherical aberration is represented by a solid line and sine condition is represented by a dash line.

In FIGS. 28a-2, 28b-2 and 28c-2, DS and DM designate astigmatism. Solid lines represent the aberration with respect to sagittal rays and dash lines represent the aberration with respect to meridional rays, respectively.

Also, in FIGS. 28a-3, 28b-3 and 28c-3, DIST designates distortion of the image formed by the zoom lens.

Figures 1, 2, 3, 28C:
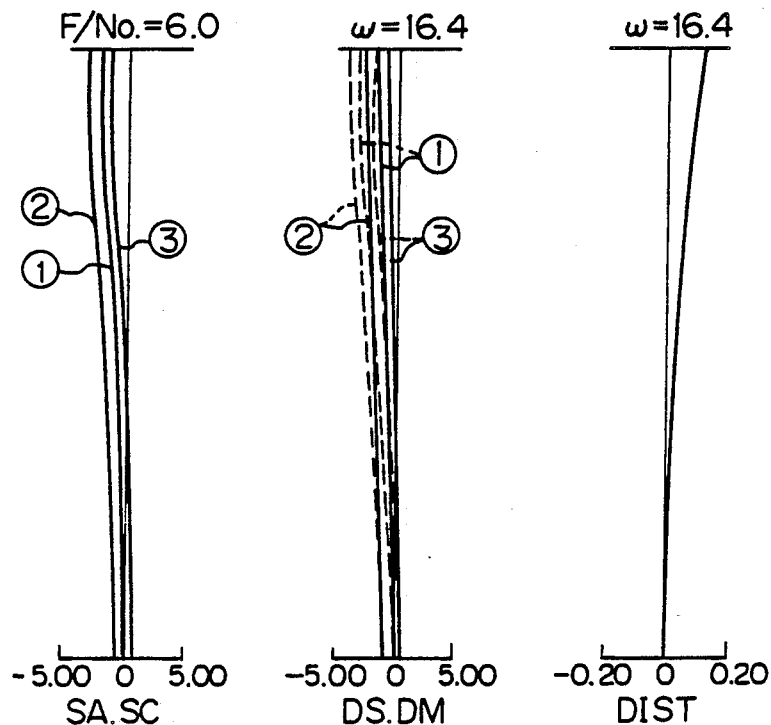

As can be seen from the above-mentioned aberration characteristic graphs of FIGS. 28a to 28c, the lens characteristics on the optical axis and out of the optical axis are well balanced in each of the magnification states. Also, with respect to coma aberration, in spite of almost 100 percent vignetting factor, flare component ratio is very small which means that the aberration is fully corrected.

An eighth embodiment of the present invention is described hereinafter with reference to FIGS. 30a, 30b and 30c which illustrate the structure thereof in the magnifying state, the natural size state and the reducing state, respectively, as well as to FIGS. 31a-1 to 31a-3, 31b-1 to 31b-3, 31c-1 to 31c-3, and 32a to 32c. The eighth embodiment comprises first to sixth lenses L1 to L6 which are specified as described in the following table 16.

TABLE 16

| S. No | Radius of Curvature ri | | Distance di | Refractive Index Ni | | Abbe's No νi |
|---|---|---|---|---|---|---|
| 1 | r1 | −58.952 | | | | |
| | | | d1 3.225 | N1 | 1.72342 | ν1 38.0 |
| 2 | r2 | −439.204 | | | | |
| | | | d2 varibl | — | — | — |
| 3 | r3 | 260.95 | | | | |
| | | | d3 11.534 | N2 | 1.7430 | ν2 49.2 |
| 4 | r4 | −62.276 | | | | |
| | | | d4 varibl | — | — | — |
| 5 | r5 | −42.449 | | | | |
| | | | d5 8.072 | N3 | 1.71736 | ν3 29.5 |
| 6 | r6 | −53.387 | | | | |
| | | | d6 0.5 | — | — | — |
| 7 | r7 | ∞ ap. stp | | | | |
| | | | d7 0.5 | — | — | — |
| 8 | r8 | 53.387 | | | | |
| | | | d8 8.072 | N4 | 1.71736 | ν4 29.5 |
| 9 | r9 | 42.449 | | | | |
| | | | d9 varibl | — | — | — |
| 10 | r10 | 62.276 | | | | |
| | | | d10 11.534 | N5 | 1.74330 | ν5 49.2 |
| 11 | r11 | −260.95 | | | | |
| | | | d11 varibl | — | — | — |
| 12 | r12 | 439.204 | | | | |
| | | | d12 3.225 | N6 | 1.72342 | ν6 38.0 |
| 13 | r13 | 58.952 | | | | |

The first to sixth lenses L1 to L6 of the eighth embodiment are specified as described in Table 16 above. Distances d2, d4, d9 and d11 of the adjacent two lenses of the six lenses L1 to L6 (see FIG. 26 or FIGS. 27) are changed in response to the magnification of the zoom lens as described in the following table 17.

TABLE 17

| magnification m | 2.0 | 1.0 | 0.5 |
|---|---|---|---|
| lens asbl. foc. le. f | 169.94 | 190.0 (f0) | 169.94 |
| distance d2 | 3.1 | 0.5 | 1.85 |
| distance d4 | 8.569 | 11.17 | 9.819 |
| distance d9 | 9.819 | 11.17 | 8.569 |
| distance d11 | 1.85 | 0.5 | 3.1 |
| F number | 6.0 | 6.5 | 6.0 |
| object height Y | 74.25 | 148.5 | 148.5 |
| half field ang. ω | 16.4° | 21.3° | 16.4° |

Figure 30A:
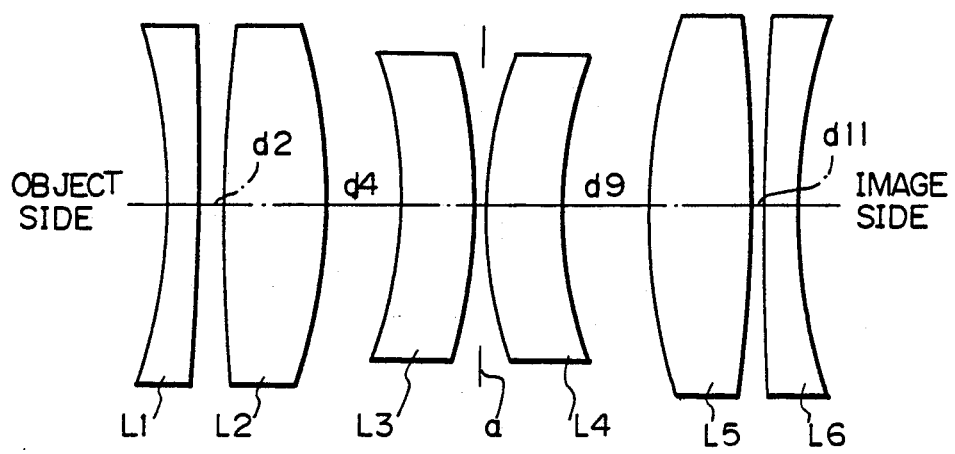

FIG. 30a illustrates the structure of the zoom lens comprising the first to sixth lenses L1 to L6 specified as represented in Table 16 and Table 17, respectively, at the time of forming a magnified image (m=2.0). Also, FIGS. 30b and 30c illustrate structure of the zoom lens at the time of forming a natural size image (m=1.0) and a reduced image (m=0.5), respectively.

In accordance with this embodiment, it is also possible, as in the case of the seventh embodiment mentioned above, to continuously vary the power of the zoom lens for a copying apparatus with maintaining the conjugate length between the object and the image constant regardless of the magnification of the zoom lens.

Figure 30B:
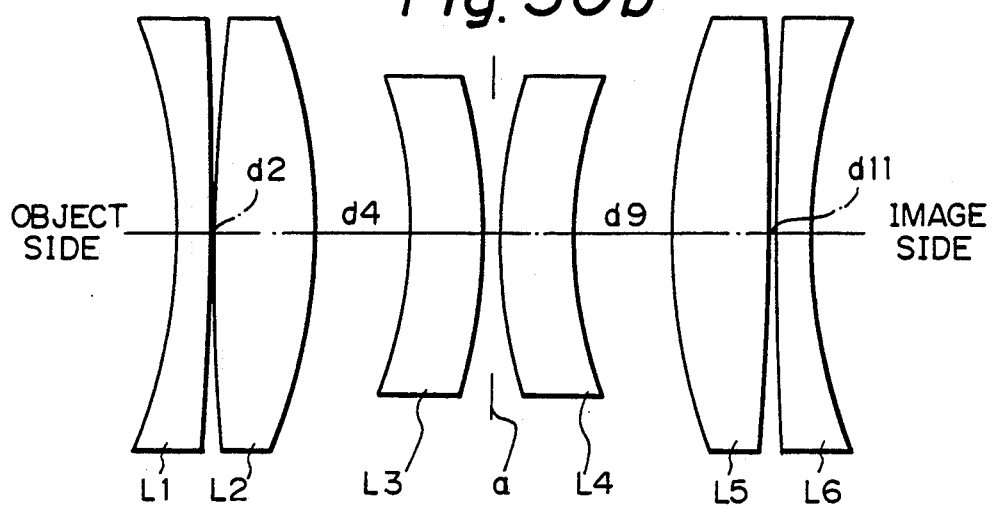
Figure 30C:
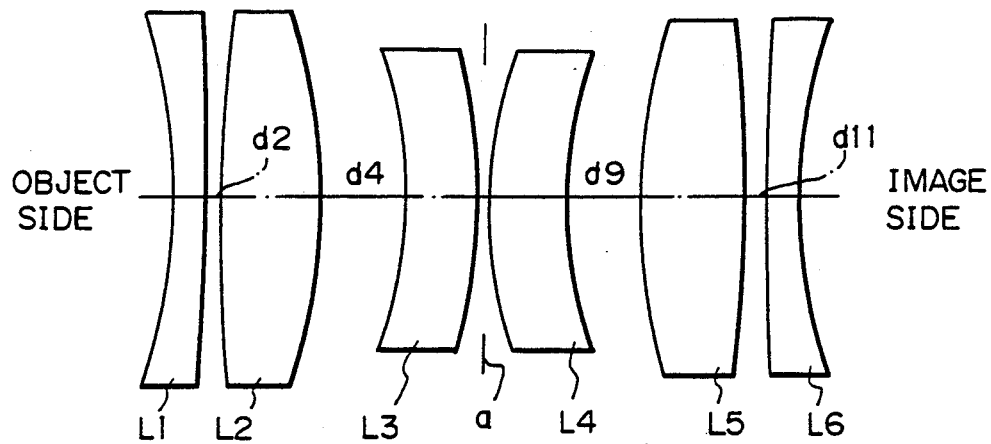
Figure 3L:
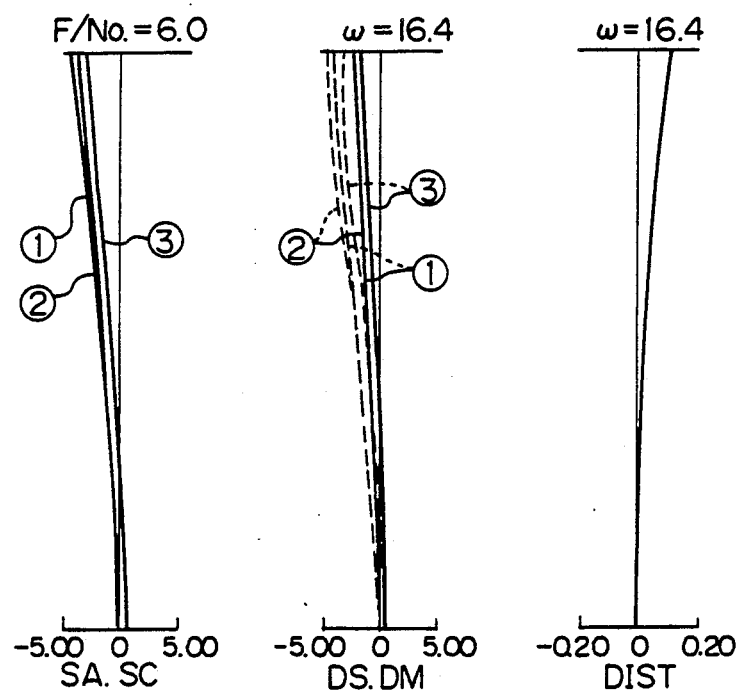

FIGS. 31a-1, 31b-1 and 31c-1 graphically represent the spherical aberration of the zoom lens of the eighth embodiment of the invention in the magnifying state, the natural size state and the reducing state, illustrated in FIGS. 30a, 30b and 30c, respectively. Also, the astigmatism of the zoom lens in the different magnification states thereof are represented in FIGS. 31a-2, 31b-2 and 31c-2, respectively. Also, the distortion aberration of the zoom lens in the different magnification states thereof are represented in FIGS. 31a-3, 31b-3 and 31c-3, respectively.

Further, the coma aberration of the zoom lens in the different magnification states thereof are represented in FIGS. 32a to 32c.

A ninth embodiment of the present invention is described hereinafter with reference to FIGS. 33a, 33b and 33c which illustrate the structure thereof in the magnifying state, the natural size state and the reducing state, respectively, as well as to FIGS. 34a-1 to 34a-3, 34b-1 to 34b-3, 34c-1 to 34c-3, and 35a to 35c. The ninth embodiment comprises first to sixth lenses L1 to L6 which are specified as described in the following table 18.

TABLE 18

| S. No | Radius of Curvature ri | | Distance di | Refractive Index Ni | | Abbe's No νi |
|---|---|---|---|---|---|---|
| 1 | r1 | −58.714 | | | | |
| | | | d1 3.417 | N1 | 1.70154 | ν1 41.1 |
| 2 | r2 | −338.595 | | | | |
| | | | d2 varibl | — | — | — |
| 3 | r3 | 321.739 | | | | |
| | | | d3 10.328 | N2 | 1.69350 | ν2 53.3 |
| 4 | r4 | −59.491 | | | | |
| | | | d4 varibl | — | — | — |
| 5 | r5 | −41.37 | | | | |
| | | | d5 9.117 | N3 | 1.75520 | ν3 27.5 |
| 6 | r6 | −51.481 | | | | |
| | | | d6 0.558 | — | — | — |
| 7 | r7 | ∞ ap. stp | | | | |
| | | | d7 0.558 | — | — | — |
| 8 | r8 | 51.481 | | | | |
| | | | d8 9.117 | N4 | 1.7552 | ν4 27.5 |
| 9 | r9 | 41.37 | | | | |
| | | | d9 varibl | — | — | — |
| 10 | r10 | 59.491 | | | | |
| | | | d10 10.328 | N5 | 1.69350 | ν5 53.3 |
| 11 | r11 | −321.739 | | | | |
| | | | d11 varibl | — | — | — |
| 12 | r12 | 338.595 | | | | |
| | | | d12 3.417 | N6 | 1.70154 | ν6 41.1 |
| 13 | r13 | 58.714 | | | | |

The first to sixth lenses L1 to L6 of the ninth embodiment are specified as described in Table 18 above. Distances d2, d4, d9 and d11 of the adjacent two lenses of the six lenses L1 to L6 (see FIG. 26 or FIGS. 27) are changed in response to the magnification of the zoom lens as described in the following table 19.

TABLE 19

| magnification m | 2.0 | 1.0 | 0.5 |
|---|---|---|---|
| lens asbl. foc. le. f | 168.51 | 190.02(f0) | 168.51 |
| distance d2 | 4.413 | 1.315 | 3.005 |
| distance d4 | 7.514 | 10.612 | 8.922 |

TABLE 19-continued

| | | | |
|---|---|---|---|
| distance d9 | 8.922 | 10.612 | 7.514 |
| distance d11 | 3.005 | 1.315 | 4.413 |
| F number | 6.0 | 6.5 | 6.0 |
| object height Y | 74.25 | 148.5 | 148.5 |
| half field ang. ω | 16.4° | 21.3° | 16.4° |

FIG. 33a illustrates the structure of the zoom lens comprising the first to sixth lenses L1 to L6 specified as represented in Table 18 and Table 19, respectively, at the time of forming a magnified image (m=2.0). Also, FIGS. 33b and 33c illustrate the structure of the zoom lens at the time of forming a natural size image (m=1.0) and a reduced image (m=0.5), respectively.

In accordance with this embodiment, it is also possible, as in the case of the seventh embodiment mentioned above, to continuously vary the power of the zoom lens for a copying apparatus with maintaining the conjugate length between the object and the image constant regardless of the magnification of the zoom lens.

FIGS. 34a-1, 34b-1 and 34c-1 graphically represent the spherical aberration of the zoom lens of the ninth embodiment of the invention in the magnifying state, the natural size state and the reducing state, illustrated in FIGS. 33a, 33b and 33c, respectively. Also, the astigmatism of the zoom lens in the different magnification states thereof are represented in FIGS. 34a-2, 34b-2 and 34c-2, respectively. Also, the distortion aberration of the zoom lens in the different magnification states thereof are represented in FIGS. 34a-3, 34b-3 and 34c-3, respectively.

Further, the coma aberration of the zoom lens in the different magnification states thereof are represented in FIGS. 35a to 35c.

A tenth embodiment of the present invention is described hereinafter with reference to FIGS. 36a, 36b and 36c which illustrate the structure thereof in the magnifying state, the natural size state and the reducing state, respectively, as well as to FIGS. 37a-1 to 37a-3, 37b-1 to 37b-3, 37c-1 to 37c-3, and 38a to 38c. The tenth embodiment comprises first to sixth lenses L1 to L6 which are specified as described in the following table 20.

TABLE 20

| S. No | Radius of Curvature ri | Distance di | Refractive Index Ni | Abbe's No vi |
|---|---|---|---|---|
| 1 | r1  −60.832 | | | |
| | | d1  3.0 | N1 1.53172 | v1 48.8 |
| 2 | r2  1805.172 | | | |
| | | d2  varibl | — | — |
| 3 | r3  152.751 | | | |
| | | d3  10.23 | N2 1.71300 | v2 53.9 |
| 4 | r4  −72.12 | | | |
| | | d4  varibl | — | — |
| 5 | r5  −47.409 | | | |
| | | d5  7.909 | N3 1.75520 | v3 27.5 |
| 6 | r6  −63.844 | | | |
| | | d6  0.5 | — | — |
| 7 | r7  ∞ ap. stp | | | |
| | | d7  .0.5 | — | — |
| 8 | r8  63.844 | | | |
| | | d8  7.909 | N4 1.75520 | v4 27.5 |
| 9 | r9  47.409 | | | |
| | | d9  varibl | — | — |
| 10 | r10  72.12 | | | |
| | | d10  10.23 | N5 1.71300 | v5 53.9 |
| 11 | r11  −152.751 | | | |
| | | d11  varibl | — | — |
| 12 | r12  −1805.172 | | | |
| | | d12  3.0 | N6 1.53172 | v6 48.8 |

TABLE 20-continued

| S. No | Radius of Curvature ri | Distance di | Refractive Index Ni | Abbe's No vi |
|---|---|---|---|---|
| 13 | r13  60.832 | | | |

The first to sixth lenses L1 to L6 of the tenth embodiment are specified as described in Table 20 above. Distances d2, d4, d9 and d11 of the adjacent two lenses of the six lenses L1 to L6 (see FIG. 26 or FIGS. 27) are changed in response to the magnification of the zoom lens as described in the following table 21.

TABLE 21

| | | | |
|---|---|---|---|
| magnification m | 2.0 | 1.0 | 0.5 |
| lens asbl. foc. le. f | 169.0 | 190.0 (f0) | 169.0 |
| distance d2 | 3.886 | 0.5 | 2.657 |
| distance d4 | 9.475 | 12.861 | 10.704 |
| distance d9 | 10.704 | 12.861 | 9.475 |
| distance d11 | 2.657 | 0.5 | 3.886 |
| F number | 6.0 | 6.5 | 6.0 |
| object height Y | 74.25 | 148.5 | 148.5 |
| half field ang. ω | 16.4° | 21.3° | 16.4° |

FIG. 36a illustrates the structure of the zoom lens comprising the first to sixth lenses L1 to L6 specified as represented in Table 20 and Table 21, respectively, at the time of forming a magnified image (m=2.0). Also, FIGS. 36b and 36c illustrate the structure of the zoom lens at the time of forming a natural size image (m=1.0) and a reduced image (m=0.5), respectively.

In accordance with this embodiment, it is also possible, as in the case of the seventh embodiment mentioned above, to continuously vary the power of the zoom lens for a copying apparatus with maintaining the conjugate length between the object and the image constant regardless of the magnification of the zoom lens.

FIGS. 37a-1, 37b-1 and 37c-1 graphically represent the spherical aberration of the zoom lens of the tenth embodiment of the invention in the magnifying state, the natural size state and the reducing state, illustrated in FIGS. 36a, 36b and 36c, respectively. Also, the astigmatism of the zoom lens in the different magnification states thereof are represented in FIGS. 37a-2, 37b-2 and 37c-2, respectively. Also, the distortion aberration of the zoom lens in the different magnification states thereof are represented in FIGS. 37a-3, 37b-3 and 37c-3, respectively.

Further, the coma aberration of the zoom lens in the different magnification states thereof are represented in FIGS. 38a to 38c.

An eleventh embodiment of the present invention is described hereinafter with reference to FIGS. 39a, 39b and 39c which illustrate the structure thereof in the magnifying state, the natural size state and the reducing state, respectively, as well as to FIGS. 40a-1 to 40a-3, 340-1 to 40b-3, 40c-1 to 40c-3, and 41a to 41c. The eleventh embodiment comprises first to sixth lenses L1 to L6 which are specified as described in the following table 22.

TABLE 22

| S. No | Radius of Curvature ri | Distance di | Refractive Index Ni | Abbe's No vi |
|---|---|---|---|---|
| 1 | r1  −63.853 | | | |
| | | d1  3.0 | N1 1.56732 | v1 42.8 |
| 2 | r2  −6774.222 | | | |
| | | d2  varibl | — | — |
| 3 | r3  173.988 | | | |
| | | d3  9.12 | N2 1.74330 | v2 49.2 |
| 4 | r4  −74.2 | | | |

TABLE 22-continued

| S. No | Radius of Curvature ri | Distance di | | Refractive Index Ni | Abbe's No vi |
|---|---|---|---|---|---|
| | | d4 | varibl | — | — |
| 5 | r5 | −49.126 | | | |
| | | d5 | 10.03 | N3 1.78472 | v3 25.7 |
| 6 | r6 | −66.698 | | | |
| | | d6 | 0.3 | — | — |
| 7 | r7 | ∞ ap. stp | | | |
| | | d7 | 0.3 | — | — |
| 8 | r8 | 66.698 | | | |
| | | d8 | 10.03 | N4 1.78472 | v4 25.7 |
| 9 | r9 | 49.126 | | | |
| | | d9 | varibl | — | — |
| 10 | r10 | 74.2 | | | |
| | | d10 | 9.12 | N5 1.74330 | v5 49.2 |
| 11 | r11 | −173.988 | | | |
| | | d11 | varibl | — | — |
| 12 | r12 | 6774.222 | | | |
| | | d12 | 3.0 | N6 1.56732 | v6 42.8 |
| 13 | r13 | 63.853 | | | |

The first to sixth lenses L1 to L6 of the eleventh embodiment are specified as described in Table 22 above. Distances d2, d4, d9 and d11 of the adjacent two lenses of the six lenses L1 to L6 (see FIG. 26 or FIGS. 27) are changed in response to the magnification of the zoom lens as described in the following table 23.

TABLE 3

| magnification m | 2.0 | 1.0 | 0.5 |
|---|---|---|---|
| lens asbl. foc. le. f | 169.15 | 190.18(f0) | 169.15 |
| distance d2 | 3.98 | 0.5 | 2.777 |
| distance d4 | 8.57 | 12.05 | 9.774 |
| distance d9 | 9.774 | 12.05 | 8.57 |
| distance d11 | 2.777 | 0.5 | 3.98 |
| F number | 6.0 | 6.5 | 6.0 |
| object height Y | 74.25 | 148.5 | 148.5 |
| half field ang. ω | 16.4° | 21.3° | 16.4° |

FIG. 39a illustrates the structure of the zoom lens comprising the first to sixth lenses L1 to L6 specified as represented in Table 22 and Table 23, respectively, at the time of forming a magnified image (m=2.0). Also, FIGS. 39b and 39c illustrate the structure of the zoom lens at the time of forming a natural size image (m=1.0) and a reduced image (m=0.5), respectively.

In accordance with this embodiment, it is also possible, as in the case of the seventh embodiment mentioned above, to continuously vary the power of the zoom lens for a copying apparatus with maintaining the conjugate length between the object and the image constant regardless of the magnification of the zoom lens.

FIGS. 40a-1, 40b-1 and 40c-1 graphically represent the spherical aberration of the zoom lens of the eleventh embodiment of the invention in the magnifying state, the natural size state and the reducing state, illustrated in FIGS. 39a, 39b and 39c, respectively. Also, the astigmatism of the zoom lens in the different magnification states thereof are represented in FIGS. 40a-2, 40b-2 and 40c-2, respectively. Also, the distortion aberration of the zoom lens in the different magnification states thereof are represented in FIGS. 40a-3, 40b-3 and 40c-3, respectively.

Further, the coma aberration of the zoom lens in the different magnification states thereof are represented in FIGS. 41a to 41c.

A twelfth embodiment of the present invention is described hereinafter with reference to FIGS. 42a and 42b which illustrate the structure thereof in magnifying states in magnification of 2.8 and 2.0, respectively, FIG. 42c illustrating the structure thereof in the natural size state and FIGS. 42d and 42e illustrating the structure thereof in reducing states in magnification of 0.5 and 0.36, respectively, as well as to FIGS. 43a-1 to 43a-3, 43b-1 to 43b-3, 43c-1 to 43c-3, 43d-1 to 43d-3, 43e-1 to 43e-3 and 44a to 44e. The twelfth embodiment comprises first to sixth lenses L1 to L6 which are specified as described in the following table 24.

TABLE 24

| S. No | Radius of Curvature ri | Distance di | | Refractive Index Ni | Abbe's No vi |
|---|---|---|---|---|---|
| 1 | r1 | −62.34 | | | |
| | | d1 | 3.0 | N1 1.56732 | v1 42.8 |
| 2 | r2 | −1857.9 | | | |
| | | d2 | varibl | — | — |
| 3 | r3 | 197.474 | | | |
| | | d3 | 10.55 | N2 1.72000 | v2 50.3 |
| 4 | r4 | −71.494 | | | |
| | | d4 | varibl | — | — |
| 5 | r5 | −49.16 | | | |
| | | d5 | 9.48 | N3 1.76182 | v3 26.6 |
| 6 | r6 | −65.435 | | | |
| | | d6 | 0.3 | — | — |
| 7 | r7 | ∞ ap. stp | | | |
| | | d7 | 0.3 | — | — |
| 8 | r8 | 65.435 | | | |
| | | d8 | 9.48 | N4 1.76182 | v4 26.6 |
| 9 | r9 | 49.16 | | | |
| | | d9 | varibl | — | — |
| 10 | r10 | 71.494 | | | |
| | | d10 | 10.55 | N5 1.72000 | v5 50.3 |
| 11 | r11 | −197.474 | | | |
| | | d11 | varibl | — | — |
| 12 | r12 | 1857.9 | | | |
| | | d12 | 3.0 | N6 1.56732 | v6 42.8 |
| 13 | r13 | 62.34 | | | |

The first to sixth lenses L1 to L6 of the twelfth embodiment are specified as described in Table 24 above. Distances d2, d4, d9 and d11 of the adjacent two lenses of the six lenses L1 to L6 (see FIG. 26 or FIGS. 27) are changed in response to the magnification of the zoom lens as described in the following tables 25-1 and 25-2.

TABLE 25-1

| magnification m | 2.8 | 2.0 | 1.0 |
|---|---|---|---|
| lens asbl. foc. le. f | 154.08 | 177.18 | 200.0(f0) |
| distance d2 | 9.221 | 4.684 | 1.05 |
| distance d4 | 4.579 | 9.116 | 12.75 |
| distance d9 | 7.93 | 10.606 | 12.75 |
| distance d11 | 5.87 | 3.194 | 1.05 |
| F number | 5.5 | 6.0 | 6.5 |
| object height Y | 53.04 | 74.25 | 148.5 |
| half field ang. ω | 14.3° | 15.6° | 20.4° |

TABLE 25-2

| magnification m | 0.5 | 0.36 |
|---|---|---|
| lens asbl. foc. le. f | 177.18 | 154.68 |
| distance d2 | 3.194 | 5.793 |
| distance d4 | 10.606 | 8.007 |
| distance d9 | 9.116 | 4.709 |
| distance d11 | 4.684 | 9.091 |
| F number | 6.0 | 5.5 |
| object height Y | 148.5 | 148.5 |
| half field ang. ω | 15.6° | 14.3° |

FIG. 42a illustrates the structure of the zoom lens comprising the first to sixth lenses L1 to L6 specified as represented in tables 24, 25-1 and 25-2, respectively, at the time of forming a magnified image (m=2.8). Also, FIG. 42b illustrates the structure of the zoom lens in the magnifying state (m=2.0). Similarly, FIGS. 42c, 42d and 42e illustrate the structure of the zoom lens at the time of forming a natural size image (m=1.0), a reduced image (m=0.5) and another reduced image (m=0.36), respectively.

In accordance with this embodiment, it is also possible, as in the case of the seventh embodiment mentioned above, to continuously vary the power of the zoom lens for a copying apparatus with maintaining the conjugate length between the object and the image constant regardless of the magnification of the zoom lens.

FIGS. 43a-1, 43b-1, 43c-1 and 43e-1 graphically represent the spherical aberration of the zoom lens of the twelfth embodiment of the invention in the magnifying states (m=2.8 and m=2.0), the natural size state and the reducing states (m=0.5 and m=0.36), illustrated in FIGS. 42a to 42e, respectively. Also, the astigmatism of the zoom lens in the different magnification states thereof are represented in FIGS. 43a-2, 43b-2, 43c-2, 43d-2 and 43e-2, respectively. Also, the distortion aberration of the zoom lens in the different magnification states thereof are represented in FIGS. 43a-3, 43b-3, 43c-3, 43d-3 and 43e-3, respectively.

Further, the coma aberration of the zoom lens in the different magnification states thereof are represented in FIGS. 44a to 44e.

The seventh to twelfth embodiments mentioned above satisfy the conditions $$0.4 < |f1/f0| < 0.7$$

and $$0.3 < f2/f0 < 0.45$$

as mentioned before, with respect to the second essential structure of the present invention. The factors of the conditions are represented in the following tables 26-1 and 26-2 below.

TABLE 26-1

|  | le. ass. focl le. | focl le. f1, f6 | focl le. f2, f5 |
|---|---|---|---|
| 7th emb | 190.02 | −97.26 | 68.2 |
| 8th emb | 190.0 | −94.46 | 68.69 |
| 9th emb | 190.02 | −101.76 | 73.21 |
| 10th emb | 190.0 | −110.61 | 70.04 |
| 11th emb | 190.18 | −113.64 | 71.09 |
| 12th emb | 200.0 | −113.77 | 74.12 |

TABLE 26-2

|  | f1/f0 | f2/f0 |
|---|---|---|
| 7th emb | 0.512 | 0.359 |
| 8th emb | 0.497 | 0.362 |
| 9th emb | 0.536 | 0.385 |
| 10th emb | 0.582 | 0.368 |
| 11th emb | 0.598 | 0.375 |
| 12th emb | 0.569 | 0.371 |

As can be clearly seen from the above tables 26-1 and 26-2, the seventh to twelfth embodiments of the present invention satisfy the above-mentioned conditions.

The present invention is not limited to the embodiments mentioned above. For example, the present invention can be applied to a photoengraving machine which has the same functional components as the copying machiene mentioned above. In this sense, the copying apparatus in accordance with the present invention includes the photoengraving machine.

It is to be noted that, with respect to the tenth to twelfth embodiments, the lower limit of |f1/f0| may be 0.3 and the lower limit of f2/f0 may be 0.25 instead of 0.4 and 0.3, respectively.

Many widely different embodiments of the present invention may be constructed without departing from the sprit and scope of the present invention. It should be understood that the present invention is not limited to the specific embodiments described in the specification, except as defined in the appended claims.

What is claimed is:

1. A zoom lens for a variable power copying apparatus comprising six lenses disposed in the following order from an object surface to an image surface, which include:
   a first lens composed of a negative lens with the orientation of a concave surface towards the object;
   a second lens composed of a positive lens;
   a third lens composed of a negative lens with the orientation of a concave surface towards the object;
   an aperture stop;
   a fourth lens composed of the same lens as the third lens with the orientation of a concave surface towards the image;
   a fifth lens composed of the same lens as the second lens; and
   a sixth lens composed of the same lens as the first lens with the orientation of a concave surface towards the image;
   wherein, at the time of forming a natural size scale image of an object, the first to sixth lenses are arranged symmetrically with respect to the aperture stop; and
   at the time of forming a reduced or magnified size scale image of an object, the lens and the aperture stop are arranged in such a way that at least the first and sixth lenses are fixed, and at least the second and fifth lenses are moved nonsymmetrically with respect to the aperture stop, and that length of whole lens system is moved along an optical axis so that the image size is continuously varied maintaining both a conjugate length between the object surface and the image surface and a length of whole lens assembly system constant irrespective of the state of the scale.

2. A zoom lens for a variable power copying apparatus according to claim 1, wherein the following conditions, $$0.4 < |f1/f0| < 0.65$$

and $$0.7 < |f3/f0| < 1.4,$$

are satisfied, wherein f1 designates a focal length of the first lens, f3 designates a focal length of the third lens and f0 designates a combined focal length of the whole lens assembly system for the natural size scale.

3. A zoom lens for a variable power copying apparatus according to claim 1, wherein:
   the first lens is composed of a negative meniscus lens or a biconcave lens,
   the second lens is composed of a positive meniscus lens with the orientation of a concave surface towards the object or a biconvex lens,
   the third lens is composed of a negative meniscus lens, the fourth lens is composed of a negative meniscus lens, the fifth lens is composed of a positive meniscus lens with the orientation of a concave surface towards the image or a biconvex lens, the sixth lens is composed of a negative meniscus lens or a biconcave lens.

4. A zoom lens for a variable power copying apparatus comprising six lenses disposed in the following order from an object surface to an image surface, which include:

a first lens composed of a negative lens with the orientation of a concave surface towards the object;

a second lens composed of a positive lens;

a third lens composed of a negative lens with the orientation of a concave surface towards the object;

an aperture stop;

a fourth lens composed of the same lens as the third lens with the orientation of a concave surface towards the image;

a fifth lens composed of the same lens as the second lens; and a sixth lens composed of the same lens as the first lens with the orientation of a concave surface towards the image;

wherein, at the time of forming a natural size scale image of an object, the first to sixth lenses are arranged symmetrically with respect to the aperture stop, and at the same time of forming a reduced or magnified size scale image of an object, the lens and the aperture stop are arranged in such a way that the first, third, fourth, and sixth lenses are fixed, and the second and fifth lenses are moved nonsymmetrically with respect to the aperture stop and that length of whole lens system is moved along an optical axis so that the image size is continuously varied maintaining both a conjugate length between the object surface and the image surface and a length of whole lens assembly system constant irrespective of the state of the scale.

5. A zoom lens for a variable power copying apparatus according to claim 4, wherein the following conditions, $$0.4 < |f1/f0| < 0.7$$

and $$0.3 < |f2/f0| < 0.45$$

are satisfied, wherein f1 designates a focal length of the first lens, f2 designates a focal length of the second lens and f0 designates a combined focal length of the whole lens assembly system for the natural size scale.

6. A zoom lens for a variable power copying apparatus according to claim 4, wherein:

the first lens is composed of a negative meniscus lens or a biconcave lens, the second lens is composed of a biconvex lens, the third lens is composed of a negative meniscus lens, the fourth lens is composed of a negative meniscus lens, the fifth lens is composed of a biconvex lens, the sixth lens is composed of a negative meniscus lens or a biconcave lens.

* * * * *